United States Patent
Park et al.

(10) Patent No.: US 11,785,656 B2
(45) Date of Patent: *Oct. 10, 2023

(54) PACKET DATA CONVERGENCE PROTOCOL PACKET DUPLICATION ACTIVATION BY A BASE STATION CENTRAL UNIT

(71) Applicant: HONDA MOTOR CO., LTD., Tokyo (JP)

(72) Inventors: Kyungmin Park, Vienna, VA (US); Esmael Dinan, McLean, VA (US); Alireza Babaei, Fairfax, VA (US); Hyoungsuk Jeon, Centreville, VA (US); Hua Zhou, Herndon, VA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/001,731

(22) Filed: Aug. 25, 2020

(65) Prior Publication Data
US 2020/0389930 A1 Dec. 10, 2020

Related U.S. Application Data

(63) Continuation of application No. 16/146,693, filed on Sep. 28, 2018, now Pat. No. 10,764,947.
(Continued)

(51) Int. Cl.
*H04W 76/15* (2018.01)
*H04W 28/02* (2009.01)
(Continued)

(52) U.S. Cl.
CPC ............... *H04W 76/15* (2018.02); *H04L 1/08* (2013.01); *H04L 5/001* (2013.01);
(Continued)

(58) Field of Classification Search
CPC ............. H04W 76/15; H04W 28/0231; H04W 28/0257; H04W 28/085; H04W 80/02;
(Continued)

(56) References Cited

U.S. PATENT DOCUMENTS 10,064,227 B2    8/2018   Choi et al.
10,764,948 B2    9/2020   Park et al.
(Continued)

FOREIGN PATENT DOCUMENTS

GB          2528988 A     2/2016
WO    2016/064215 A1    4/2016

OTHER PUBLICATIONS

ETSI MCC, "Report of 3GPP TSG RAN WG2 NR AdHoc#2 Meeting, Qingdao, China", Jun. 27-29, 2017 (Year: 2017).*
(Continued)

*Primary Examiner* — Joseph A Bednash
(74) *Attorney, Agent, or Firm* — WHDA, LLP

(57) ABSTRACT

A base station distributed unit receives, from a base station central unit, at least one information element indicating activation of a packet data convergence protocol (PDCP) packet duplication of at least one bearer of a wireless device. The base station distributed unit transmits, by and based on the activation: PDCP packets of the at least one bearer; and duplicated PDCP packets of the at least one bearer.

19 Claims, 53 Drawing Sheets

Related U.S. Application Data

(60) Provisional application No. 62/564,720, filed on Sep. 28, 2017, provisional application No. 62/564,738, filed on Sep. 28, 2017.

(51) Int. Cl.
| | |
|---|---|
| *H04L 1/08* | (2006.01) |
| *H04W 28/08* | (2023.01) |
| *H04L 5/00* | (2006.01) |
| *H04W 88/08* | (2009.01) |
| *H04W 80/02* | (2009.01) |
| *H04W 92/20* | (2009.01) |
| *H04W 28/082* | (2023.01) |

(52) U.S. Cl.
CPC ... *H04W 28/0231* (2013.01); *H04W 28/0257* (2013.01); *H04W 28/082* (2023.05); *H04W 80/02* (2013.01); *H04W 88/085* (2013.01); *H04W 92/20* (2013.01)

(58) Field of Classification Search
CPC ...... H04W 88/085; H04W 92/20; H04L 1/08; H04L 5/001
See application file for complete search history.

(56) References Cited

U.S. PATENT DOCUMENTS

| | | |
|---|---|---|
| 2014/0044072 A1 | 2/2014 | Piggin |
| 2014/0362780 A1 | 12/2014 | Malladi et al. |
| 2016/0360553 A1 | 12/2016 | Cheng et al. |
| 2018/0014323 A1 | 1/2018 | Huang et al. |
| 2018/0270860 A1 | 9/2018 | Bhorkar et al. |
| 2019/0053222 A1 | 2/2019 | Bhorkar et al. |
| 2019/0200379 A1 | 6/2019 | Wang et al. |
| 2020/0112879 A1* | 4/2020 | Shimoda ............... H04L 1/1819 |
| 2020/0162211 A1* | 5/2020 | Wang .................... H04L 5/0032 |
| 2020/0178297 A1 | 6/2020 | Park et al. |

OTHER PUBLICATIONS

3GPP TS 36.300 V14.3.0 (Jun. 2017); Technical Specification; 3rd Generation Partnership Project; Technical Specification Group Radio Access Network; Evolved Universal Terrestrial Radio Access (E-UTRA) and Evolved Universal Terrestrial Radio Access Network; (E-UTRAN); Overall description; Stage 2 (Release 14).
3GPP TS 38.300 V1.0.0 (Sep. 2017); Technical Specification; 3rd Generation Partnership Project; Technical Specification Group Radio Access Network; NR; NR and NG-RAN Overall Description; Stage 2 (Release 15).
R2-1707705; 3GPP TSG-RAN2 Meeting #99; Berlin, Germany, Aug. 21-25, 2017; Agenda Item: 10.2.2.3; Source: OPPO; Title: Control on UL packet duplication for split bearer; Document for: Discussion, Decision.
R2-1707708; 3GPP TSG-RAN2 Meeting #99; Berlin, Germany, Aug. 21-25, 2017; Agenda Item: 10.3.3.5; Source: OPPO; Title: PDCP operation for UL packet duplication; Document for: Discussion, Decision.
R2-1707717; 3GPP TSG RAN WG2 #99; Berlin, Germany, Aug. 21-25, 2017; Agenda Item: 10.3.3.5; Source: Huawei, HiSilicon; Title: UE behaviors upon deactivation of DC duplication; Document for: Discussion and Decision.
R2-1707718; 3 GPP TSG RAN WG2 #99; Berlin, Germany, Aug. 21-25, 2017; Agenda Item: 10.3.3.5; Source: Huawei, ASUSTeK, HiSilicon; Title: RLC behaviors upon duplicate deactivation; Document for: Discussion and Decision.
R2-1707719; 3GPP TSG-RAN WG2 #99; Berlin, Germany, Aug. 21-25, 2017; Agenda Item: 10.3.3.5; Source: Huawei, ASUSTeK, HiSilicon; Title: PDCP operation for packet duplication; Document for: Discussion and Decision.
R2-1707720; 3GPP TSG-RAN WG2 #99; Berlin, Germany, Aug. 2-25, 2017; Agenda Item: 10.3.3.5; Source: Huawei, HiSilicon; Title: PDCP data volume calculation for packet duplication; Document for: Discussion and Decision.
R2-1707924; Revision of R2-1706380; 3GPP TSG-RAN WG2 #99; Berlin, Germany, Aug. 21-25, 2017; Source: CATT Title: PDCP Status Report for Duplication; Agenda Item: 10.3.3.5; Document for: Discussion and Decision.
R2-1707925; 3GPP TSG-RAN WG2 #99; Berlin, Germany, Aug. 21-25, 2017; Source: CATT; Title: Duplication Bearer Type; Agenda Item: 10.3.3.5; Document for: Discussion and Decision.
R2-1707982; R2-1706545; 3GPP TSG-RAN WG2 #99; Berlin, Germany, Aug. 21-25, 2017; Agenda item: 10.3.3.5 Source: Nokia, Mediatek, Nokia Shanghai Bell; Title: Initial State of PDCP Duplication; WID/SID: NR_newRAT-Core—Release 15; Document for: Discussion and Decision.
R2-1707990; 3GPP TSG-RAN WG2 #99; Berlin, Germany, Aug. 21-25, 2017; Agenda item: 10.3.3.5; Source: Nokia, Nokia Shanghai Bell; Title: Duplication Impacts to PDCP; WID/SID: NR_newRAT—Release 15; Document for: Discussion and Decision.
R2-1708017; 3GPP TSG-RAN WG2 #99; Berlin, Germany, Aug. 21-25, 2017; Agenda Item: 10.3.3.5; Source: Ericsson; Title: Aligned duplication support for DRBs and SRBs; Document for: Discussion, Decision.
R2-1708097; Revised R2-1707260; 3GPP TSG-RAN WG2 #99; Berlin, Germany, Aug. 21-25, 2017; Agenda Item: 10.2.2.3; Souce: MediaTek Inc.; Title: Stage-2 aspects of data duplication; Document for: Discussion and decision.
R2-1708098; Revised R2-1707261; 3GPP TSG-RAN WG2 #99; Berlin, Germany, Aug. 21-25, 2017; Agenda Item: 10.3.3.5; Souce: MediaTek Inc.; Title: Data duplication in NR; Document for: Discussion and decision.
R2-1708329; 3GPP TSG-RAN WG2 #99; Berlin, Germany, Aug. 21-25, 2017; Agenda Item: 10.3.3.5; Source: Ericsson; Title: PDCP and RLC behaviour for PDCP data duplication.
Tdoc R2-1708333; Updated from R2-1707172; 3GPP TSG-RAN WG2 #99; Berlin, Germany, Aug. 21-25, 2017; Agenda Item: 10.2.2.3; Source: Ericsson; Title: Packet duplication in CA; Document for: Discussion, Decision.
Tdoc R2-1708335; 3GPP TSG-RAN WG2 #99, Berlin, Germany, Aug. 21-25, 2017; Agenda Item: 10.3.3.6 Source: Ericsson; Title: PDCP dynamic link switching; Document for: Discussion, Decision.
Tdoc R2-1708336; Update of R2-1704370; 3GPP TSG-RAN WG2 #99; Berlin, Germany, Aug. 21-25, 2017; Agenda Item: 10.3.3.5; Source: Ericsson; Title: PDCP data volume reporting in duplication; Document for: Discussion, Decision.
Tdoc R2-1708337; 3GPP TSG-RAN WG2 #99; Berlin, Germany, Aug. 21-25, 2017; Agenda Item: 10.3.3.5; Source: Ericsson; Title: PDCP duplication control related to SCell control; Document for: Discussion, Decision.
R2-1708444; 3GPP TSG-RAN WG2 2017 RAN2#99 Meeting; Berlin, Germany, Aug. 21-25, 2017; Agenda item: 10.3.3.5; Source: Samsung; Title: Discussion on PDCP data volume calculation; Document for Discussion & Decision.
R2-1708489; 3GPP TSG-RAN WG2 Meeting #99; Berlin, Germany, Aug. 21-25, 2017; Source: vivo; Title: Duplication deactivation due to Scell or BWP deactivation; Agenda Item: 10.2.2.3; Document for: Discussion and Decision.
R2-1708508; 3GPP TSG-RAN WG2 Meeting #99; Berlin, Germany, Aug. 21-25, 2017; Source: vivo; Title: Layer-2 behaviors of PDCP duplication activation deactivation; Agenda Item: 10.3.3.5; Document for: Discussion and Decision.
R2-1708573; 3GPP TSG-RAN WG2 Meeting # 99; Aug. 21-25, Berlin, Germany; Source: Panasonic; Title: Packet duplication during the handover; Agenda Item: 10.3.3.5; Document for: Discussion and Decision.
R2-1708624; 3GPP TSG-RAN WG2 Meeting #99; Berlin, Germany, Aug. 21-25, 2017; Agenda item: 10.3.3.5 Source: Lenovo, Motorola Mobility; Title: PDCP packet duplication; Document for: Discussion and Decision.

(56) References Cited

OTHER PUBLICATIONS

R2-1708691; 3GPP TSG-RAN WG2 Meeting #99; Berlin, Germany, Aug. 21-25, 2017; Agenda Item: 10.2.2.3 Source: Huawei, HiSilicon Title: Remaining stage 2 issues for CA duplication and for DC duplication Document for: Discussion and Decision.
R2-1708735; 3GPP RAN WG2 Meeting #99; Berlin, Germany Aug. 21-25, 2017; Agenda Item: 10.2.2.3; Source: InterDigital Inc.; Title: Details of Duplication and Routing for SRB; Document for: Discussion, Decision.
R2-1708821; 3GPP TSG-RAN WG2 NR Meeting #99; Berlin, Germany, Aug. 21-25, 2017; Agenda item: 10.2.2.3 Source: Intel Corporation; Title: Support of CA packet duplication for RLC AM; Document for: Discussion and Decision.
R2-1708862; 3GPP TSG-RAN WG2 #99;Berlin, Germany, Jun. 21-25, 2017; Agenda Item: 10.2.2.3 (Packet duplication); Source: Fujitsu; Title: Stage 2 TP for RLC AM duplication; Document for: Decision.
R2-1708950; 3GPP TSG-RAN WG2 Meeting #99; Berlin, Germany, Aug. 21-25, 2017; Agenda item: 10.2.2.3; Source: Qualcomm Incorporated; Title: Further considerations for Packet duplication; WID/SID: NR_newRAT-Core—Release 15; Document for: Discussion and Decision.
R2-1708951; 3GPP TSG-RAN WG2 Meeting #99; Berlin, Germany, Aug. 21-25, 2017; Agenda item: 10.3.3.5; Source: Qualcomm Incorporated; Title: PDCP duplication; WID/SID: NR_newRAT-Core—Release 15; Document for: Discussion and Decision.
R2-1709032; (Resubmission of R2-177368); 3GPP TSG-RAN WG2 Meeting #99; Berlin, Germany, Aug. 21-25, 2017; Agenda item: 10.3.3.5; Source: Samsung; Title: PDCP Duplication Operations; Document for: Discussion & Decision.
R2-1709036; 3GPP TSG-RAN WG2 #99; Berlin, Germany, Aug. 21-25, 2017; Agenda item: 10.2.2.3; Source: Samsung; Title: Uplink DRB Duplication; Document for: Discussion & Decision.
R2-1709061; 3GPP TSG-RAN WG2 Meeting #99; Berlin, Germany, Aug. 21-Aug. 25, 2017; Agenda Item 10.3.3.5 (NR_newRAT-Core); Source LG Electronics Inc.; Title Discussion on the duplicate detection in PDCP Document for Discussion and Decision.
Tdoc R2-1709077; 3GPP TSG-RAN WG2 Meeting #99; Berlin, Germany, Aug. 21-25, 2017; Agenda item: 10.2.2.3; Source: ITRI; Title: SCG Failure Case for Duplication SRB; Document for: Discussion and Decision.
R2-1709095; 3GPP TSG-RAN WG2 #99; Berlin, Germany, Aug. 21-Aug. 25, 2017; Agenda item: 10.2.2.3 (NR_newRAT-Core); Source: LG Electronics Inc.; Title: Need for Duplicate RB; Document for: Discussion and Decision.
R2-1709100; Update of R2-1706870; 3GPP TSG-RAN WG2 #99; Berlin, Germany, Aug. 21-Aug. 25, 2017 Update of R2-1706870; Agenda item: 10.3.3.5 (NR_newRAT-Core); Source: LG Electronics Inc.; Title: Packet duplication in PDCP; Document for: Discussion and Decision.
R2-1709870; 3GPP TSG-RAN WG2 #99; Berlin, Germany, Aug. 21-25, 2017; Agenda Item: 10.2.15; Source: Ericsson; Title: TP on Radio Link Failure for 38.300; Document for: Discussion, Decision.
R3-173128; 3GPP TSG RAN WG3 meeting #97; Berlin, Germany, Aug. 21-25, 2017; Agenda Item: 10.10.2.5; Source: Huawei; Title: PDCP duplication for CU-DU; Document for: Discussion and Decision.
3GPP TS 36.300 V14.3.0 (Jun. 2017); 3rd Generation Partnership Project; Technical Specification Group Radio Access Network; Evolved Universal Terrestrial Radio Access (E-UTRA) and Evolved Universal Terrestrial Radio Access Network ; (E-UTRAN); Overall description; Stage 2; (Release 14).
R3-172252; 3GPP TSG-RAN WG3 Meeting Ad Hoc; Qingdao, P. R. China, Jun. 27-29, 2017; Agenda item: 10.10.5; Source: Samsung, KT, SK Telecom; Title: PDCP duplication support in high layer functional split; Document for: Discussion & Decision.
R3-172664; 3GPP TSG RAN WG3#97; Berlin, Germany, Aug. 21-25, 2017; Agenda item: 10.8.1.4; Source: ZTE; Title: Further Consideration SRB/DRB Duplication; Document for: Discussion and Approval.
R3-174408; 3GPP TSG-RAN WG3 #98; Reno, NV, USA, Nov. 27-Dec. 1, 2017; Agenda item: 10.8.3.3; Source: ZTE; Title: Consideration on the activation or deactivation of duplication; Document for: Discussion and Decision.
3GPP TSG-RAN WG2 #99 R2-1707982; Berlin, Germany, Aug. 21-25, 2017; Agenda item: 10.3.3.5; Source: Nokia, Mediatek, Nokia Shanghai Bell; Title: Initial State of PDCP Duplication; WID/SID: NR_newRAT-Core—Release 15 Document for: Discussion and Decision.
3GPP TSG-RAN WG2 #99 Tdoc R2-1708335; Berlin, Germany, Aug. 21-25, 2017; Agenda Item: 10.3.3.6 Source: Ericsson; Title: PDCP dynamic link switching; Document for: Discussion, Decision.
International Search Report dated Sep. 20, 2017, issued in International application No. PCT/US2017/037026 counterpart to U.S. Appl. No. 17/005,019. (4 pages).
R1-162671, 3GPP TSG RAN WG1 Meeting #84bis, Busan, Korea Apr. 11-15, 2016, Agenda item: 7.3.1.5, Source: Samsung, Title: Discussion on LBT for self-carrier scheduling, cited in ISR dated Sep. 20, 2017.
R1-164127, 3GPP TSG RAN WG1 Meeting #85 Nanjing, China, May 23-27, 2016, Agenda item: 6.2.1.1, Source: Intel Corporation, Title: On the DCI design for multi-subframe scheduling, cited in ISR dated Sep. 20, 2017.
CATT: "Configuration and activation/deactivation of duplication", 3GPP Draft; R2-1704247, 3rd Generation Partnership Project (3GPP), TSG-RAN WG2 Meeting #98, Hangzhou, China; May 15, 2017-May 19, 2017, May 14, 2017 (May 14, 2017), XP051274825; Cited in Extended European Search Report dated Feb. 21, 2022. (2 pages).
The Extended European Search Report dated Feb. 21, 2022, issued in U.S. Appl. No. 17/005,019 (counterpart to U.S. Appl. No. 17/005,019). (10 pages).
Non-Final Office Action dated Mar. 31, 2022, issued in U.S. Appl. No. 17/005,019. (23 pages).
"Transmission of RRC messages", Ericsson, Vodafone; 3GPP TSG-RAN WG3#96, Tdoc R3-171726, Hangzhou, China, May 15-19, 2017. Retrieved from "https://www.3gpp.org/ftp/TSG_RAN/WG3_lu/TSGR3_96/Docs/R3-171726.zip" on Mar. 30, 2022; Cited in IN Office Action dated Mar. 30, 2022. (3 pages).
"Bearer management on supporting PDCP duplication in CA case", Samsung, KT, SK Telecom; 3GPP TSG-RAN WG3 Meeting #97, R3-172968, Berlin, Germany Aug. 21-25, 2017. Retrieved from "https://www.3gpp.org/ftp/tsg_ran/WG3_lu/TSGR3_97/Docs/R3-172968.zip" on Mar. 30, 2022; Cited in IN Office Action dated Mar. 30, 2022. (4 pages).
Office Action dated Mar. 30, 2022, issued in IN application No. 202017014575 (counterpart to U.S. Appl. No. 17/005,019), with English Translation. (6 pages).

* cited by examiner

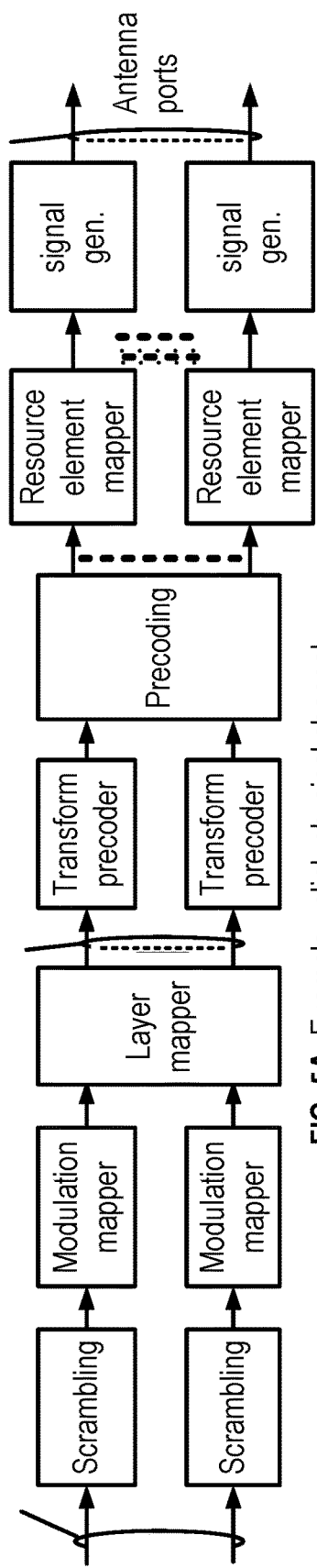
FIG. 5A Example uplink physical channel
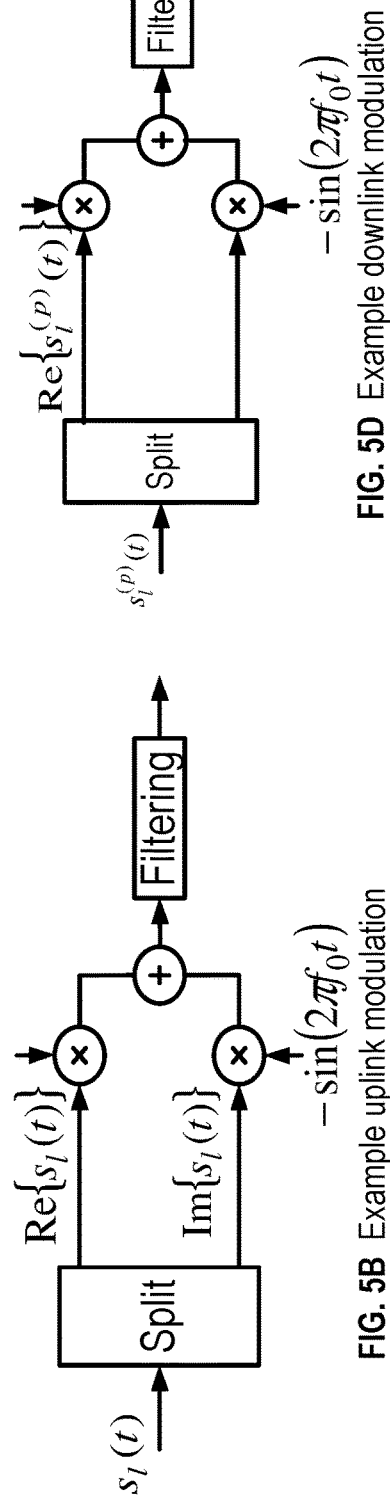
FIG. 5B Example uplink modulation
FIG. 5D Example downlink modulation
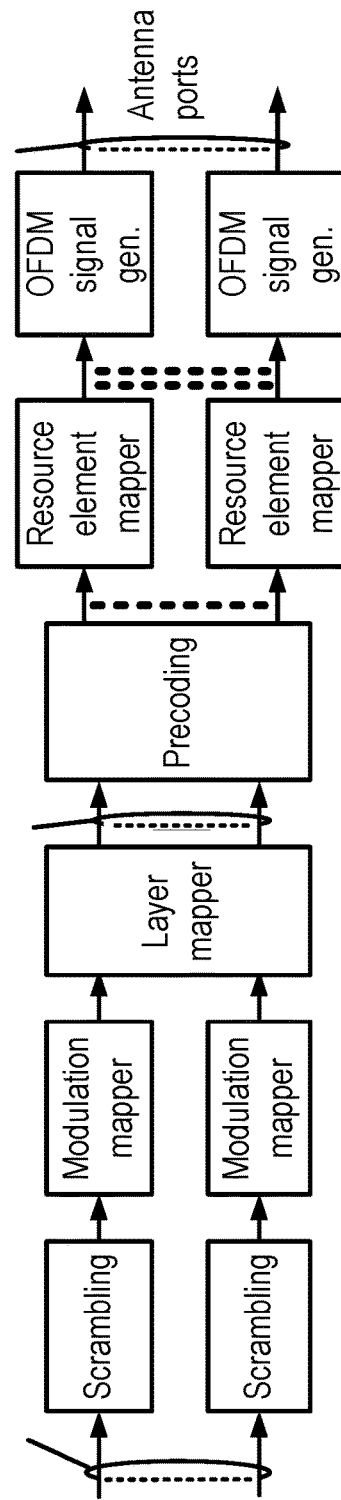
FIG. 5C Example downlink physical channel Dual-Connectivity- two MAC entities at UE side

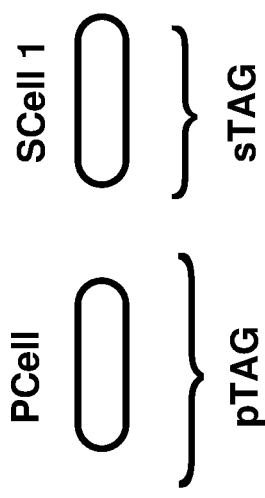
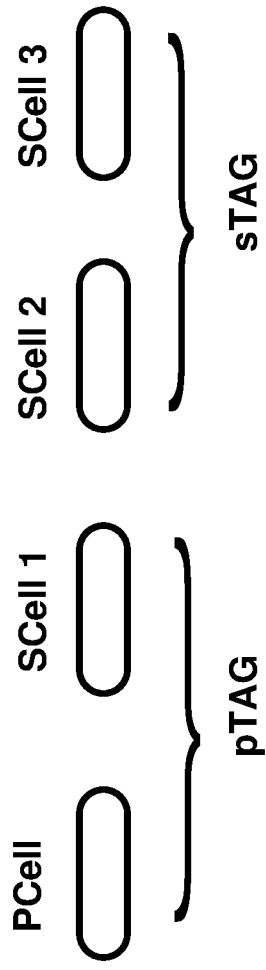
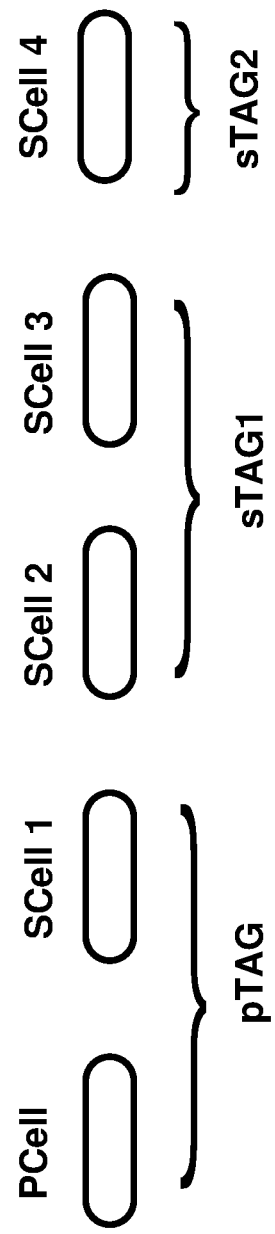
FIG. 8 gNB connected to NGC eLTE eNB connected to NGC

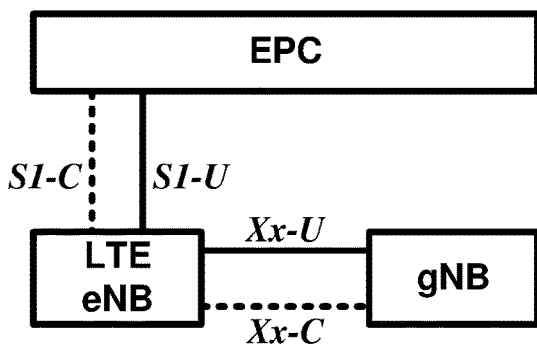

LTE eNB connected to EPC with non-standalone gNB.
gNB user plane connected to EPC via LTE eNB.

FIG. 11A

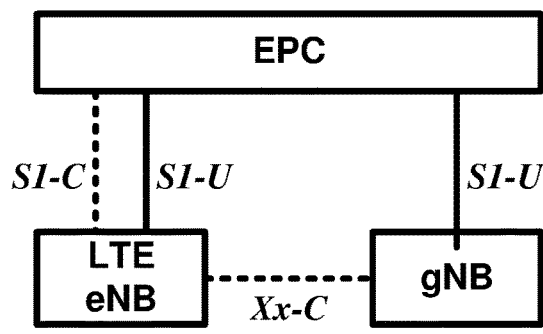

LTE eNB connected to EPC with non-standalone gNB.
gNB user plane connected to EPC directly.

FIG. 11B

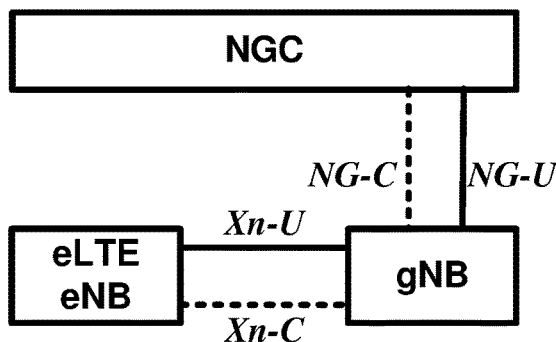

gNB connected to NGC with non-standalone eLTE eNB.
eLTE eNB user plane connected to NGC via gNB.

FIG. 11C

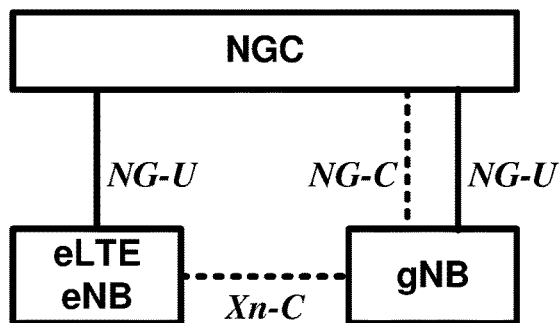

gNB connected to NGC with non-standalone eLTE eNB.
eLTE eNB user plane connected to NGC directly.

FIG. 11D

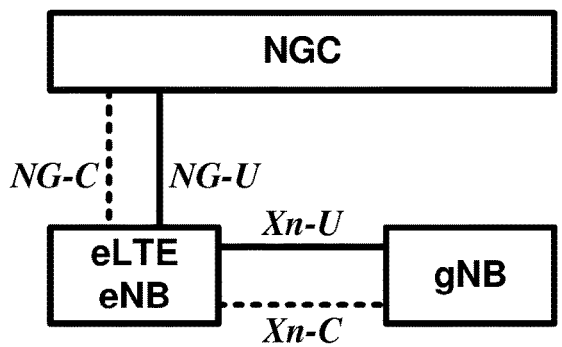

eLTE eNB connected to NGC with non-standalone gNB.
gNB user plane connected to NGC via eLTE eNB.

FIG. 11E

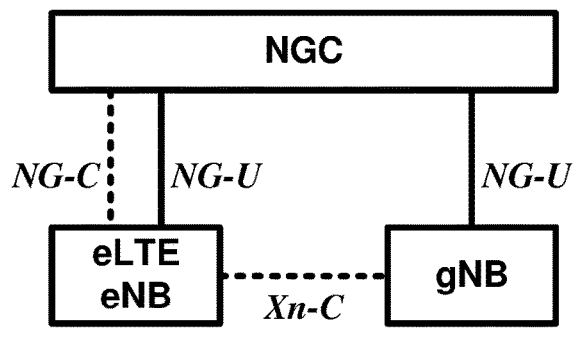

eLTE eNB connected to NGC with non-standalone gNB.
gNB user plane connected to NGC directly.

FIG. 11F

Radio protocol architecture for split bearer and SCG bearer. LTE eNB connected to EPC with non-standalone gNB.

Radio protocol architecture for split bearer and SCG bearer. gNB connected to NGC with non-standalone eLTE eNB.

Radio protocol architecture for split bearer and SCG bearer. eLTE eNB connected to NGC with non-standalone gNB.

Non-centralized deployment

Centralized deployment

Receive, by a base station distributed unit from a base station central unit, information elements comprising: bearer configuration information element(s) indicating that PDCP packet duplication is configured for 1st bearer(s) of a wireless device; and information element(s) indicating activation of the PDCP packet duplication of the 1st bearer(s)
3210

Transmit, by the base station distributed unit to the wireless device and in response to the information element(s) indicating the activation of the PDCP packet duplication, a medium access control control element indicating the activation of the PDCP packet duplication of the 1st bearer(s)
3220

Receive, by the base station distributed unit and based on the medium access control control element: PDCP packets of the 1st bearer(s); and duplicated PDCP packets of the 1st bearer(s)
3230

FIG. 32

Receive, by a base station distributed unit from a base station central unit, information elements comprising: at least one bearer configuration information element indicating that packet data convergence protocol (PDCP) packet duplication is configured for at least one first bearer of a wireless device; and
at least one information element indicating activation of the PDCP packet duplication of the at least one first bearer
3310

Transmit, by the base station distributed unit to the wireless device, a radio resource control message comprising at least one configuration parameter indicating that the PDCP packet duplication is configured for the at least one first bearer
3320

Receive, by the base station distributed unit and based on the activation of the PDCP packet duplication: PDCP packets of the at least one first bearer; and duplicated PDCP packets of the at least one first bearer
3330

FIG. 33

Receive, by a base station distributed unit from a base station central unit, a first message comprising bearer configuration parameters for packet data convergence protocol (PDCP) packet duplication of a first bearer for a wireless device
3410

Receive, by the base station distributed unit from the base station central unit, a second message comprising at least one parameter indicating activation of the PDCP packet duplication of the first bearer
3420

Transmit, by the base station distributed unit and based on the activation of PDCP packet duplication: PDCP packets of the first bearer; and duplicated PDCP packets of the first bearer
3430

FIG. 34

Receive, by a base station distributed unit from a base station central unit, a first message comprising bearer configuration parameters for packet data convergence protocol (PDCP) packet duplication of a first bearer for a wireless device
3510

Receive, by the base station distributed unit from the base station central unit, a second message comprising at least one parameter indicating activation of the PDCP packet duplication of the first bearer
3520

Transmit, by the base station distributed unit to the wireless device and in response to the second message, a medium access control control element indicating the activation of the PDCP packet duplication of the first bearer
3530

Receive, by the base station distributed unit from the wireless device, duplicated PDCP packets of the first bearer
3540

FIG. 35

Receive, by a base station distributed unit from a base station central unit, a first message comprising bearer configuration parameters for packet data convergence protocol (PDCP) packet duplication of a bearer for a wireless device
3610

Receive, by the base station distributed unit from the base station central unit, a second message comprising at least one parameter indicating deactivation of the PDCP packet duplication of a first bearer
3620

Stop transmitting, by the base station distributed unit to the wireless device and based on the deactivation of the PDCP packet duplication, at least one duplicated PDCP packet of the first bearer
3630

FIG. 36

Transmit, by a base station central unit to a base station distributed unit, a first message comprising bearer configuration parameters for PDCP packet duplication of a first bearer for a wireless device
3810

Transmit, by the base station central unit to the base station distributed unit, a second message comprising at least one parameter indicating activation of the PDCP packet duplication of the first bearer
3820

Transmit, by the base station central unit to the base station distributed unit and based on the activation of the PDCP packet duplication, duplicated PDCP packets of the first bearer
3830

FIG. 38

Receive, by a base station distributed unit from a base station central unit, a first message comprising bearer configuration parameters for packet data convergence protocol (PDCP) packet duplication of a first bearer for a wireless device
3910

Receive, by the base station distributed unit from the base station central unit, a second message comprising at least one parameter indicating activation of the PDCP packet duplication of the first bearer
3920

Transmit, by the base station distributed unit and based on the activation of PDCP packet duplication, duplicated PDCP packets of the first bearer
3930

FIG. 39

Receive, by a base station distributed unit from a base station central unit, a first message comprising at least one bearer configuration parameter indicating that packet data convergence protocol (PDCP) packet duplication is configured for at least one first bearer of a wireless device
4010

Receive, by the base station distributed unit from the base station central unit, a second message comprising at least one parameter indicating activation of the PDCP packet duplication of the at least one first bearer
4020

Transmit, by the base station distributed unit and based on the at least one parameter indicating the activation of the PDCP packet duplication: PDCP packets of the at least one first bearer; and duplicated PDCP packets of the at least one first bearer
4030

FIG. 40

Receive, by a base station distributed unit from a base station central unit, information elements comprising: at least one bearer configuration information element indicating PDCP packet duplication is configured for at least one first bearer of a wireless device; and at least one information element indicating activation of the PDCP packet duplication of the at least one first bearer
4110

Transmit, by the base station distributed unit and based on the information elements: PDCP packets of the at least one first bearer; and duplicated PDCP packets of the at least one first bearer
4120

FIG. 41

Receive, by a base station distributed unit from a base station central unit, information elements comprising: at least one bearer configuration information element indicating that PDCP packet duplication is configured for at least one first bearer of a wireless device; and at least one information element indicating activation of the PDCP packet duplication of the at least one first bearer
4210

Transmit, by the base station distributed unit and based on the at least one information element indicating the activation of the PDCP packet duplication: PDCP packets of the at least one first bearer; and duplicated PDCP packets of the at least one first bearer
4220

FIG. 42

Receive, by a base station distributed unit from a base station central unit, at least one information element indicating activation of a packet data convergence protocol (PDCP) packet duplication of at least one first bearer of a wireless device
4510

Transmit, by the base station distributed unit and based on the activation: PDCP packets of the at least one first bearer; and duplicated PDCP packets of the at least one first bearer
4520

FIG. 45

```
┌─────────────────────────────────────────────────────────┐
│   Receive, by a base station distributed unit from a base station│
│   central unit, a first message comprising at least one bearer   │
│   configuration parameter indicating that packet data convergence│
│   protocol (PDCP) packet duplication is configured for at least one│
│              first bearer of a wireless device           │
│                          4610                            │
└─────────────────────────────────────────────────────────┘
                             │
                             ▼
┌─────────────────────────────────────────────────────────┐
│  Receive, by the base station distributed unit from the base station│
│  central unit, a second message comprising at least one parameter│
│    indicating deactivation of the PDCP packet duplication of the at│
│                     least one first bearer              │
│                          4620                            │
└─────────────────────────────────────────────────────────┘
                             │
                             ▼
┌─────────────────────────────────────────────────────────┐
│  Stop transmitting, by the base station distributed unit and based│
│   on the at least one parameter indicating the deactivation of the│
│   PDCP packet duplication, duplicated PDCP packets of the at least│
│                         one first bearer                 │
│                          4630                            │
└─────────────────────────────────────────────────────────┘
```

FIG. 46

Receive, by a base station distributed unit from a base station central unit, information elements comprising: at least one bearer configuration information element indicating that packet data convergence protocol (PDCP) packet duplication is configured for at least one first bearer of a wireless device; and at least one information element indicating deactivation of the PDCP packet duplication of the at least one first bearer
4710

Stop transmitting, by the base station distributed unit and based on the at least one information element indicating the deactivation of the PDCP packet duplication, duplicated PDCP packets of the at least one first bearer
4720

FIG. 47

```
┌─────────────────────────────────────────────────────────┐
│ Receive, by a base station distributed unit from a base station │
│ central unit, information elements comprising: at least one bearer │
│ configuration information element indicating that packet data │
│ convergence protocol (PDCP) packet duplication is configured for │
│ at least one first bearer of a wireless device; and at least one │
│ information element indicating deactivation of the PDCP packet │
│ duplication of the at least one first bearer │
│                          4810                            │
└─────────────────────────────────────────────────────────┘
                              │
                              ▼
┌─────────────────────────────────────────────────────────┐
│ Transmit, by the base station distributed unit to the wireless │
│ device, a radio resource control message comprising at least one │
│ configuration parameter indicating that the PDCP packet │
│ duplication is configured for the at least one first bearer │
│                          4820                            │
└─────────────────────────────────────────────────────────┘
                              │
                              ▼
┌─────────────────────────────────────────────────────────┐
│ Transmit, by the base station distributed unit to the wireless │
│ device and in response to the at least one information element │
│ indicating the deactivation of the PDCP packet duplication, a │
│ medium access control control element indicating the deactivation │
│ of the PDCP packet duplication of the at least one first bearer │
│                          4830                            │
└─────────────────────────────────────────────────────────┘
                              │
                              ▼
┌─────────────────────────────────────────────────────────┐
│ Stop transmitting, by the base station distributed unit and based │
│ on the deactivation of the PDCP packet duplication, duplicated │
│ PDCP packets of the at least one first bearer │
│                          4840                            │
└─────────────────────────────────────────────────────────┘
```

FIG. 48

Receive, by a 1st base station from a 2nd base station, first message(s) for a wireless device, the first message(s) comprising: a 1st aggregate maximum bit rate of the wireless device at the 1st base station; and a PDCP packet duplication parameter indicating that a 1st packet flow comprises duplicated PDCP packets
5110

Receive, by the 1st base station from the 2nd base station, the duplicated PDCP packets of the 1st packet flow
5120

Transmit, by the 1st base station to the wireless device, the duplicated PDCP packets
5130

Determine, by the 1st base station, that a bit rate between the wireless device and the 1st base station exceeds the 1st aggregate maximum bit rate, wherein the determining ignores, based on the PDCP packet duplication parameter, the duplicated PDCP packets
5140

Limit, by the 1st base station, the bit rate between the wireless device and the 1st base station based on the determining
5150

FIG. 51

Receive, by a 1st base station from a 2nd base station, first message(s) for a wireless device, the first message(s) comprising: a 1st aggregate maximum bit rate of the wireless device at the 1st base station; and a PDCP packet duplication parameter indicating that a 1st packet flow is for duplicated PDCP packets
5210

Receive, by the 1st base station from the 2nd base station, packets of the 1st packet flow
5220

Transmit, by the 1st base station to the wireless device, the packets
5230

Determine, by the 1st base station, that a bit rate of the wireless device exceeds the 1st aggregate maximum bit rate, wherein the determining ignores, based on the PDCP packet duplication parameter, the packets of the 1st packet flow
5240

Limit, by the 1st base station, the bit rate of data transfer to a wireless device based on the determining
5250

FIG. 52

```
┌─────────────────────────────────────────────────────────────┐
│  Receive, by a 1st base station from a 2nd base station,    │
│  first message(s) for a wireless device, the first          │
│  message(s) comprising: a 1st aggregate maximum bit rate    │
│  of the wireless device at the 1st base station; and a      │
│  PDCP packet duplication parameter indicating that a 1st    │
│  packet flow comprises duplicated PDCP packets              │
│                         5310                                │
└─────────────────────────────────────────────────────────────┘
                              │
                              ▼
┌─────────────────────────────────────────────────────────────┐
│  Receive, by the 1st base station from the 2nd base         │
│  station, the duplicated PDCP packets of the 1st packet     │
│  flow                                                        │
│                         5320                                │
└─────────────────────────────────────────────────────────────┘
                              │
                              ▼
┌─────────────────────────────────────────────────────────────┐
│  Transmit, by the 1st base station to the wireless device,  │
│  the duplicated PDCP packets                                │
│                         5330                                │
└─────────────────────────────────────────────────────────────┘
                              │
                              ▼
┌─────────────────────────────────────────────────────────────┐
│  Determine, by the 1st base station, that a bit rate of     │
│  the wireless device exceeds the 1st aggregate maximum bit  │
│  rate, wherein the determining ignores, based on the PDCP   │
│  packet duplication parameter, the duplicated PDCP packets  │
│                         5340                                │
└─────────────────────────────────────────────────────────────┘
                              │
                              ▼
┌─────────────────────────────────────────────────────────────┐
│  Limit, by the 1st base station, the bit rate of the        │
│  wireless device based on the determining                   │
│                         5350                                │
└─────────────────────────────────────────────────────────────┘
```

FIG. 53

PACKET DATA CONVERGENCE PROTOCOL PACKET DUPLICATION ACTIVATION BY A BASE STATION CENTRAL UNIT

CROSS-REFERENCE TO RELATED APPLICATIONS

This application is a continuation of U.S. patent application Ser. No. 16/146,693, filed Sep. 28, 2018, which claims the benefit of U.S. Provisional Patent Application No. 62/564,738, filed Sep. 28, 2017, and U.S. Provisional Patent Application No. 62/564,720, filed Sep. 28, 2017, which are hereby incorporated by reference in their entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIG. 8 shows example TAG configurations as per an aspect of an embodiment of the present invention.

FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e)LTE eNB) as per an aspect of an embodiment of the present invention.

FIG. 32 is a flow diagram of an aspect of an embodiment of the present disclosure.

FIG. 33 is a flow diagram of an aspect of an embodiment of the present disclosure.

FIG. 34 is a flow diagram of an aspect of an embodiment of the present disclosure.

FIG. 35 is a flow diagram of an aspect of an embodiment of the present disclosure.

FIG. 36 is a flow diagram of an aspect of an embodiment of the present disclosure.

FIG. 38 is a flow diagram of an aspect of an embodiment of the present disclosure.

FIG. 39 is a flow diagram of an aspect of an embodiment of the present disclosure.

FIG. 40 is a flow diagram of an aspect of an embodiment of the present disclosure.

FIG. 41 is a flow diagram of an aspect of an embodiment of the present disclosure.

FIG. 42 is a flow diagram of an aspect of an embodiment of the present disclosure.

FIG. 45 is a flow diagram of an aspect of an embodiment of the present disclosure.

FIG. 46 is a flow diagram of an aspect of an embodiment of the present disclosure.

FIG. 47 is a flow diagram of an aspect of an embodiment of the present disclosure.

FIG. 48 is a flow diagram of an aspect of an embodiment of the present disclosure.

FIG. 51 is a flow diagram of an aspect of an embodiment of the present disclosure.

FIG. 52 is a flow diagram of an aspect of an embodiment of the present disclosure.

FIG. 53 is a flow diagram of an aspect of an embodiment of the present disclosure.

DETAILED DESCRIPTION OF EMBODIMENTS

Figure 1:
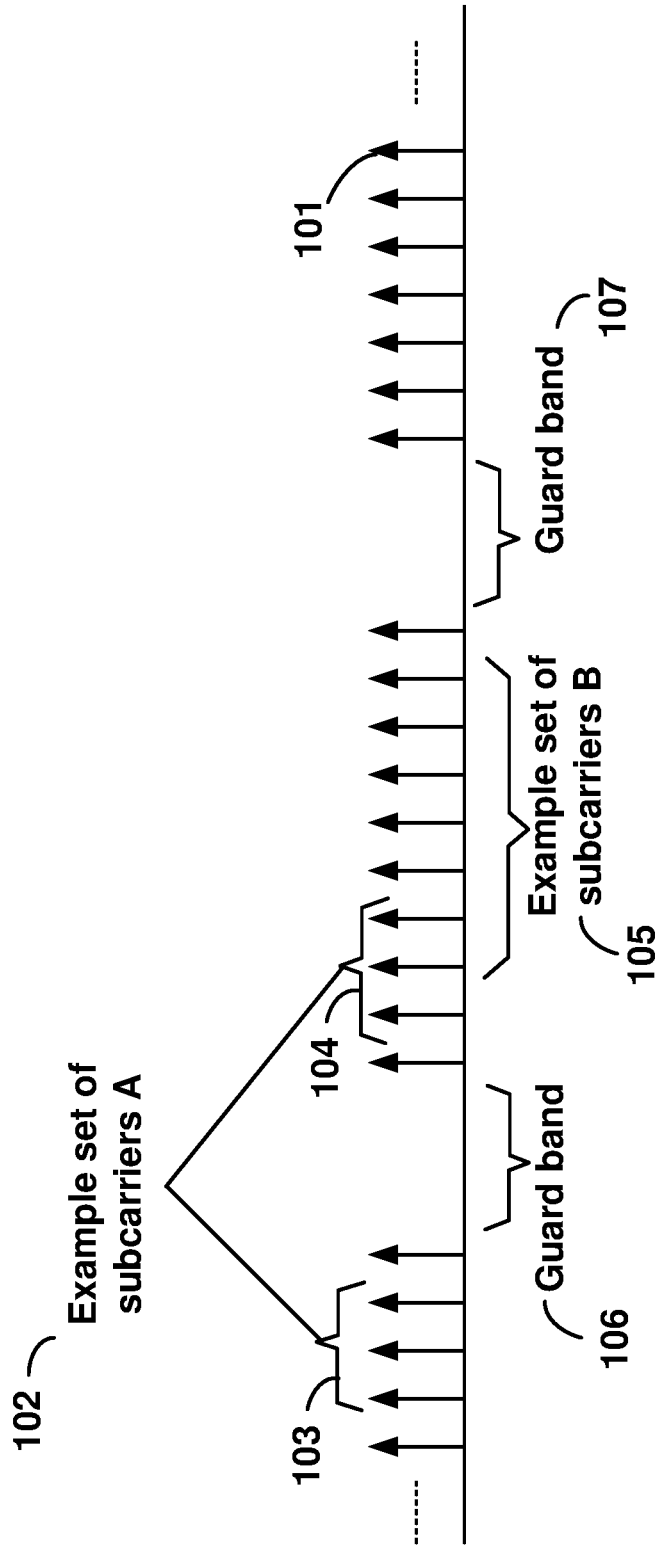
FIG. 1 is a diagram depicting example sets of OFDM subcarriers as per an aspect of an embodiment of the present invention.

Example embodiments of the present invention enable operation of wireless communication systems. Embodiments of the technology disclosed herein may be employed in the technical field of multicarrier communication systems. More particularly, the embodiments of the technology disclosed herein may relate to cellular wireless systems in a multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
CP cyclic prefix
DL downlink
DCI downlink control information
DC dual connectivity
eMBB enhanced mobile broadband
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
mMTC massive machine type communications
NAS non-access stratum
NR new radio
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG resource block groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TTI transmission time intervalTB transport block
UL uplink
UE user equipment
URLLC ultra-reliable low-latency communications
VHDL VHSIC hardware description language
CU central unit
DU distributed unit
Fs-C Fs-control plane
Fs-U Fs-user plane
gNB next generation node B
NGC next generation core
NG CP next generation control plane core
NG-C NG-control plane
NG-U NG-user plane
NR new radio
NR MAC new radio MAC
NR PHY new radio physical
NR PDCP new radio PDCP
NR RLC new radio RLC
NR RRC new radio RRC
NSSAI network slice selection assistance information
PLMN public land mobile network
UPGW user plane gateway
Xn-C Xn-control plane
Xn-U Xn-user plane
Xx-C Xx-control plane
Xx-U Xx-user plane Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
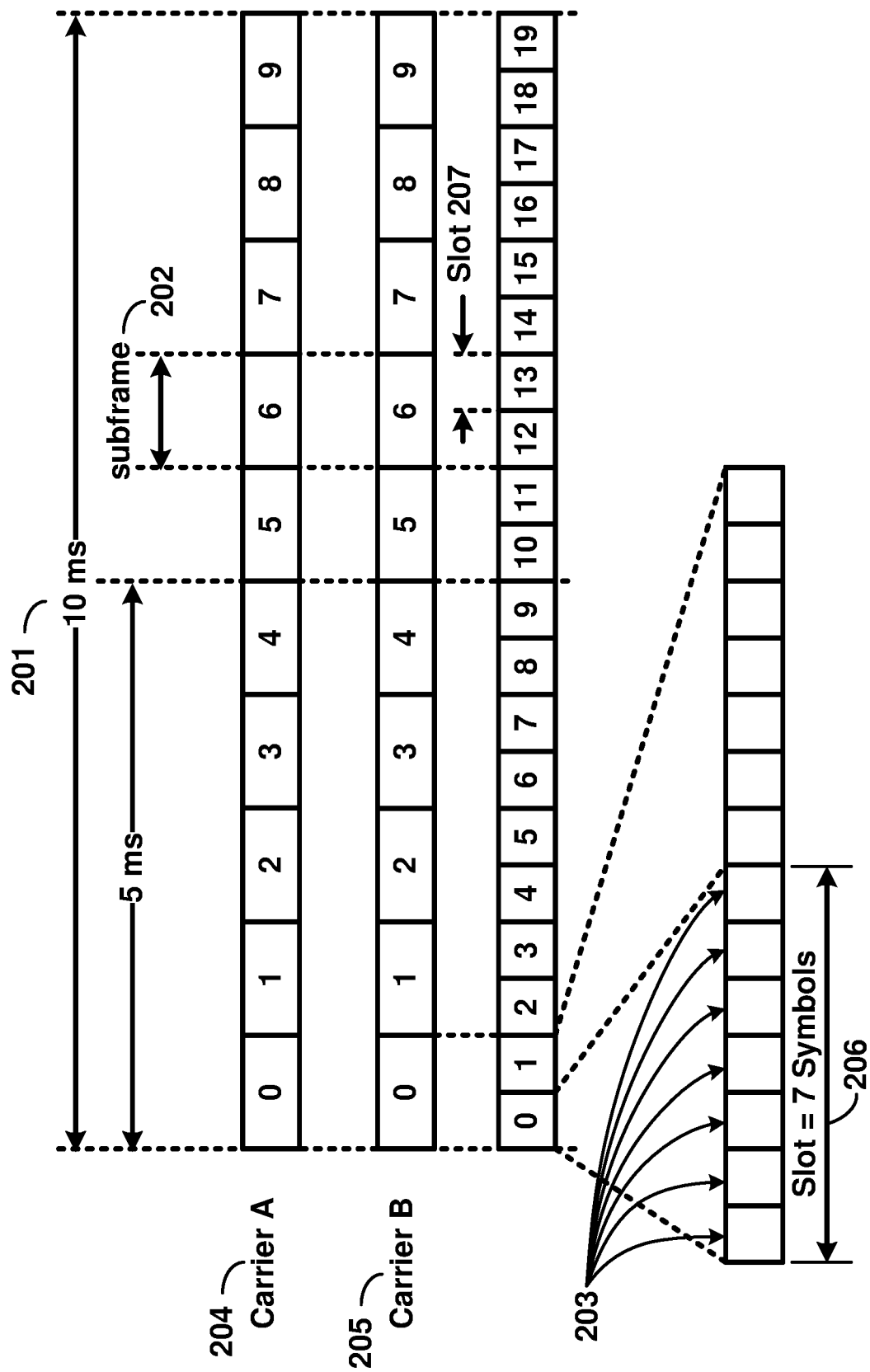
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
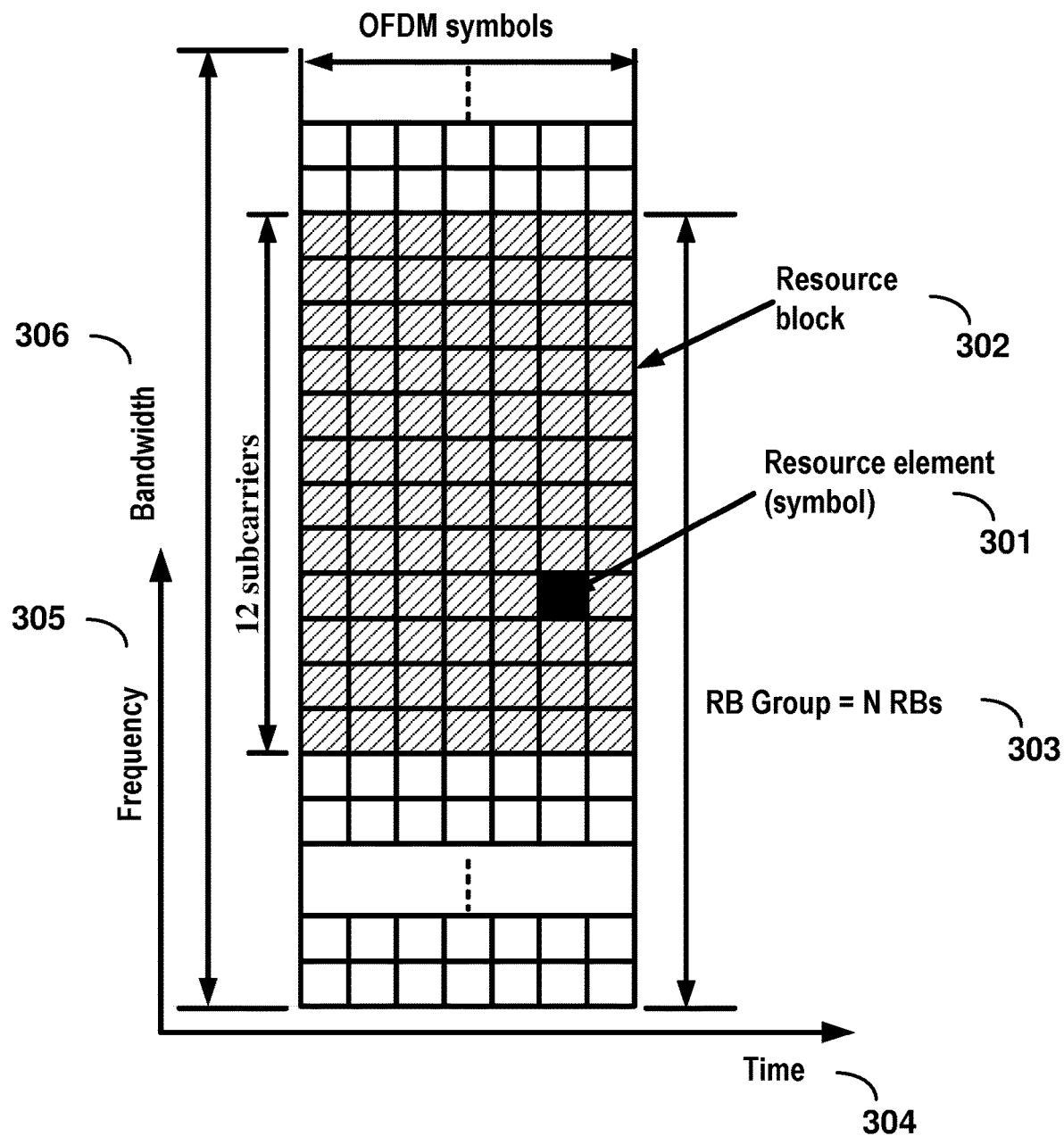
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
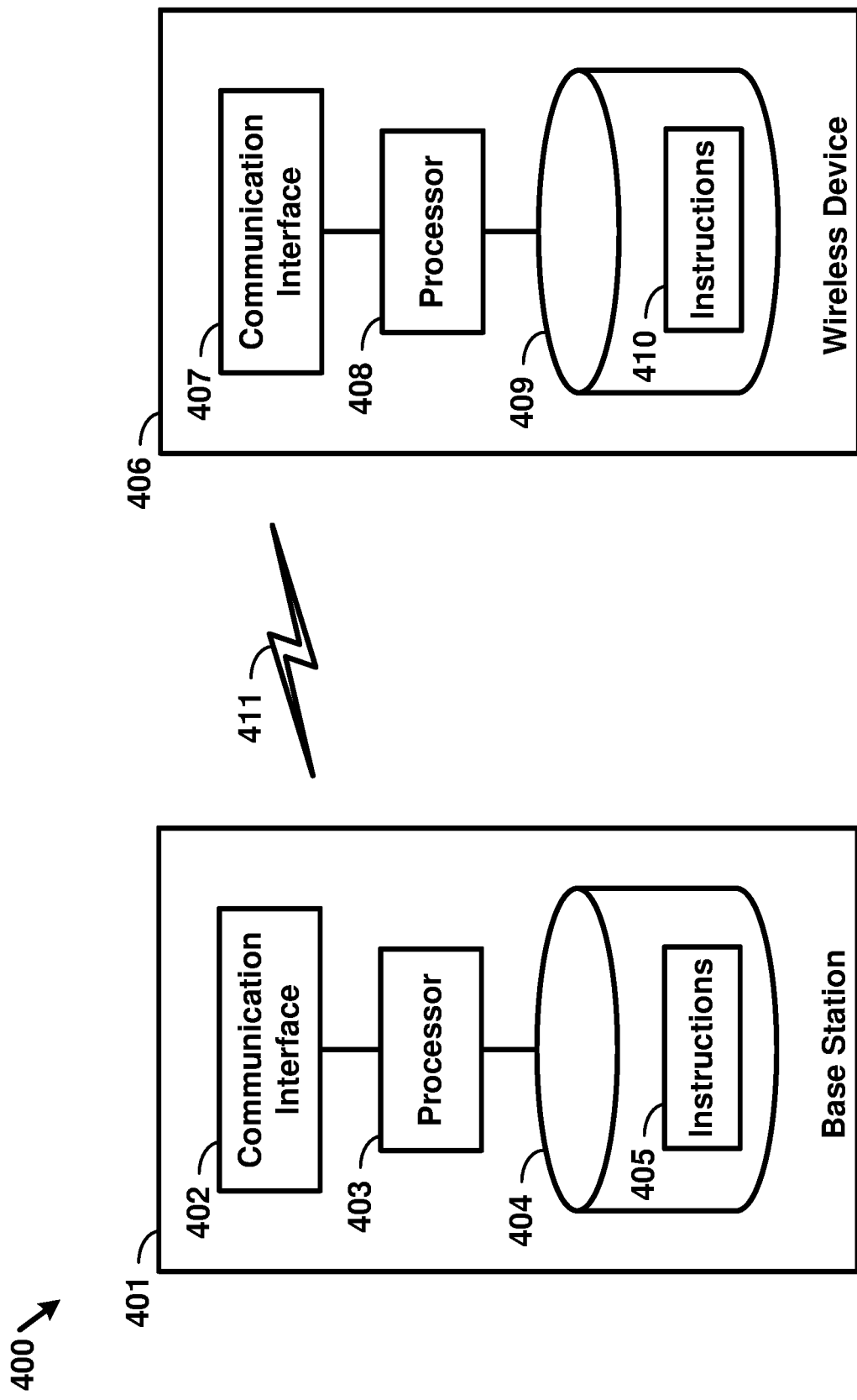
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

Figure 10A:
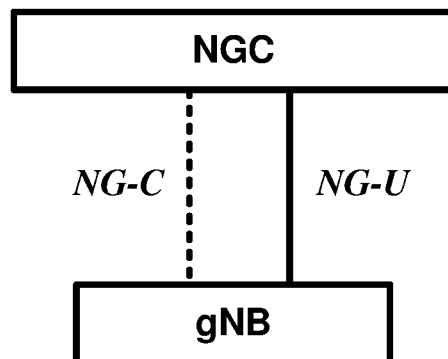
FIG. 10A and FIG. 10B are example diagrams for interfaces between a 5G core network (e.g. NGC) and base stations (e.g. gNB and eLTE eNB) as per an aspect of an embodiment of the present invention.
Figure 10B:
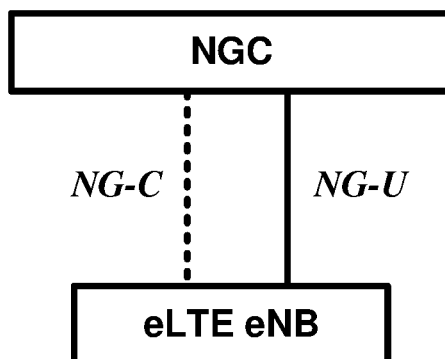

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present invention. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
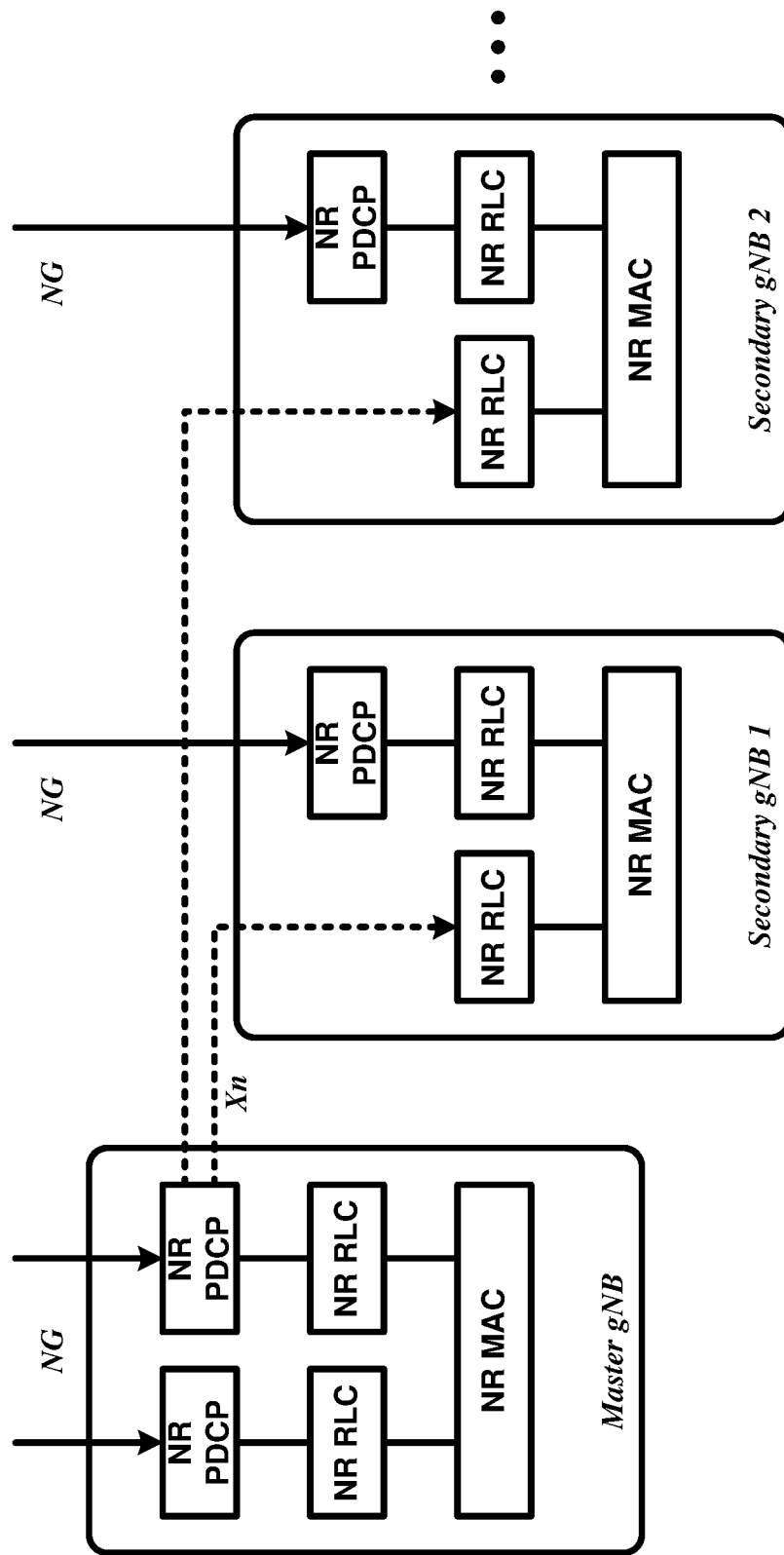
FIG. 6 is an example diagram for a protocol structure with multi-connectivity as per an aspect of an embodiment of the present invention.
Figure 7:
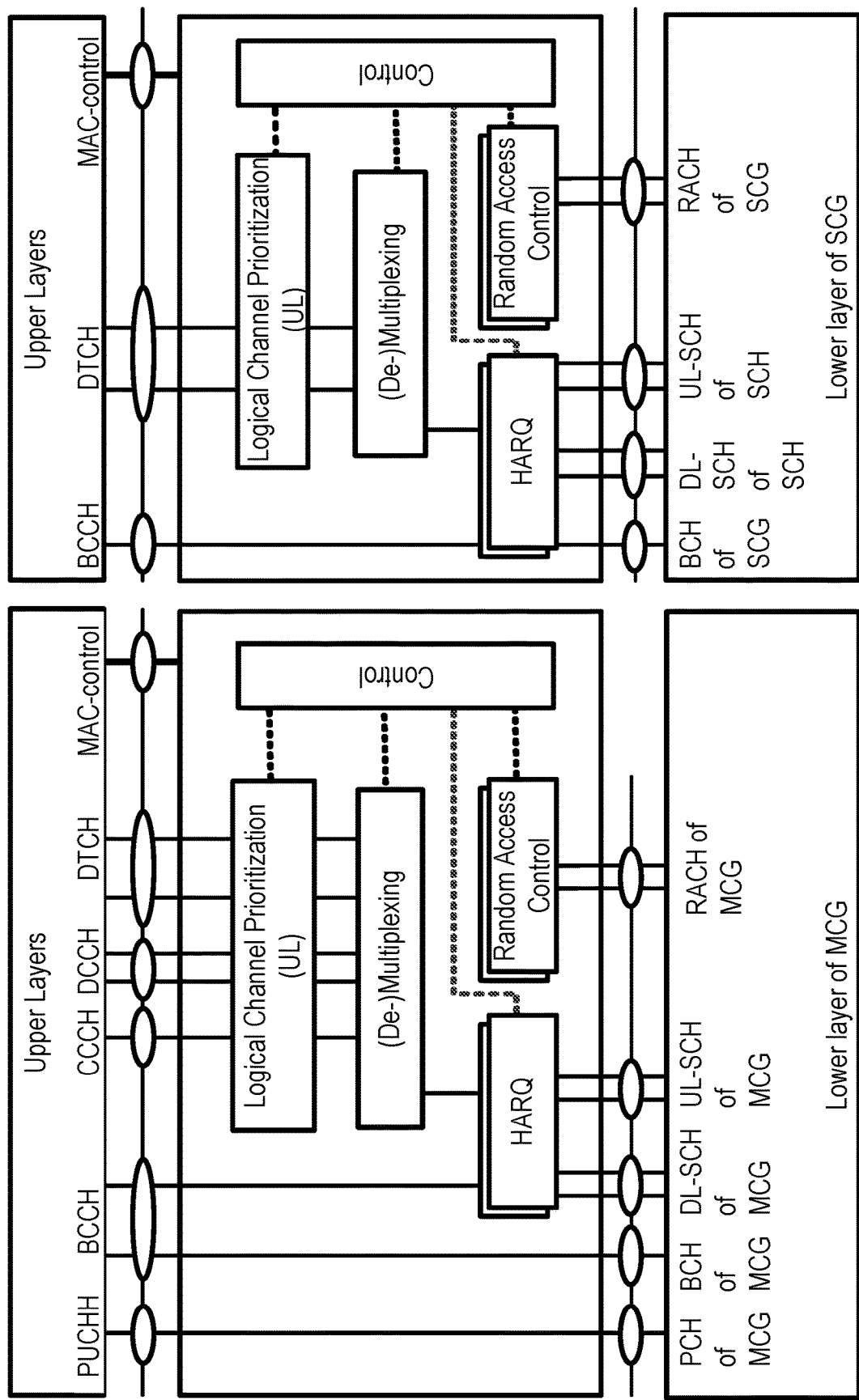
FIG. 7 is an example diagram for a protocol structure with CA and DC as per an aspect of an embodiment of the present invention.

FIG. 6 and FIG. 7 are example diagrams for protocol structure with CA and multi-connectivity as per an aspect of an embodiment of the present invention. NR may support multi-connectivity operation whereby a multiple RX/TX UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three alternatives may exist, an MCG bearer, an SCG bearer and a split bearer as shown in FIG. 6. NR RRC may be located in master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented in example embodiments of the invention.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not supported.

With respect to the interaction between a master gNB and secondary gNBs for multi-connectivity, one or more of the following principles may be applied: the master gNB may maintain the RRM measurement configuration of the UE and may, (e.g, based on received measurement reports or traffic conditions or bearer types), decide to ask a secondary gNB to provide additional resources (serving cells) for a UE; upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
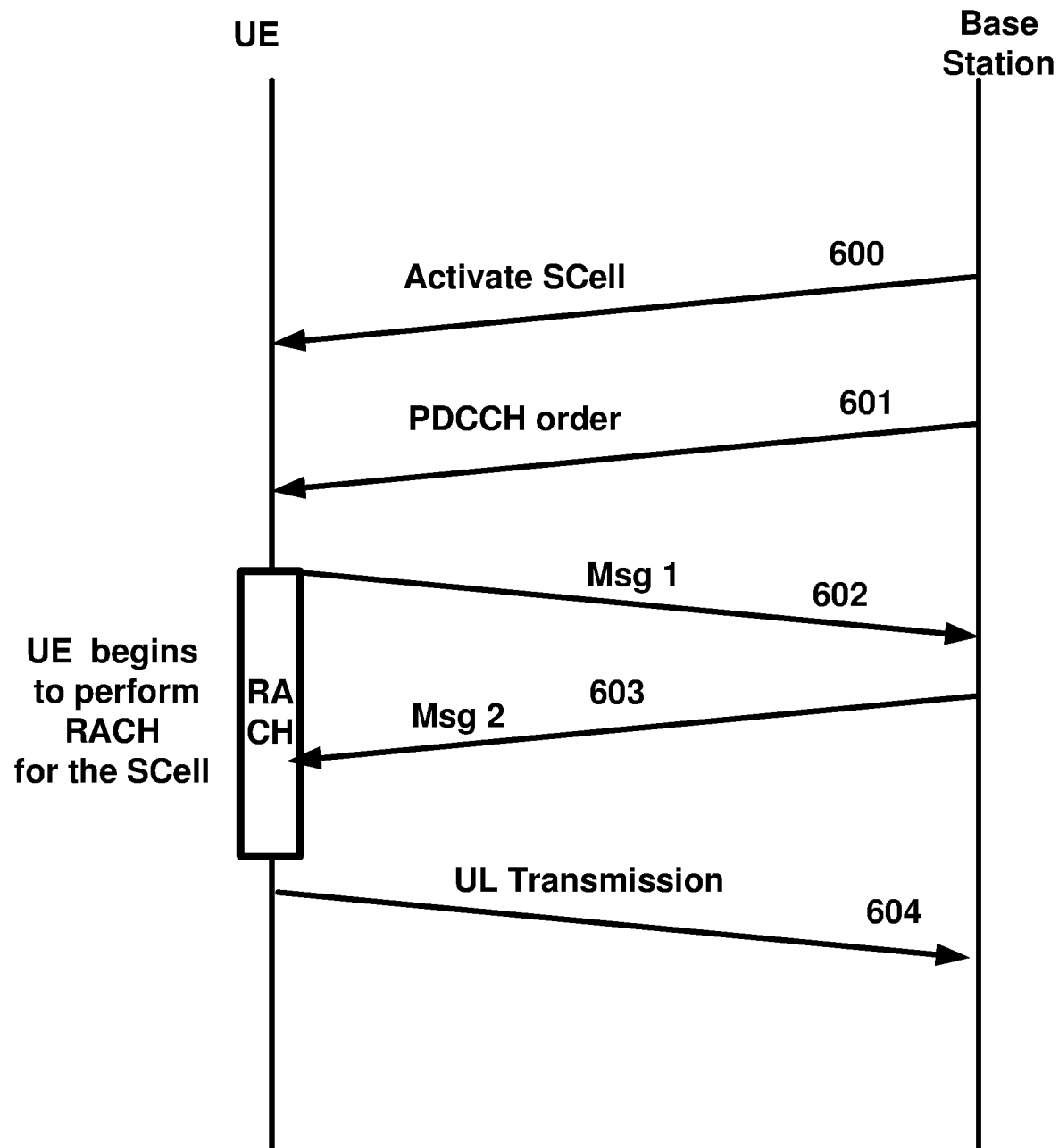
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RB s, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present invention. The tight interworking may enable a multiple RX/TX UE in RRC_CONNECTED to be configured to utilize radio resources provided by two schedulers located in two base stations (e.g. (e)LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

Figure 12A:
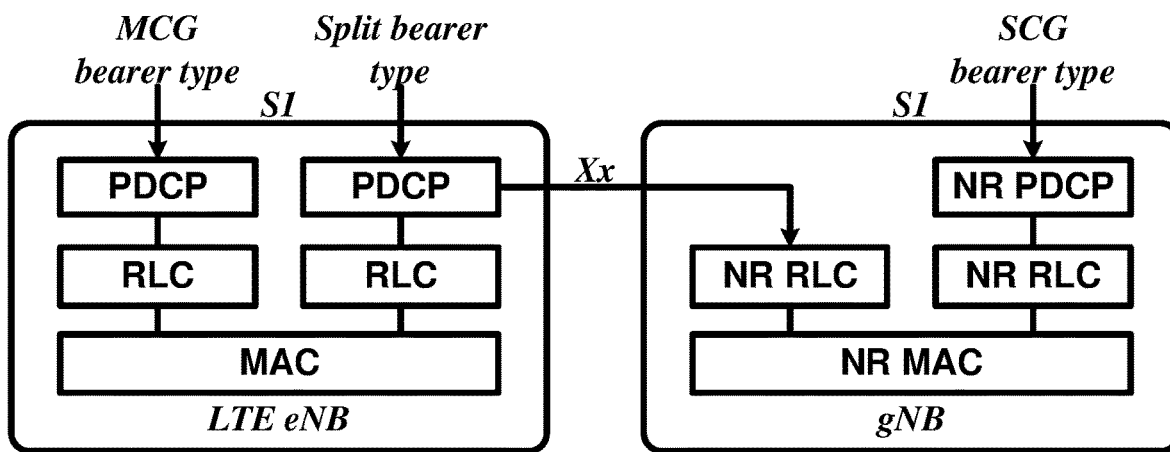
FIG. 12A, FIG. 12B, and FIG. 12C are example diagrams for radio protocol structures of tight interworking bearers as per an aspect of an embodiment of the present invention.
Figure 12B:
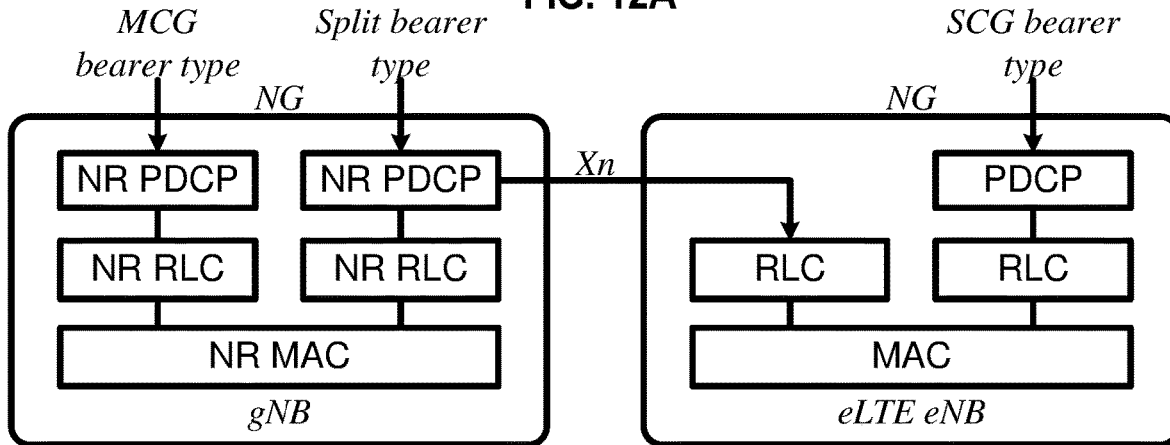
Figure 12C:
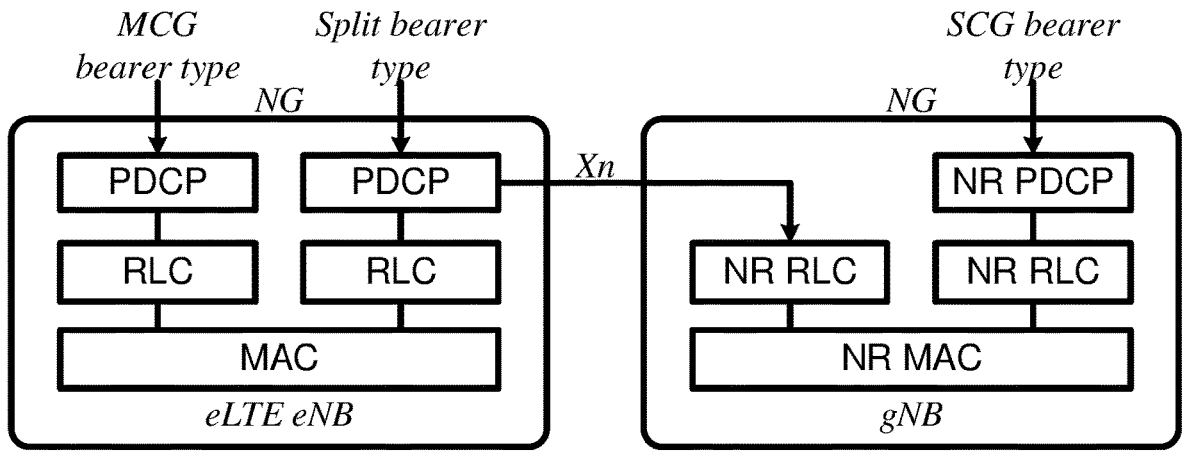

FIG. 12A, FIG. 12B, and FIG. 12C are example diagrams for radio protocol structures of tight interworking bearers as per an aspect of an embodiment of the present invention. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three alternatives may exist, an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station.

Tight interworking may also be described as having at least one bearer configured to use radio resources provided by the secondary base station. Tight interworking may or may not be configured/implemented in example embodiments of the invention.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g, based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

Figure 13A:
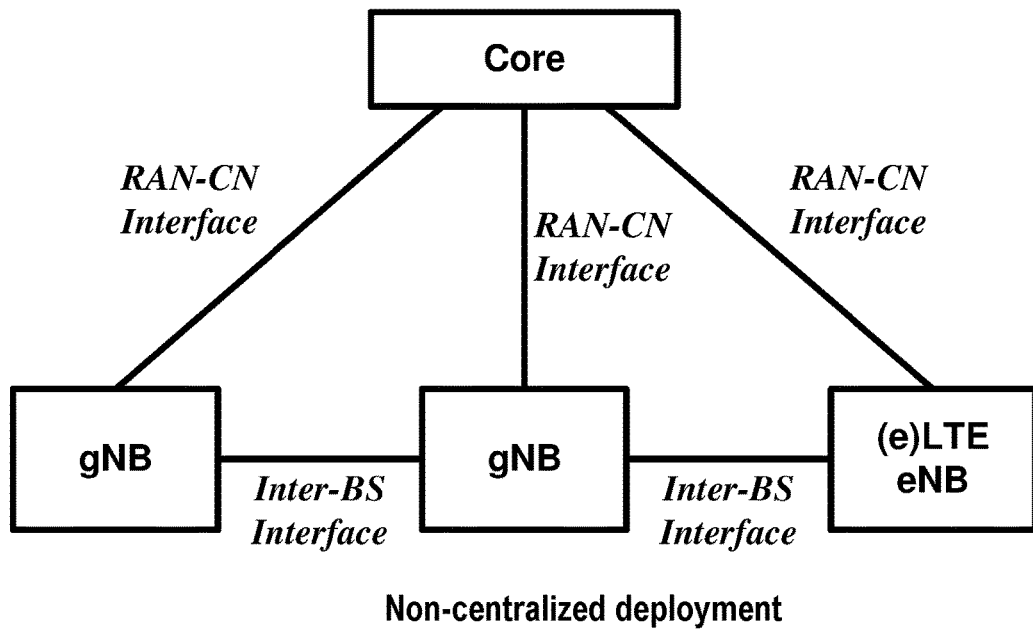
FIG. 13A and FIG. 13B are example diagrams for gNB deployment scenarios as per an aspect of an embodiment of the present invention.
Figure 13B:
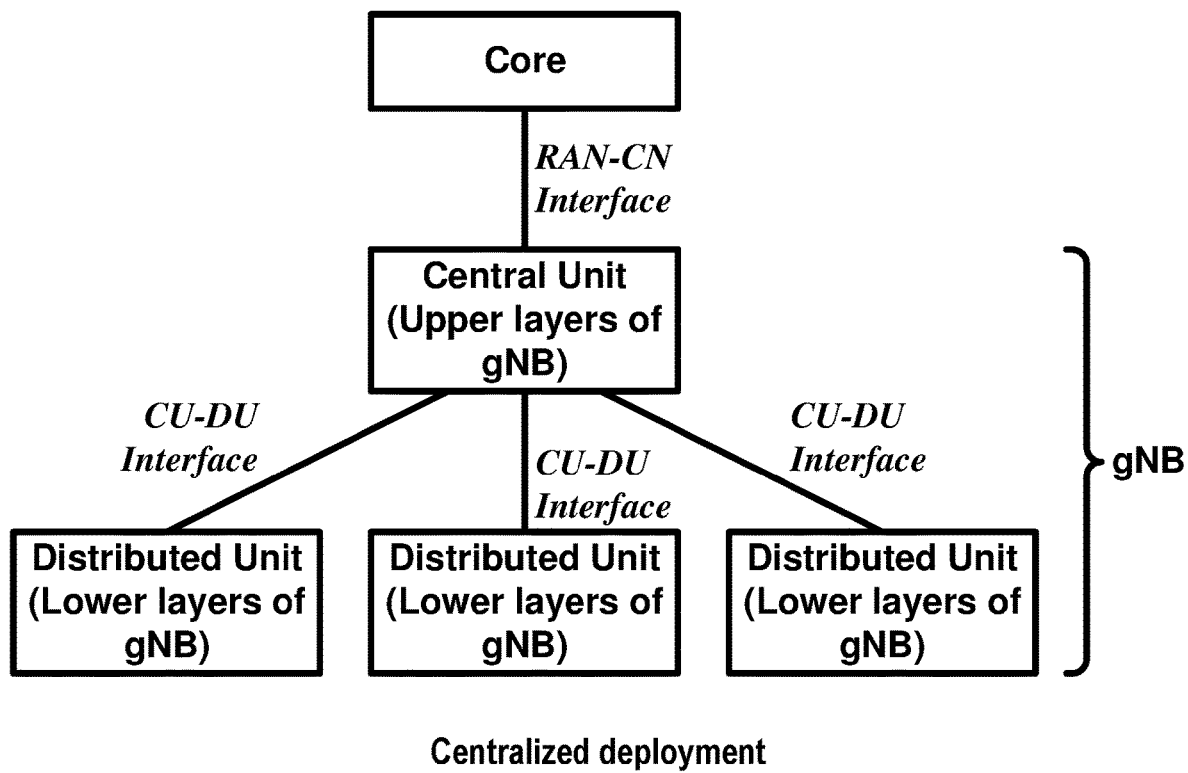

FIG. 13A and FIG. 13B are example diagrams for gNB deployment scenarios as per an aspect of an embodiment of the present invention. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
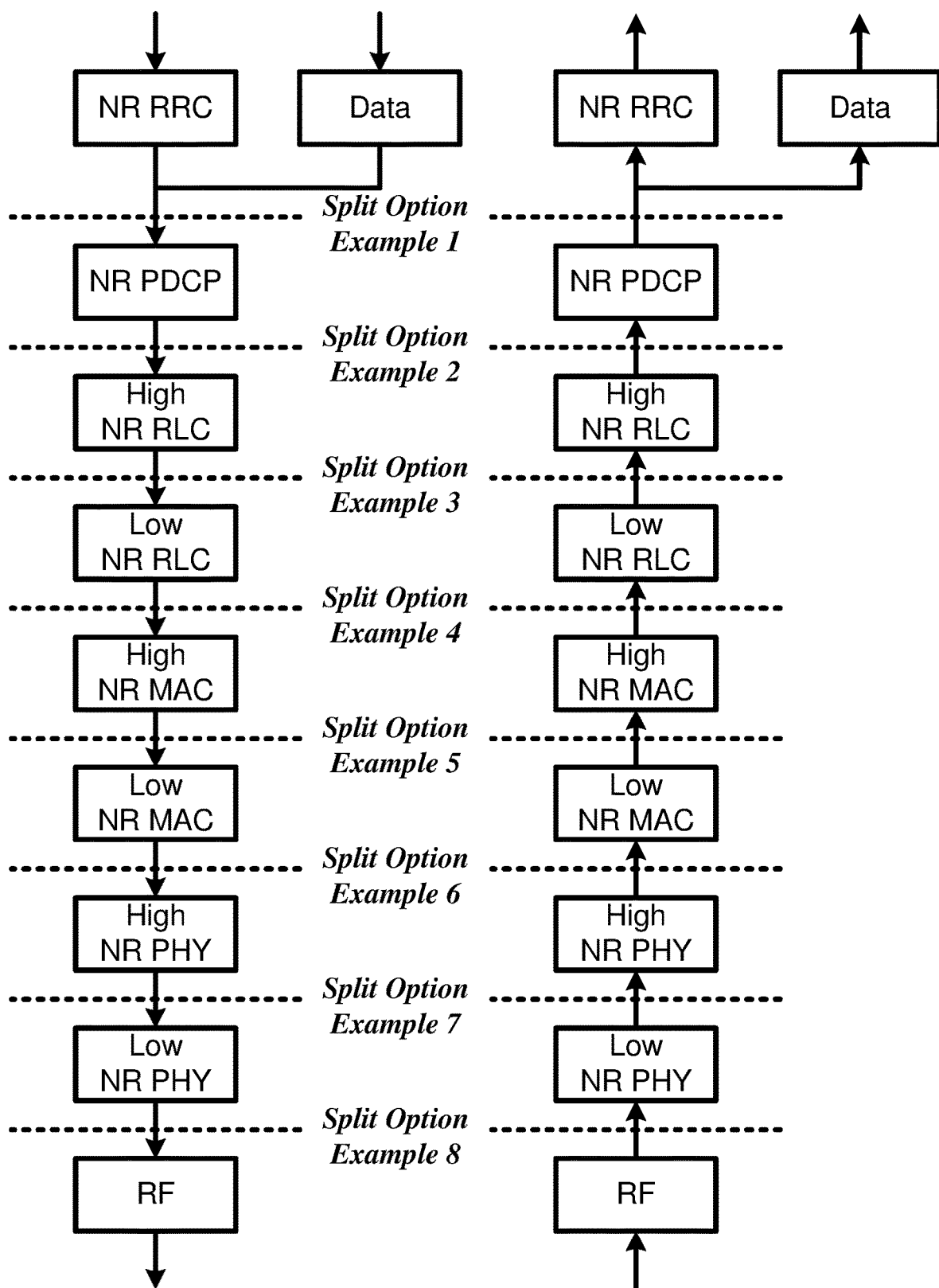
FIG. 14 is an example diagram for functional split option examples of the centralized gNB deployment scenario as per an aspect of an embodiment of the present invention.

FIG. 14 is an example diagram for different functional split option examples of the centralized gNB deployment scenario as per an aspect of an embodiment of the present invention. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, each DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

In an example embodiment, the new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, by one or more slice ID(s) or NSSAI(s) provided by a UE or a NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

In existing technologies, if a gNB is split into a gNB-CU and a gNB-DU, a gNB-CU may provide at least an RRC layer and a gNB-DU may provide at least one of a physical layer and/or a MAC layer. In an implementation of existing technologies, a gNB-CU may have information of packet transmission status (e.g. based on PDCP layer packet transmission or reception monitoring) and/or network traffic load information (e.g. based on gNB-CU load status and/or based on PDCP layer packet monitoring). A gNB-CU may receive channel measurement report from a UE and/or a gNB-DU. When PDCP packet duplication is configured for at least one bearer of a UE, a gNB-DU may transmit an uplink duplication activation/deactivation indication to a UE. In an implementation of existing technologies, a gNB-CU may activate/deactivate a downlink PDCP packet duplication by starting transmission of duplicated PDCP packet to a gNB-DU and/or a UE. To support PDCP packet duplication, a gNB-DU may configure cells for packet transmission and/or duplicated packet transmission. In an implementation of existing technologies, the traffic status or measurement information of a gNB-CU and the uplink PDCP packet duplication activation/deactivation of a gNB-DU may be misaligned. In existing technologies, downlink PDCP packet duplication activation/deactivation of a gNB-CU may disturb gNB-DU's proper cell coordination for packet transmission. Misalignment among the status measurement information, packet duplication activation/deactivation, and/or cell configurations may increase inappropriate PDCP packet duplication operation. The existing technology may decrease packet transmission reliability and resource utilization efficiency. There is a need to develop signaling mechanisms among a gNB-CU, a gNB-DU and a wireless device so that a gNB-CU and/or a gNB-DU can properly activation/deactivate PDCP packet duplication and configure cells for packet duplication.

Example embodiments enhance PDCP packet duplication activation/deactivation mechanism of a gNB-CU and/or a gNB-DU when a gNB-DU provides lower layer functions of a gNB. Example embodiments may enhance interactions of a gNB-CU and a gNB-DU to take into account traffic status and/or channel status for PDCP packet duplication activation/deactivation of a UE. Example embodiments may improve communication of a gNB-CU and a gNB-DU to configure cells for PDCP packet duplication of a UE. Example embodiments may increase connection reliability and resource utilization efficiency of wireless devices by enhancing packet duplication activation/deactivation mechanisms of a gNB-CU and a gNB-DU for UEs.

In an example embodiment, a base station may comprise a gNB, eNB, an RNC, a home eNB, a home gNB, NG-eNB, Integrated Access and Backhaul (IAB) node, a relay node, an access point and/or any type of base stations or access points communicating with one or more wireless devices. Example embodiments for an example base station may be applied to other types of base stations. For example an embodiment on gNB can be applied to implementation of IAB node. In an example embodiment, a gNB-CU may be interpreted as a centralized base station (e.g. eNB-CU, RNC, access point central unit, relay donor node, integrated access and backhaul (IAB) donor node, and/or the like). In an example embodiment, a gNB-DU may be interpreted as a distributed base station (e.g. eNB-DU, RRH, transmission and reception point (TRP), access point distributed unit, relay node, IAB) node, and/or the like).

When duplication is configured for a radio bearer by RRC, an additional RLC entity and/or an additional logical channel may be added to the radio bearer to handle the duplicated PDCP PDUs. Duplication at PDCP therefore may consist in sending the same PDCP PDUs twice: once on the original RLC entity and a second time on the additional RLC entity. When doing so, the original PDCP PDU and the corresponding duplicate may not be transmitted on the same carrier. The two different logical channels may belong to the same MAC entity (CA, carrier aggregation) and/or to different ones (DC, dual connectivity). In the former case, logical channel mapping restrictions may be used in MAC to ensure that the logical channel carrying the original PDCP PDUs and/or logical channel carrying the corresponding duplicates may not be sent on the same carrier.

Once PDCP packet duplication is configured, duplication may be activated and/or de-activated per DRB by means of a MAC control element (MAC CE): In CA, when duplication is de-activated, the logical channel mapping restrictions may be lifted; and/or in DC, the UE may apply the MAC CE commands regardless of their origin (MCG or SCG).

In an example, a base station may comprise a central RAN entity and one or more distributed RAN entities. A distributed RAN entity of the one or more distributed RAN entity may serve at least one cell. The central RAN entity may provide at least a radio resource control (RRC) functionality and/or a packet data convergence protocol (PDCP) layer functionality. The distributed RAN entity may provide at least a radio link control (RLC) layer functionality, a medium access control (MAC) layer functionality, and/or a physical (PHY) layer functionality.

An F1 interface (e.g. a logical direct interface) may be setup between the central RAN entity and the distributed RAN entity. The F1 interface may comprise a user plane interface and/or a control plane interface. RRC messages may be transmitted from the central RAN entity to a wireless device or from a wireless device to the central RAN entity via the distributed RAN entity. Data packets may be transmitted from the central RAN entity to a wireless device or from a wireless device to the central RAN entity via the distributed RAN entity. In an example, data packets transmitted over the F1 interface may be PDCP layer packets. In an example, RRC messages transmitted over the F1 interface may be conveyed by an F1 interface message, and/or the RRC messages conveyed by the F1 interface message may be one or more PDCP layer packets associated with one or more signaling radio bearers.

Figure 31:
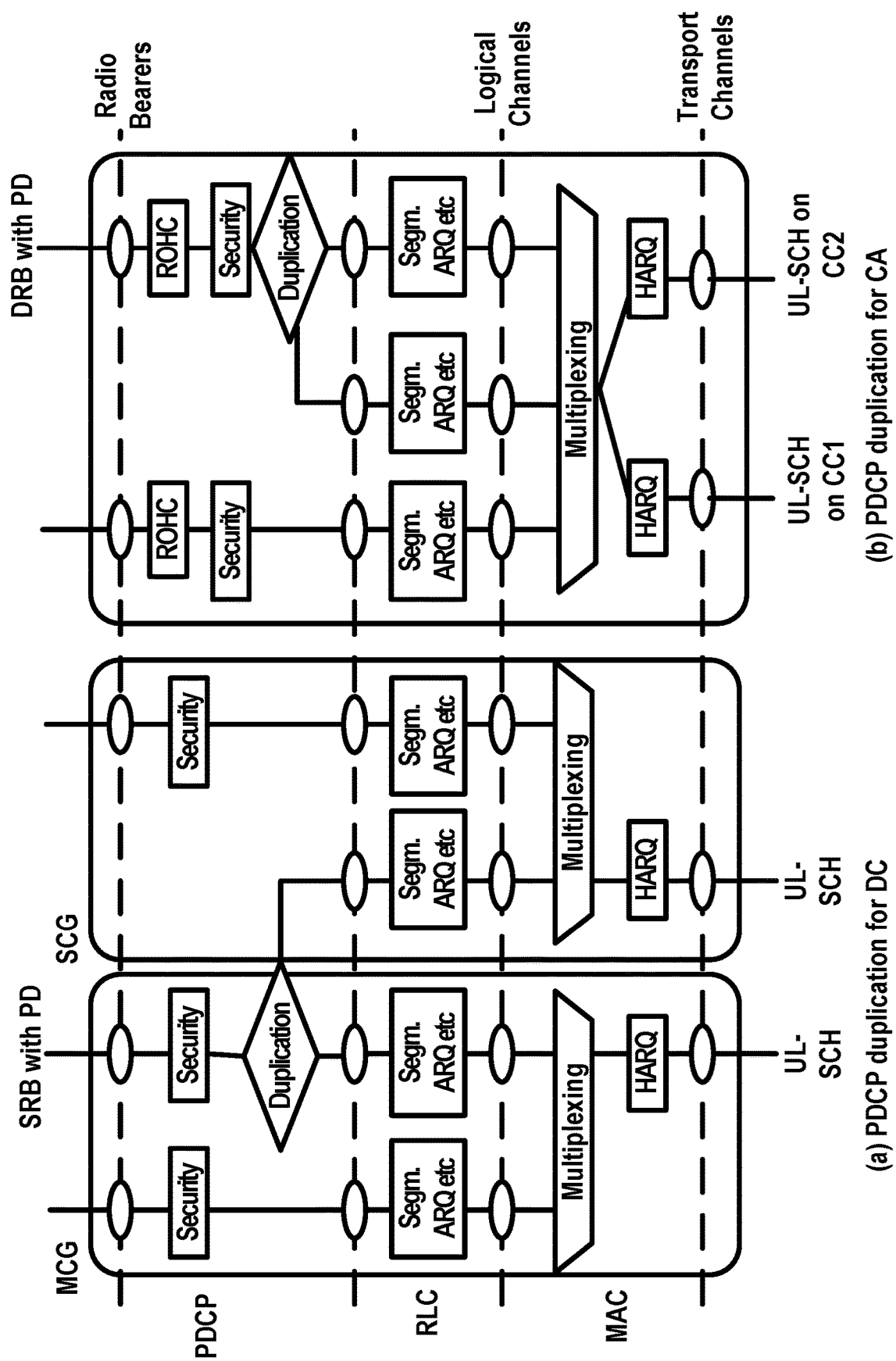
FIG. 31 is an example diagram of an aspect of an embodiment of the present disclosure.

In an example embodiment, as shown in FIG. 31, Packet Data Convergence Protocol (PDCP) layer packets may be duplicated and transmitted via a radio interface (air interface, radio bearer, logical channel, RLC channel, and/or the like). A PDCP packet duplication for a bearer (e.g. signaling radio bearer (SRB), data radio bearer, SRB0, SRB1, SRB2, and/or the like) may be configured via one or more Radio Resource Control (RRC) layer signaling messages for a wireless device, and/or via one or more RRC control signaling for a distributed Radio Access Network (RAN) entity (DU, Distributed Unit) if a base station is split into a centralized RAN entity (CU, Central Unit) and one or more distributed RAN entity. If a PDCP packet duplication for a bearer is configured, a base station may activate or deactivate the PDCP packet duplication based on a radio channel condition, a traffic load, and/or the like. In an example, a central RAN entity may indicate to a distributed RAN entity that a PDCP packet duplication of downlink packet transmission for a bearer is activated or deactivated, and the distributed RAN entity may determine one or more cells employed to transmit duplicated PDCP packets and/or original PDCP packets based on the activation or deactivation indication.

In an example, as shown in FIG. 16, FIG. 17, FIG. 18, and FIG. 19, a first RAN entity (e.g. a distributed RAN entity, a secondary base station, an S-Node, an S-NR-RAN, and/or the like) may receive, from a second RAN entity (e.g. a central RAN entity, a master base station, an M-Node, an M-NR-RAN, and/or the like), a first message comprising packet flow configuration parameters for a wireless device. In an example, the first message may be an initial UE context setup request message, a bearer setup request message, a bearer modification request message, an RRC control message, and/or the like. The first message may be transmitted via a direct interface (e.g. F1 interface) between the first RAN entity and the second RAN entity. The first message may further comprise multiple packet flow identifiers of multiple packet flows, a wireless device identifier of the wireless device, QoS information of the multiple packet flows, an aggregated maximum bit rate (AMBR) for the wireless device in the first RAN entity and/or in the second RAN entity, security information, and/or the like.

Figure 15:
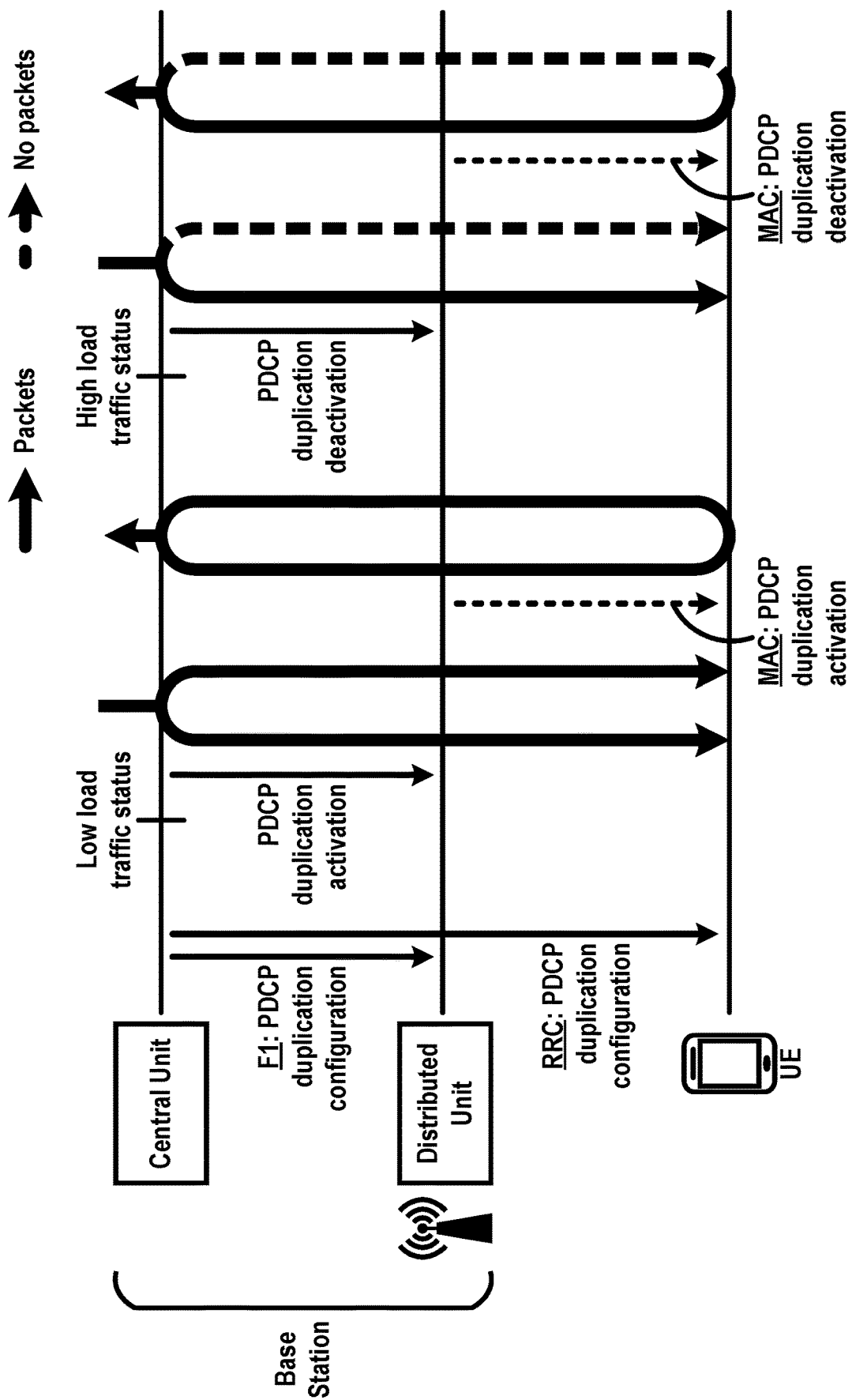
FIG. 15 is an example diagram of an aspect of an embodiment of the present disclosure.
Figure 16:
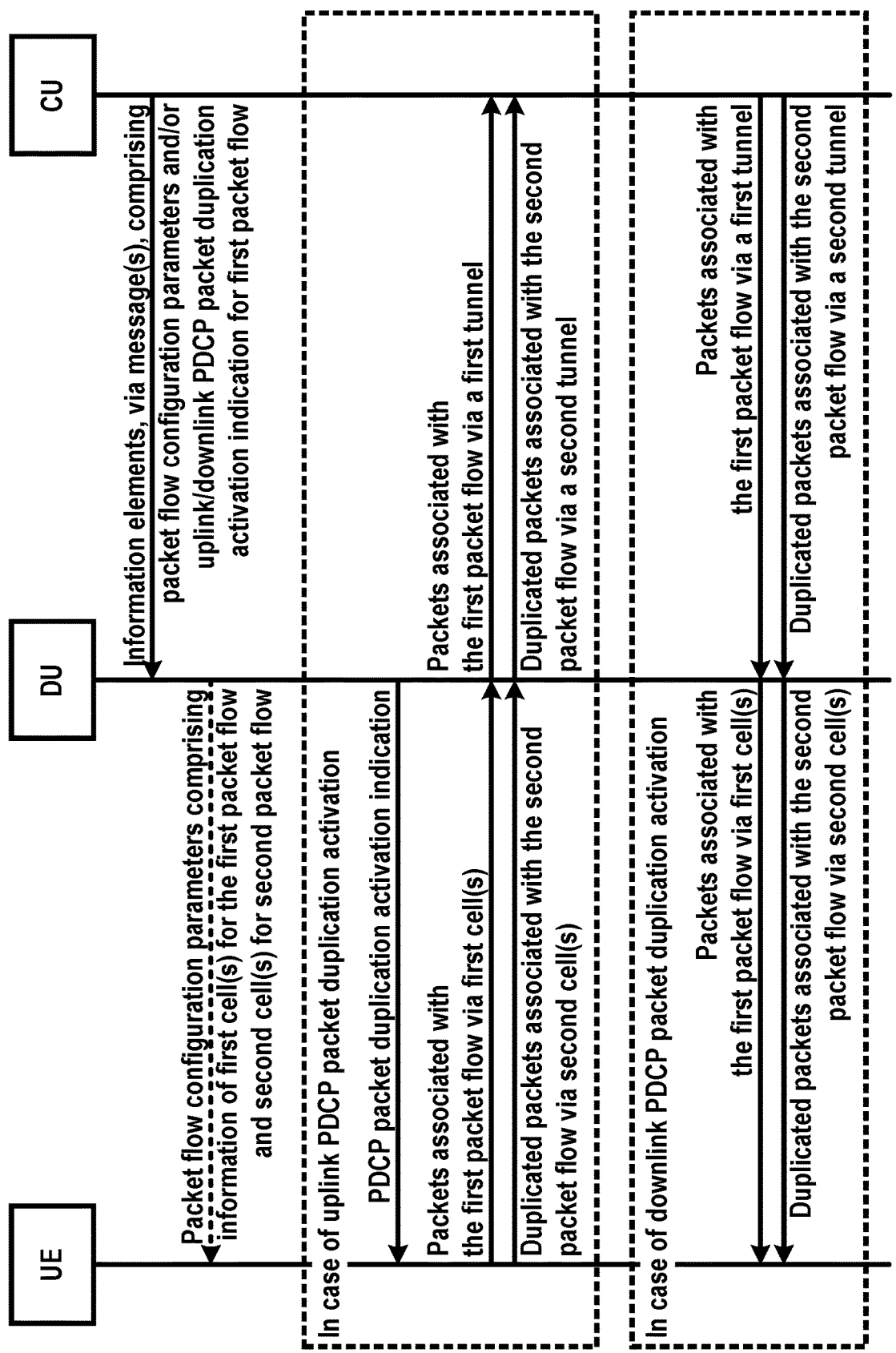
FIG. 16 is an example diagram of an aspect of an embodiment of the present disclosure.
Figure 17:
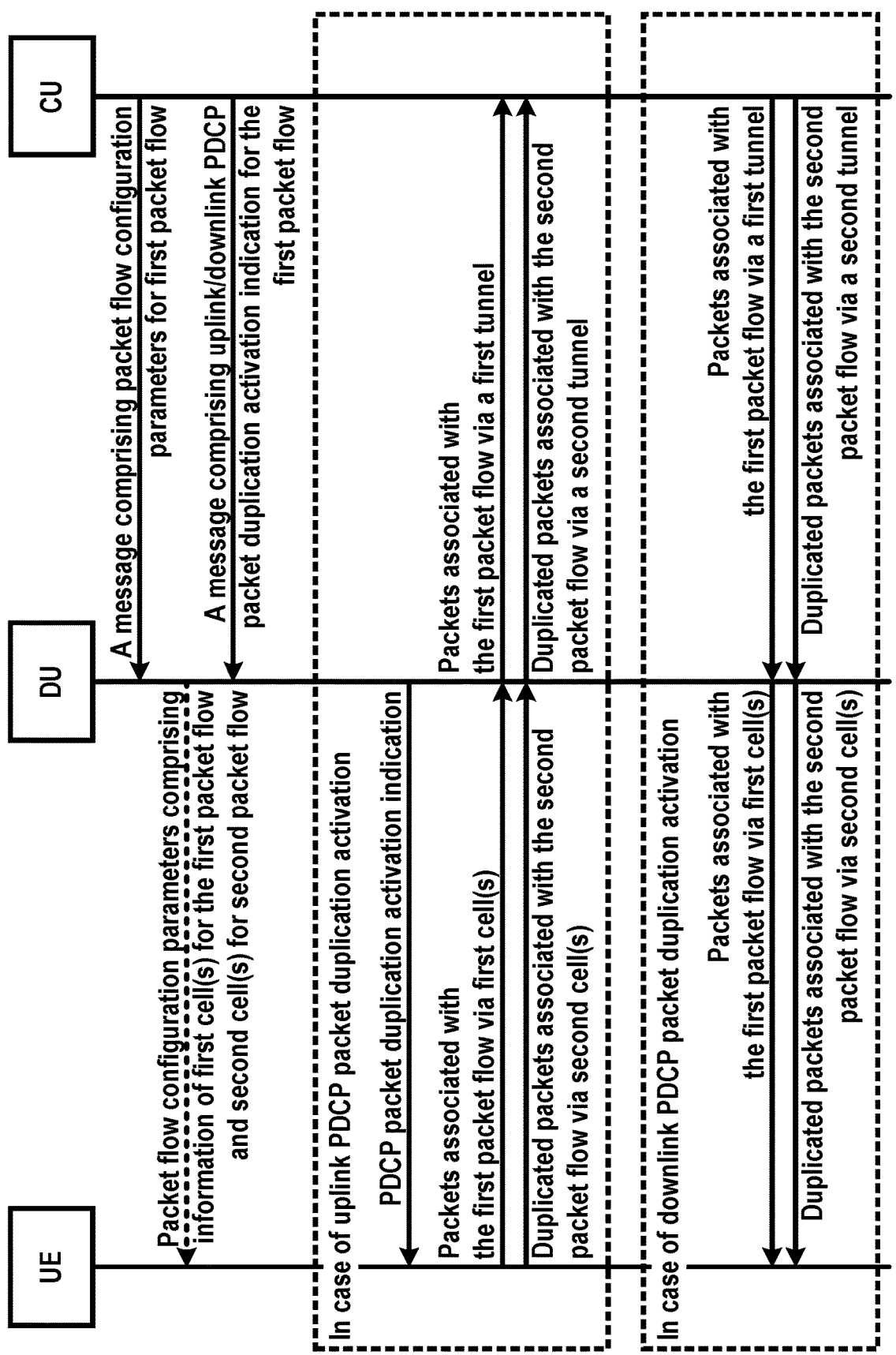
FIG. 17 is an example diagram of an aspect of an embodiment of the present disclosure.
Figure 18:
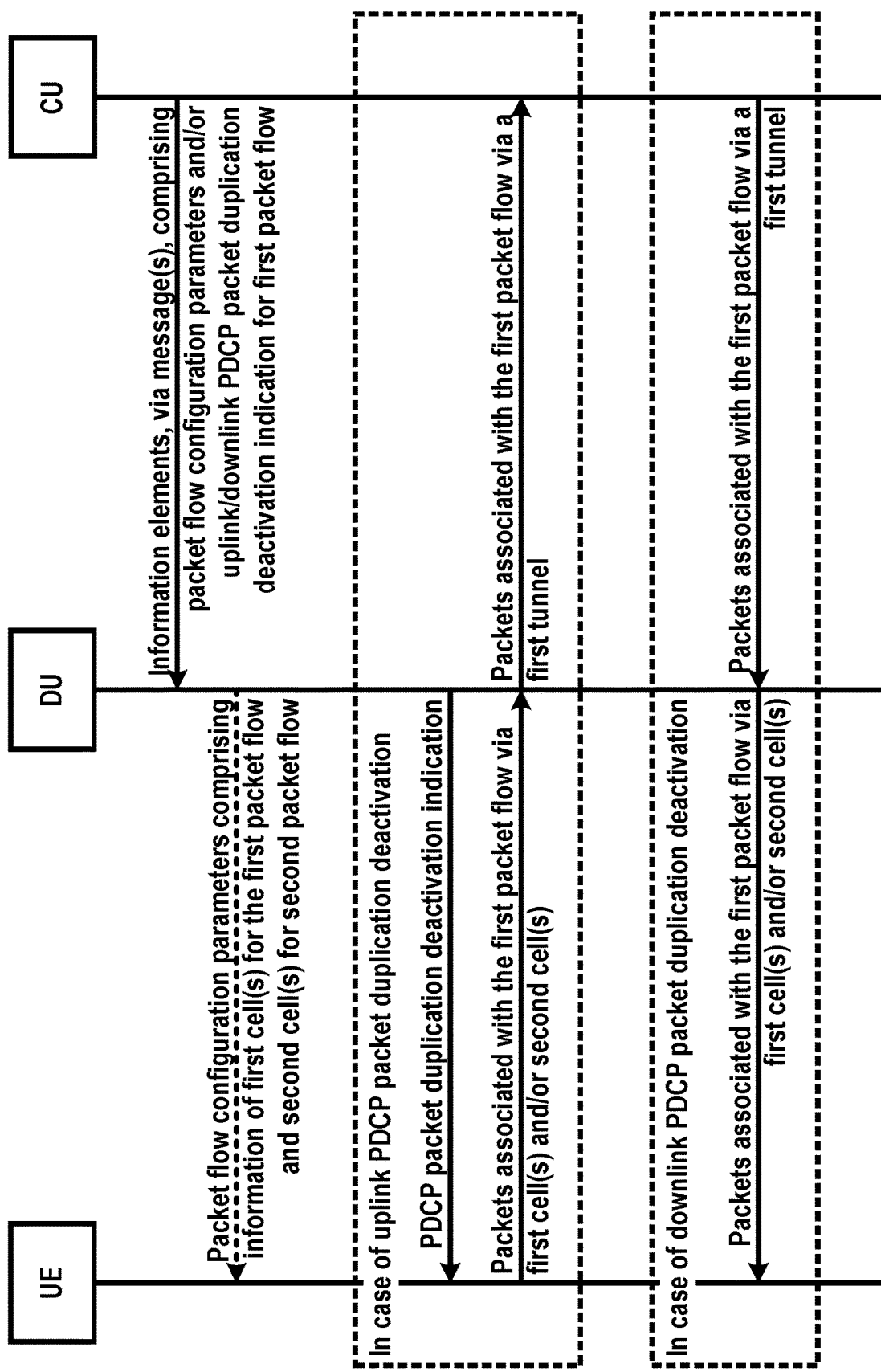
FIG. 18 is an example diagram of an aspect of an embodiment of the present disclosure.
Figure 19:
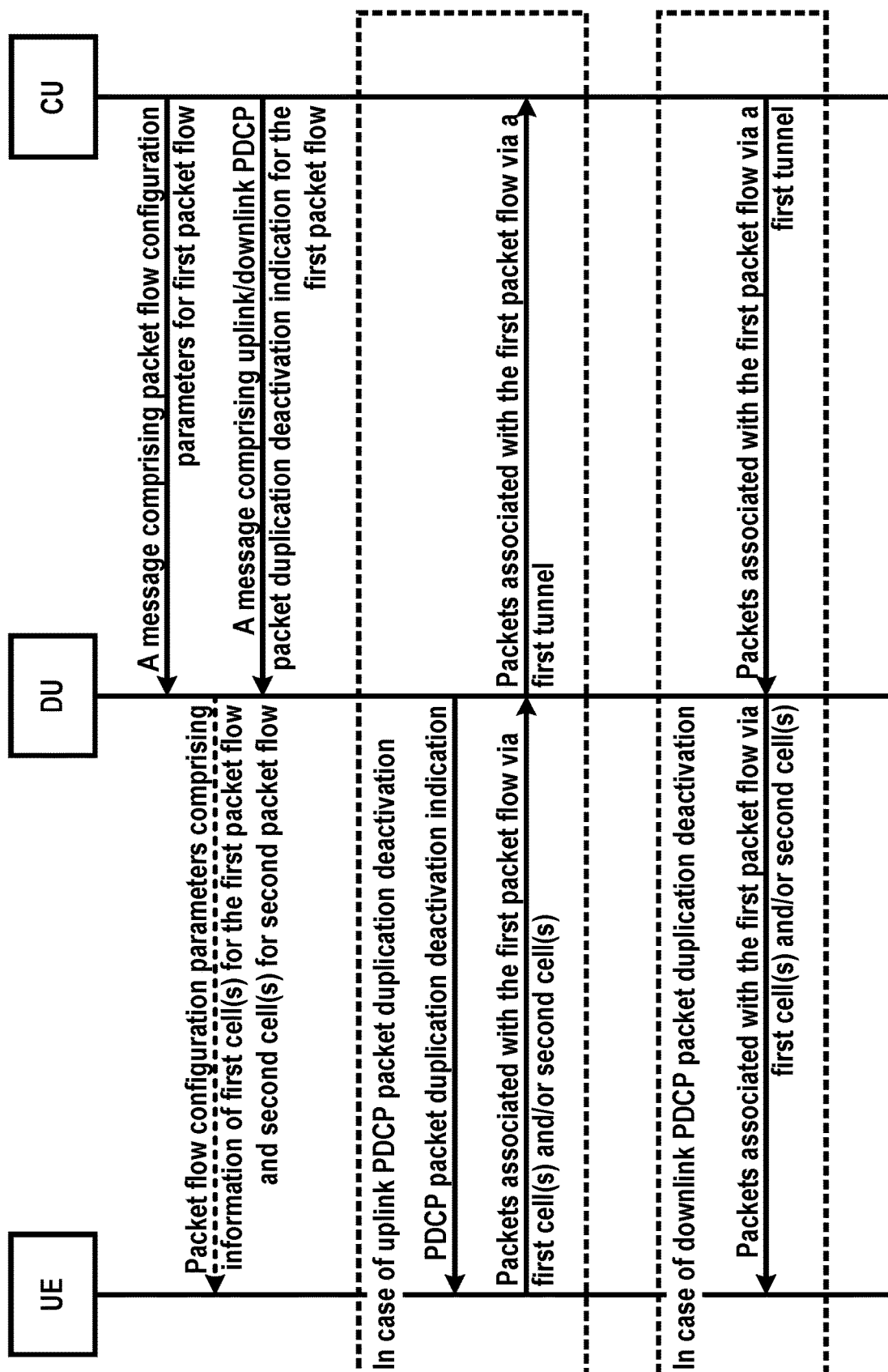
FIG. 19 is an example diagram of an aspect of an embodiment of the present disclosure.
Figure 20:
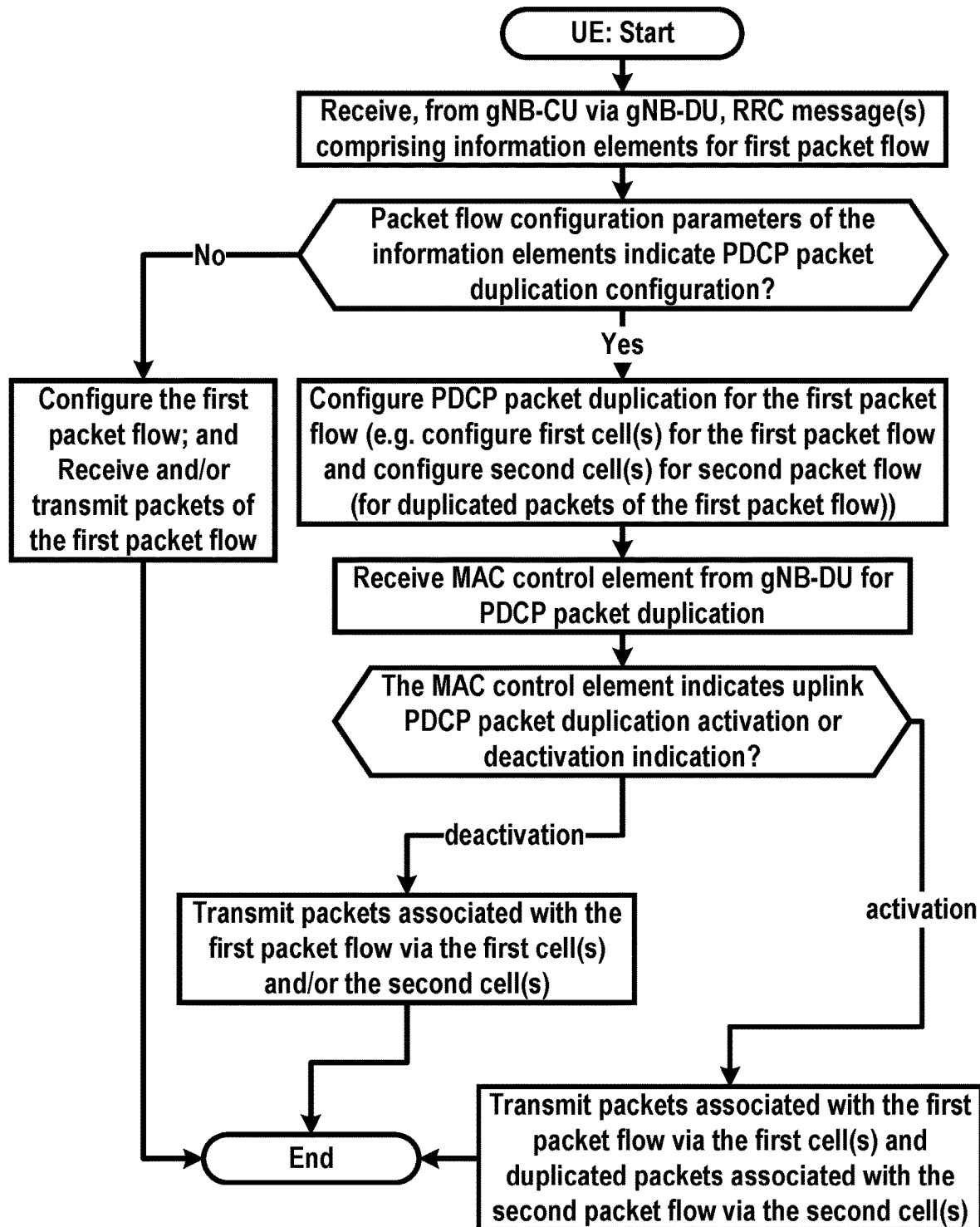
FIG. 20 is an example diagram of an aspect of an embodiment of the present disclosure.
Figure 21:
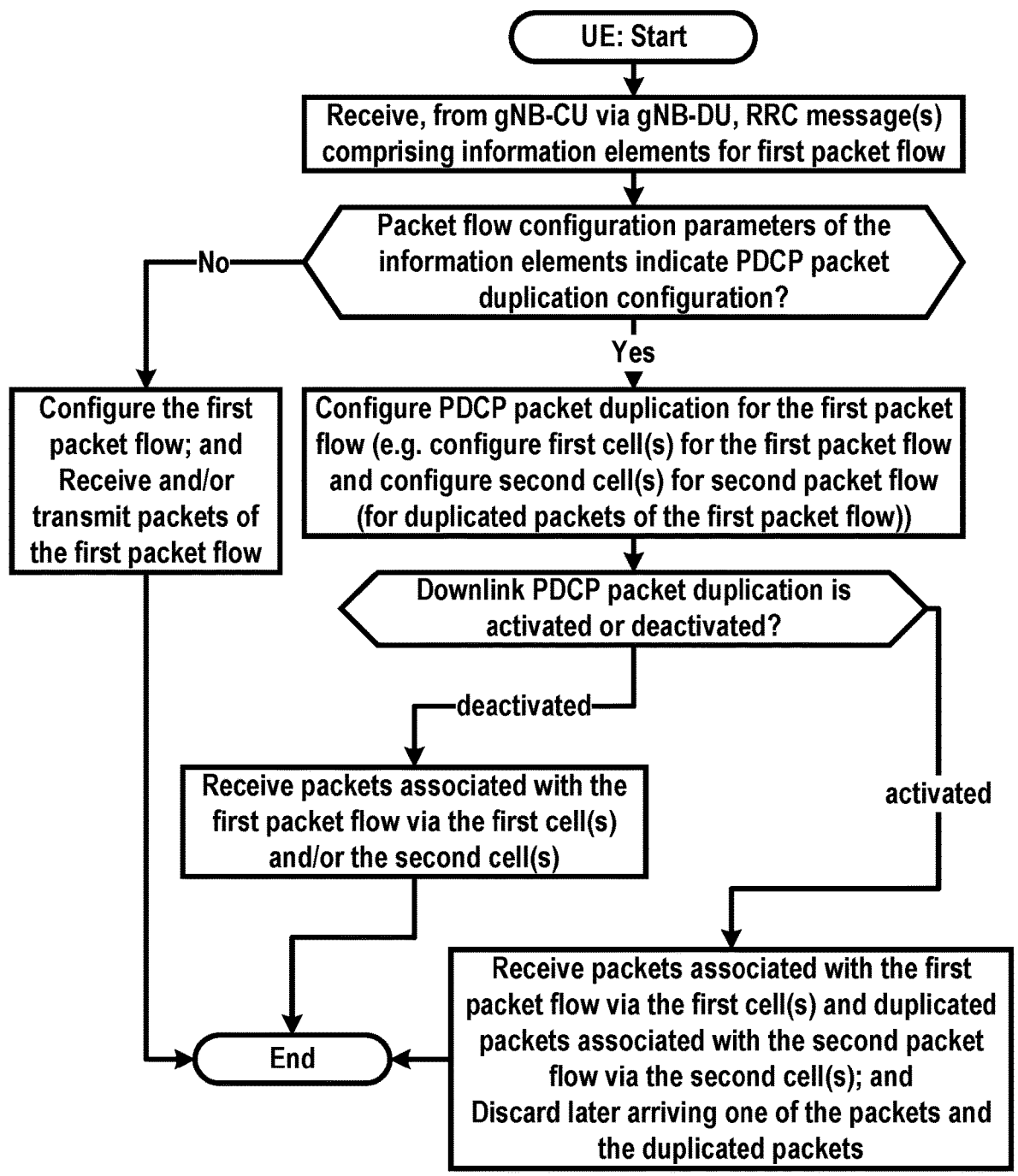
FIG. 21 is an example diagram of an aspect of an embodiment of the present disclosure.
Figure 22:
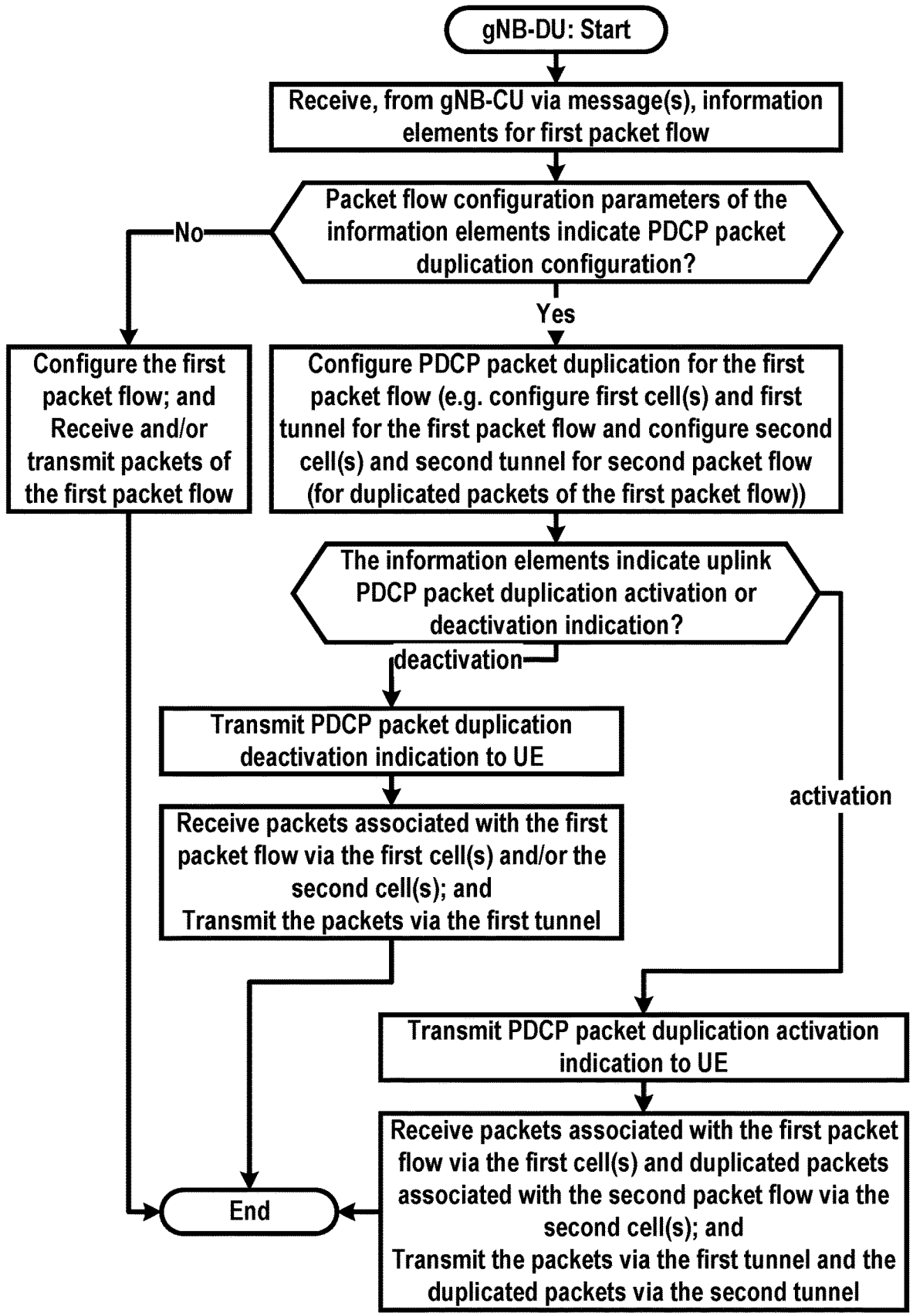
FIG. 22 is an example diagram of an aspect of an embodiment of the present disclosure.
Figure 23:
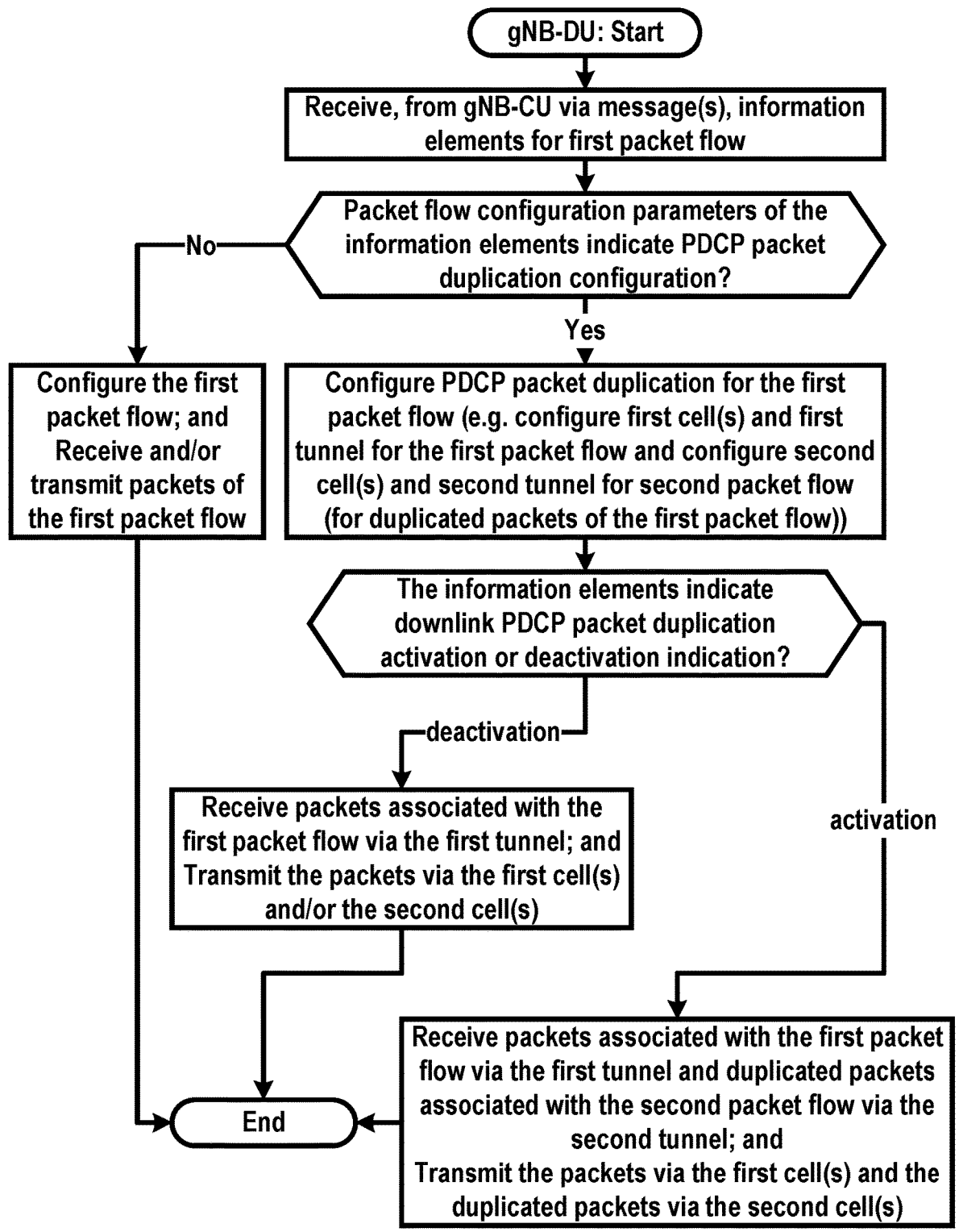
FIG. 23 is an example diagram of an aspect of an embodiment of the present disclosure.
Figure 24:
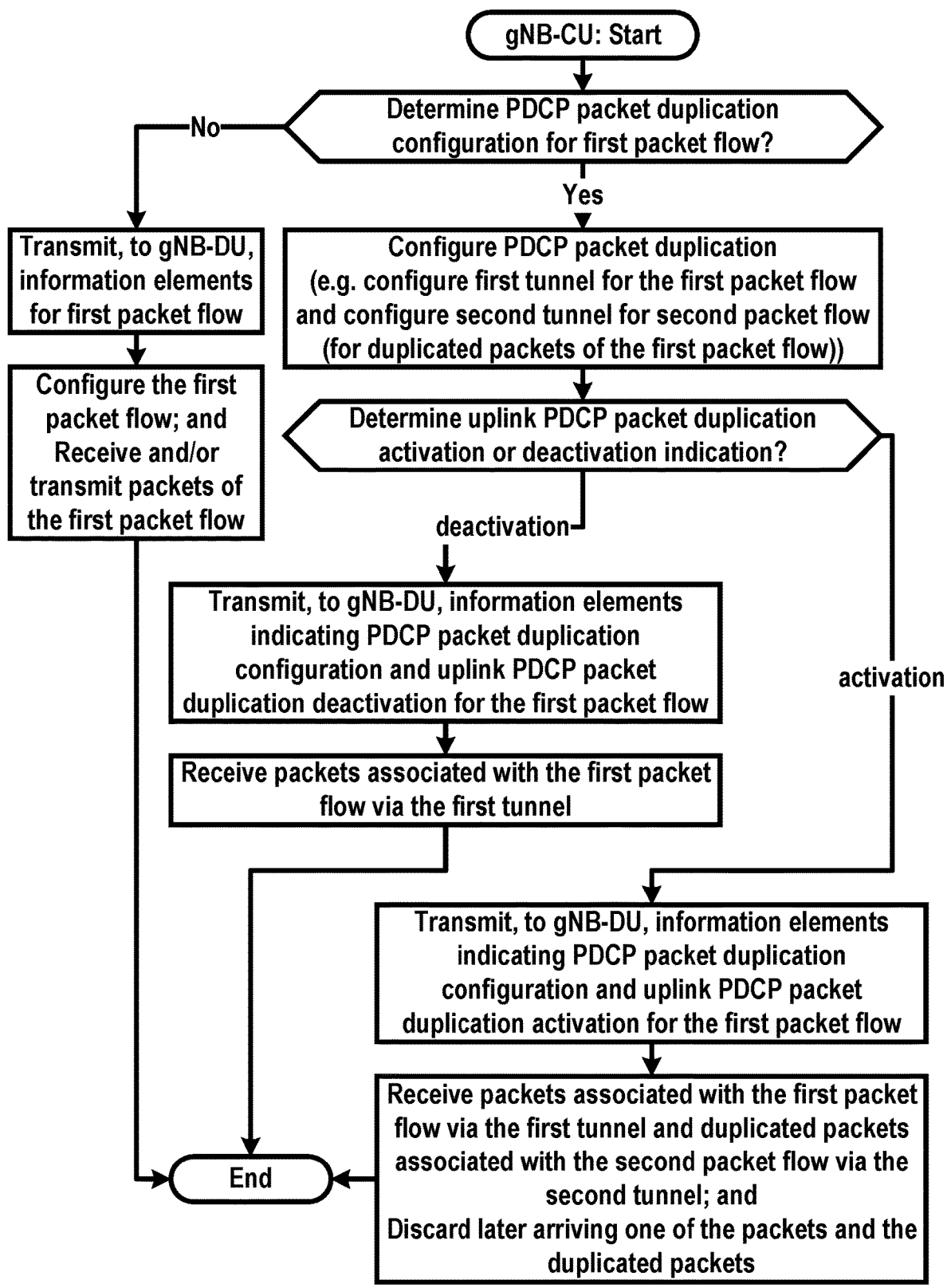
FIG. 24 is an example diagram of an aspect of an embodiment of the present disclosure.
Figure 25:
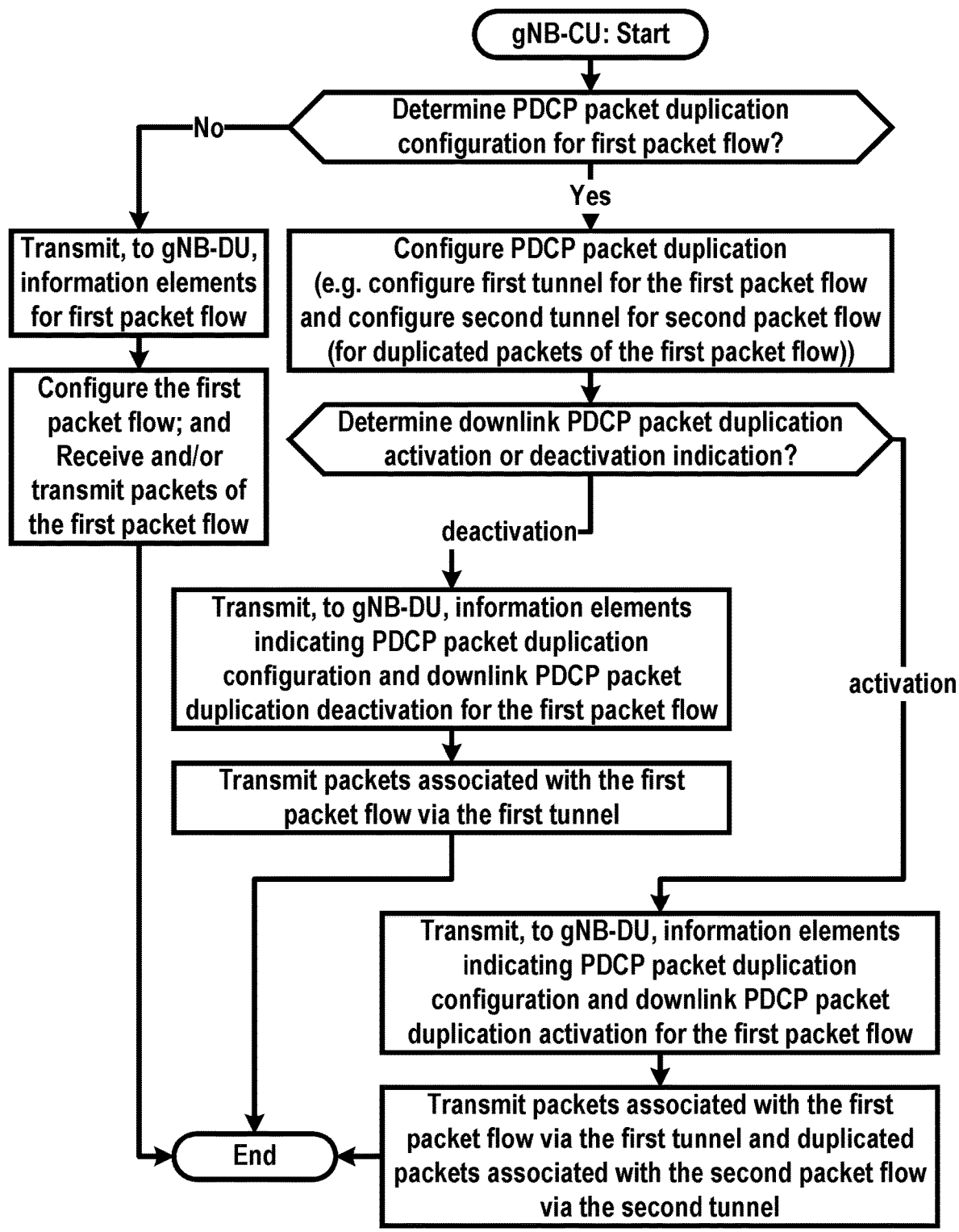
FIG. 25 is an example diagram of an aspect of an embodiment of the present disclosure.
Figure 26:
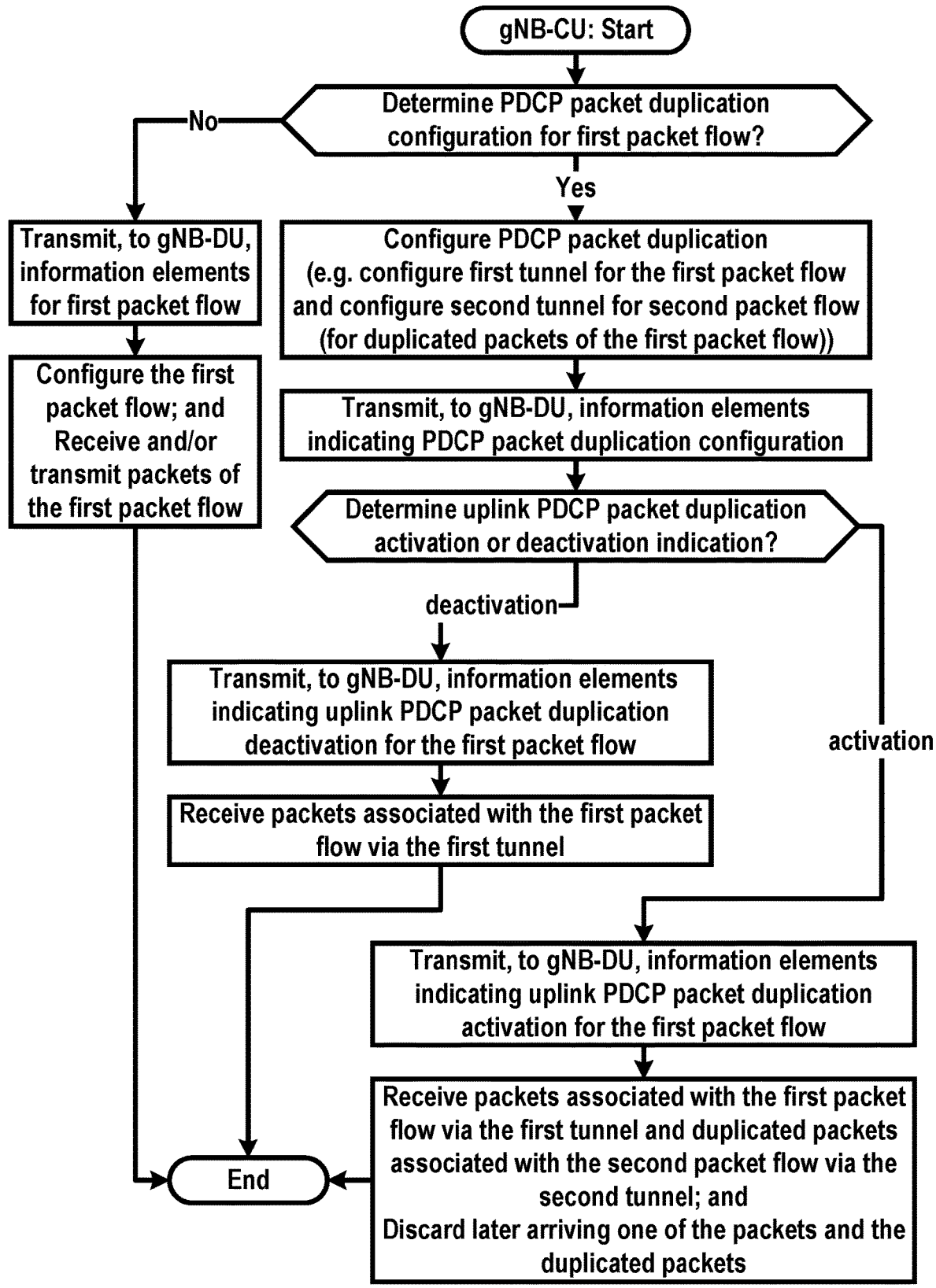
FIG. 26 is an example diagram of an aspect of an embodiment of the present disclosure.
Figure 27:
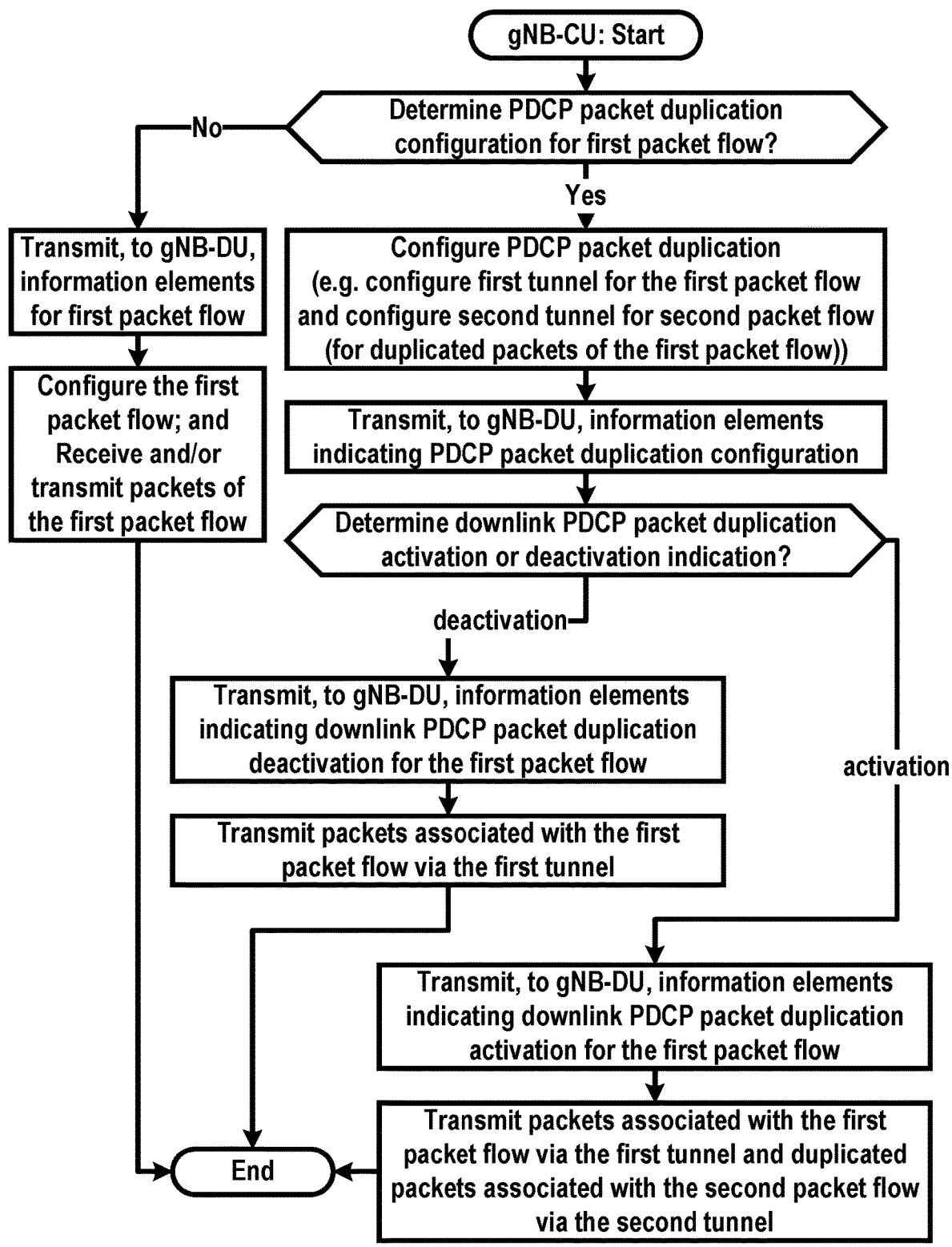
FIG. 27 is an example diagram of an aspect of an embodiment of the present disclosure.

In an example, as shown in FIG. 15, the packet flow configuration parameters may be associated with multiple packet flows for the wireless device. The packet flow configuration parameters may comprise a packet duplication indication indicating that packets of a first packet flow (e.g. RLC channel, bearer, logical channel, QoS flow, PDU session, and/or the like) are duplications of packets of a second packet flow (e.g. RLC channel, bearer, logical channel, QoS flow, PDU session, and/or the like). In an example, the packet flow configuration parameters may further comprise an indication indicating that the first packet flow and the second packet flow are associated with a first bearer (e.g. radio bearer, data radio bearer, signaling radio bearer, QoS flow, PDU session, and/or the like). In an example, the first packet flow and the second packet flow may belong to the multiple packet flows. In an example, the first packet flow may be employed to transmit duplicated PDCP packets (or original PDCP packets), and/or the second packet flow may be employed to transmit original PDCP packets (or duplicated PDCP packets). In an example, there may not be an explicit differentiation between original PDCP packets and duplicated PDCP packets.

In an example, the first packet flow may be associated with a first tunnel, and/or the second packet flow may be associated with a second tunnel. The first tunnel and/or the second tunnel may be established between the first RAN entity and the second RAN entity.

In an example, the packet flow configuration parameters may further comprise one or more first cell identifiers of one or more first cells and/or one or more second cell identifier of one or more second cells. The one or more information elements of the packet flow configuration parameters may be configured to indicate that the one or more first cells are employed to transmit packets associated with the first packet flow, and/or that the one or more second cells are employed to transmit packets associated with the second packet flow. In an example, the one or more first cells may be different from the one or more second cells. This cell configuration may support that original PDCP packets and duplicated PDCP packets are transmitted via different carriers (via different cells) each other. The benefit of transmitting original PDCP packets and duplicated PDCP packets via different carriers (via different cells) may be a diversity gain by diversifying paths (channels) for packet transmissions. In an example, when channel quality of the one or more second cells for the second packet flow gets worse, the wireless device may be able to receive duplicated packets via the one or more first cells for the first packet flow if channel quality of the one or more first cells is good.

In an example, the packet flow configuration parameters may further comprise an indication indicating that a PDCP packet duplication associated with the first packet flow and the second packet flow is activated or deactivated initially (e.g. when the first RAN entity receives the first message from the second RAN entity).

In an example, the second RAN entity may generate one or more first PDCP PDU packets for the first packet flow and/or generate one or more second PDCP PDU packets for the second packet flow. The one or more first PDCP PDU packets and the one or more second PDCP PDU packets may be generated from one or more PDCP SDU packets of the first bearer associated with the first packet flow and/or the second packet flow. In an example, the one or more first PDCP PDU packets and the one or more second PDCP PDU packets are duplications of each other. The second RAN entity may transmit, to the first RAN entity, the one or more first PDCP PDU packets via the first packet flow and/or the one or more second PDCP PDU packets via the second packet flow.

In response to receiving the one or more first PDCP PDU packets and/or the one or more second PDCP PDU packets, the first RAN entity may transmit, to the wireless device, the first PDCP PDU packets of the first packet flow via the one or more first cells and the second PDCP PDU packets of the second packet flow via the one or more second cells. In an example, the one or more first cells may be different from the one or more second cells.

In an example, a first RLC entity of the first RAN entity, for the first packet flow, may receive the one or more first PDCP PDU packets via the F1 interface (the direct interface between the first RAN entity and the second RAN entity), and/or may transmit, to a MAC entity of the first RAN entity, one or more first RLC PDU packets generated from the one or more first PDCP PDU packets. A second RLC entity of the second RAN entity, for the second packet flow, may receive the one or more second PDCP PDU packets via the F1 interface (the direct interface between the first RAN entity and the second RAN entity), and/or may transmit, to the MAC entity of the first RAN entity, one or more second RLC PDU packets generated from the one or more second PDCP PDU packets. The MAC entity may select at least one of the one or more first cells for transmitting the one or more first RLC PDU packets, and/or may select at least one of the one or more second cells for transmitting the one or more second RLC PDU packets. A physical layer may transmit, to the wireless device and via an air interface, packets associated with the first packet flow via the one or more first cells and packets associated with the second packet flow via the one or more second cells.

In an example, as shown in FIG. 20, FIG. 21, FIG. 22, FIG. 23, FIG. 24, FIG. 25, FIG. 26, and FIG. 27, the first RAN entity may receive, from the second RAN entity, a packet duplication deactivation indication indicating deactivation of duplicating packets of the second packet flow (e.g. an indication of deactivating a PDCP packet duplication for the first bearer, transmitting packets only associated with the second packet flow, not transmitting packets associated with the first packet flow, and/or the like). In an example, the packet duplication deactivation indication may be transmitted via a control plane message through the F1 interface. The control plane message may be a packet flow (bearer) modification message, a packet flow (bearer) configuration update message, an RRC control message, and/or the like. In an example, the packet duplication deactivation indication may be transmitted via a user plane indication. The user plane indication may be an end marker packet (e.g. end marker PDU type packet), an end marker indication in a PDCP PDU packet header, and/or the like.

In an example, in response to receiving the packet duplication deactivation indication, the first RAN entity may enable packets of the second packet flow to be transmitted both the one or more first cells and the one or more second cells. The MAC entity of the first RAN entity may select at least one cell of the one or more first cells and/or the one or more second cells to transmit packets associated with the second packet flow.

In an example, when a PDCP packet duplication for the first bearer is deactivated, the first RAN entity may maintain configurations for the first packet flow (e.g. keep the first tunnel for the first packet flow, one or more UE contexts associated with the first packet flow, and/or the like).

In an example, the first RAN entity may transmit, to the second RAN entity, a request to deactivate duplicating packets of the second packet flow (e.g. to deactivate a PDCP packet duplication for the first bearer, to transmit packets only associated with the second packet flow, not to transmit packets associated with the first packet flow, and/or the like) at least based on a traffic load status, a radio channel status, a packet transmission policy, and/or the like of the first RAN entity. In an example, in response to receiving the request of a PDCP packet duplication deactivation, the second RAN entity may transmit the packet duplication deactivation indication to the first RAN entity.

In an example, the first RAN entity may receive, from the second RAN entity, a packet duplication activation indication indicating activation of duplicating packets of the second packet flow (e.g. an indication of activating a PDCP packet duplication for the first bearer, transmitting both packets associated with first packet flow and packets associated with the second packet flow, and/or the like). In an example, the packet duplication activation indication may be transmitted via a control plane message through the F1 interface. The control plane message may be a packet flow (bearer) modification message, a packet flow (bearer) configuration update message, an RRC control message, and/or the like. In an example, the packet duplication activation indication may be transmitted via a user plane indication. The user plane indication may be a start marker packet (e.g. start marker PDU type packet), a start marker indication in a PDCP PDU packet header, and/or the like. In an example, the user plane indication may be a packet associated with the first packet flow. By receiving a packet associated with the first packet flow, the first RAN entity may implicitly recognize that a PDCP packet duplication for the first bearer is activated.

In an example, in response to receiving the packet duplication activation indication, the first RAN entity may transmit, to the wireless device, packets associated with the first packet flow via the one or more first cells and packets associated with the second packet flow via the one or more second cells. In an example, the one or more first cells may be different from the one or more second cells. The MAC entity of the first RAN entity may select at least one cell of the one or more first cells to transmit packets associated with the first packet flow, and/or may select at least one cell of the one or more second cells to transmit packets associated with the second packet flow.

In an example, when a PDCP packet duplication for the first bearer is activated, the first RAN entity may utilize configurations maintained for the first packet flow (e.g. the first tunnel for the first packet flow, one or more UE contexts associated with the first packet flow, and/or the like).

In an example, the first RAN entity may transmit, to the second RAN entity, a request to activate duplicating packets of the second packet flow (e.g. to activate a PDCP packet duplication for the first bearer, to transmit both packets associated with the second packet flow and packets associated with the first packet flow, and/or the like) at least based on a traffic load status, a radio channel status, a packet transmission policy, and/or the like of the first RAN entity. In an example, in response to receiving the request of a PDCP packet duplication activation, the second RAN entity may transmit the packet duplication activation indication to the first RAN entity.

In an example, the first RAN entity may activate and/or deactivate a PDCP packet duplication for uplink packet transmissions of the first bearer associated with the first packet flow and/or the second packet flow. The MAC layer of the first RAN entity may transmit a Medium Access Control Control Element (MAC CE) message to the wireless device, the MAC CE message configured to indicate activation or deactivation of an uplink PDCP packet duplication associated with the first packet flow and/or the second packet flow. In response to receiving the MAC CE message, the wireless device may activate (e.g. transmit duplicated uplink PDCP packets and original uplink PDCP packets associated with the first packet flow and the second packet flow) or deactivate (e.g. suspend/stop transmitting uplink PDCP packets associated with one of the first packet flow or the second packet flow).

In an example, the first RAN entity may transmit, to the second RAN entity, a first indication indicating activation or deactivation of a PDCP packet duplication for uplink packet transmissions of the first bearer associated with the first packet flow and/or the second packet flow. The first indication may be transmitted via a bearer (packet flow) modification required message, a bearer (packet flow) configuration modification message, a RRC control modification message, and/or the like.

In an example, in response to receiving the MAC CE message, the wireless device may transmit, to the second RAN entity, a second indication indicating activation or deactivation of a PDCP packet duplication for uplink packet transmissions of the first bearer associated with the first packet flow and/or the second packet flow. The second indication may be transmitted via a user plane indication. In case of activation, the user plane indication may be a start marker packet (e.g. start marker PDU type packet), a start marker indication in a PDCP PDU packet header, and/or the like. In an example, the user plane indication may be a packet associated with the first packet flow. In an example, the user plane indication may be a packet associated with the first packet flow. By receiving a packet associated with the first packet flow, the second RAN entity may implicitly recognize that a uplink PDCP packet duplication for the first bearer is activated. In case of deactivation, the user plane indication may be an end marker packet (e.g. end marker PDU type packet), an end marker indication in a PDCP PDU packet header, and/or the like.

In an example, at least based on the first indication and/or the second indication, the second base station may determine further configurations associated with the first bearer, the first packet flow, and/or the second packet flow, PDCP duplication configurations, and/or the like configuration parameters.

In an example, a first RAN entity may receive, from a second RAN entity, packet flow configuration parameters associated with multiple packet flows for a wireless device. The packet flow configuration parameters may comprise a packet duplication indication indicating that packets of a first packet flow are duplications of packets of a second packet flow, wherein the first packet flow and the second packet flow may be of the multiple packet flows. The first RAN entity may transmit, to the wireless device, first packets of the first packet flow via one or more first cells and second packets of the second packet flow via one or more second cells, wherein the one or more first cells are different from the one or more second cells. The first RAN entity may receive a packet duplication deactivation indication indicating deactivation of duplicating packets of the second packet flow. The first RAN entity may transmit at least one packet associated with the second packet flow via one of the one or more first cells in response to the packet duplication deactivation indication.

In an example, the first RAN entity may receive, from the second RAN entity, a packet duplication activation indication indicating activation of duplicating packets of the second packet flow. The first RAN entity may transmit, to the wireless device, first packets of the first packet flow via the one or more first cells and second packets of the second packet flow via the one or more second cells. In an example, the first packet flow may be associated with a first tunnel, and/or the second packet flow may be associated with a second tunnel, wherein the first tunnel and the second tunnel may be established between the first RAN entity and the second RAN entity. The packet flow configuration parameters may further comprise a packet duplication activation indication indicating activation of duplicating packets of the second packet flow. The packet flow configuration parameters may further comprise a packet duplication deactivation indication indicating deactivation of duplicating packets of the second packet flow. In an example, the first RAN entity may keep configurations associated with the first packet flow when receiving the packet duplication deactivation indication. The first RAN entity may be a distributed RAN entity, and/or the second RAN entity may be a central RAN entity.

In existing technologies, if a PDCP packet duplication is configured for at least one bearer of a UE based on a dual connectivity (e.g. multi connectivity), packets of the at least one bearer may be transmitted via a master base station (e.g. MgNB, MeNB, M-Node, master gNB) and a duplication of the packets may be transmitted via a secondary base station (e.g. SgNB, SeNB, S-Node, secondary gNB). In existing technologies, a secondary base station may limit a packet transfer rate of a UE based on AMBR for the UE received from a master base station. When receiving same PDCP packets from a base station, a UE may discard later arriving duplicated packets. When receiving same PDCP packets from a UE, a base station may discard later arriving duplicated packets. When multiple same packets are transmitted, actual received packet rate in receiver (e.g. UE for downlink, base station for uplink) is determined without counting discarded packets. In an implementation of existing technologies, if a secondary base station limits a packet transfer rate of a UE including duplicated PDCP packets, actual packet receiving rate of a receiver may be less than UE's AMBR. Limiting packet transfer rate for packets of duplicated packet flow may decrease packet transfer rate and transmission reliability. The existing technology may decrease service quality and service fairness of a UE. There is a need to develop enhance traffic control mechanism of a secondary base station for PDCP packet duplication.

Example embodiments enhance traffic control of a secondary base station when a secondary base station transmits duplicated PDCP packets of a UE. Example embodiment may improve packet transmission limiting mechanism when PDCP packet duplication is configured for a wireless device. Example embodiments may increase packet transfer reliability and service quality of wireless devices by enhancing duplicated PDCP packet control mechanisms of a secondary base station.

In an example, an eNB may guarantee the downlink GBR associated with a GBR bearer, may enforce the downlink MBR associated with a GBR bearer, and/or may enforce the downlink AMBR associated with a group of Non-GBR bearers.

In an example, a UE may have an uplink rate control function which may manage the sharing of uplink resources between radio bearers. RRC may control the uplink rate control function by giving each bearer a priority and a prioritised bit rate (PBR). The values signalled may not be related to the ones signalled via S1 (NG interface) to the eNB (gNB, base station).

The uplink rate control function may ensure that the UE serves its radio bearer(s) in the following sequence: the radio bearer(s) in decreasing priority order up to their PBR; and/or the radio bearer(s) in decreasing priority order for the remaining resources assigned by the grant.

In case the PBRs are all set to zero, the first action may be skipped and the radio bearer(s) may be served in strict priority order: the UE may maximize the transmission of higher priority data. By limiting the total grant to the UE, the eNB may ensure that the UE-AMBR plus the sum of MBRs is not exceeded. Provided the higher layers may be responsive to congestion indications, the eNB (gNB, base station) may enforce the MBR of an uplink radio bearer by triggering congestion indications towards higher layers and by shaping the data rate towards the S1 interface (NG interface). If more than one radio bearer has the same priority, the UE may serve these radio bearers equally.

In DC (dual connectivity, multi connectivity, tight interworking, and/or the like), the MeNB (M-Node, master base station, M-NR-RAN, and/or the like) may ensure that the UE-AMBR is not exceeded by: limiting the resources it allocates to the UE in MCG; and/or indicating to the SeNB (S-Node, secondary base station, S-NR-RAN, and/or the like) a limit so that the SeNB may also in turn guarantee that this limit is not exceeded. For split bearers the SeNB may ignore the indicated downlink UE-AMBR. If the SeNB is not configured to serve the uplink for split bearers, the SeNB may ignore the indicated uplink UE-AMBR.

In an example embodiment, if Packet Data Convergence Protocol (PDCP) layer packets are duplicated and transmitted via a radio interface, a base station serving a wireless device may consider duplicated PDCP packets when the base station limits a packet transmission bit rate at least based on a bit rate allowed for the wireless device (e.g. a UE aggregated maximum bit rate, UE-AMBR). In an example, when a base station recognizes a packet flow that is associated with duplicated PDCP packets, the base station may ignore the packet flow when determining that an aggregated bit rate of a wireless device is lower than a bit rate allowed for the wireless device.

In a Carrier Aggregation (CA) based PDCP packet duplication case, a base station may determine that an aggregated bit rate of a wireless device is lower than a bit rate allowed for the wireless device, and/or may control the aggregated bit rate to be lower than the bit rate allowed. In a Dual Connectivity (DC, multi-connectivity, tight-interworking, and/or the like) based PDCP packet duplication case, a secondary base station (e.g. SgNB, non-standalone base station, SgNB, S-Node, and/or the like) may determine that an aggregated bit rate of a wireless device in the secondary base station is lower than a bit rate allowed for the wireless device in the secondary base station, and/or may control the aggregated bit rate to be lower than the bit rate allowed in the secondary base station. The secondary base station may receive the bit rate allowed in the secondary base station from a master base station associated with the wireless device.

Figure 28:
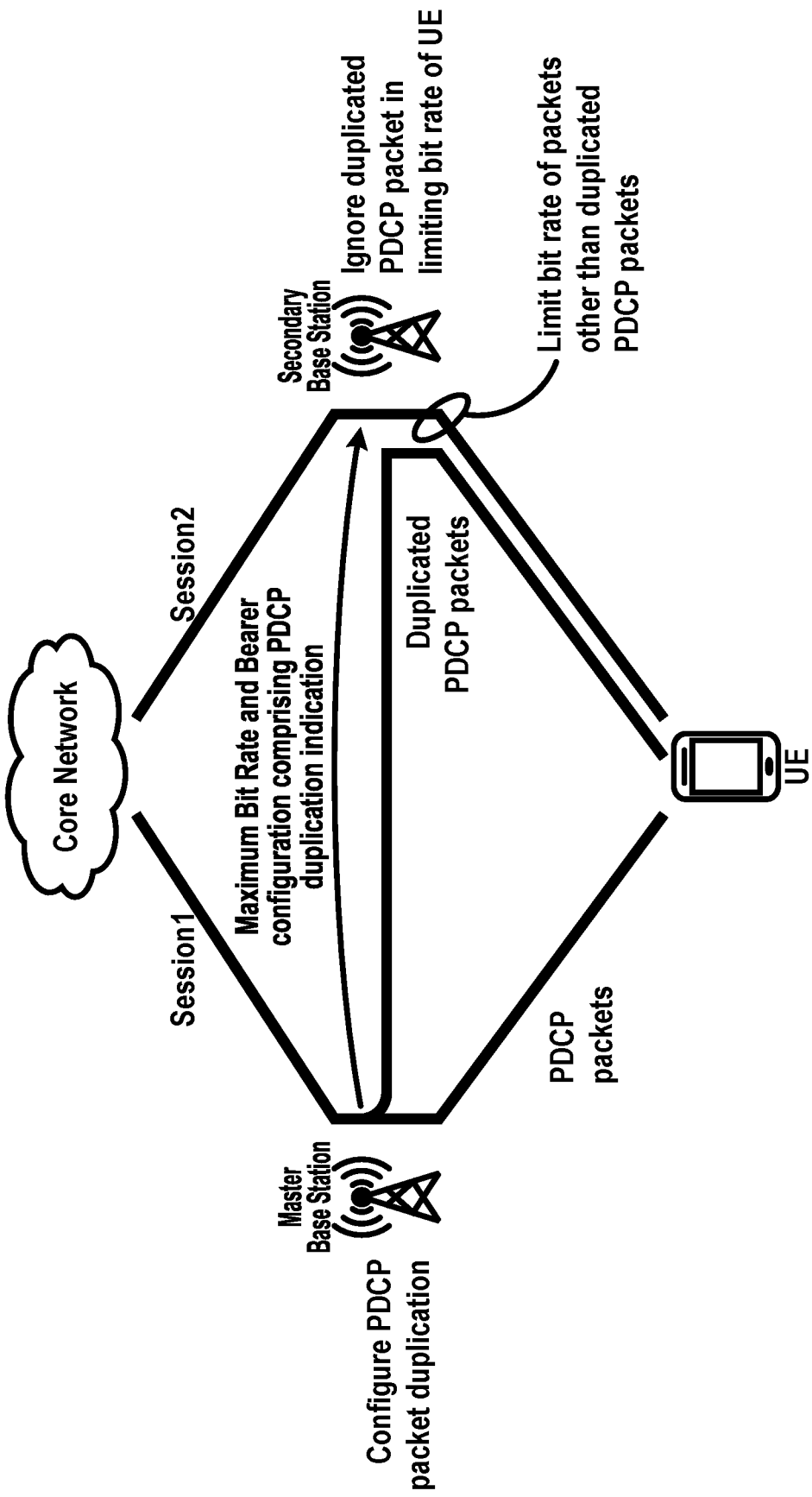
FIG. 28 is an example diagram of an aspect of an embodiment of the present disclosure.

In an example, as shown in FIG. 28, a second base station may determine enabling a PDCP packet duplication for a first bearer (e.g. data radio bearer, signaling radio bearer, and/or the like) of a wireless device. In an example, one or more packets transmitted via the first bearer may require high reliability, for example, to support services that may be latency sensitive, packet loss sensitive, packet delay sensitive, and/or the like (e.g. V2X services, vehicle communication services, medical control services, transportation control services, emergency service, public security services, and/or the like). By enabling a PDCP packet duplication, a packet loss rate in a PDCP layer may be reduced, and/or a packet transmission latency in a PDCP layer may decrease because a base station (in an uplink transmission case) or a wireless device (in a downlink transmission case) may be able to receive a PDCP packet that arrives earlier among an original PDCP packet and a duplicated PDCP packet.

In an example, to enable a PDCP packet duplication for the first bearer, the second base station may initiate a CA based PDCP packet duplication by establishing a packet flow (e.g. RLC channel, radio bearer, logical channel, and/or the like) for duplicated PDCP packets, the packet flow different (or independent) from a packet flow for original PDCP packets. The second base station may initiate a CA based PDCP packet duplication by creating an RLC entity for duplicated PDCP packets, the RLC entity different (or independent) form an RLC entity for original PDCP packets. In an example, the packet flows (e.g. RLC channel, radio bearer, logical channel, and/or the like) and/or the RLC entities for duplicated PDCP packets and/or original PDCP packets may be established in the second base station. In an example, original PDCP packets and duplicated PDCP packets may be transmitted via the second base station. In an example, duplicated PDCP packets of the first bearer may be transmitted via one or more cells different from cells that original PDCP packets of the first bearer are transmitted via.

Figure 29:
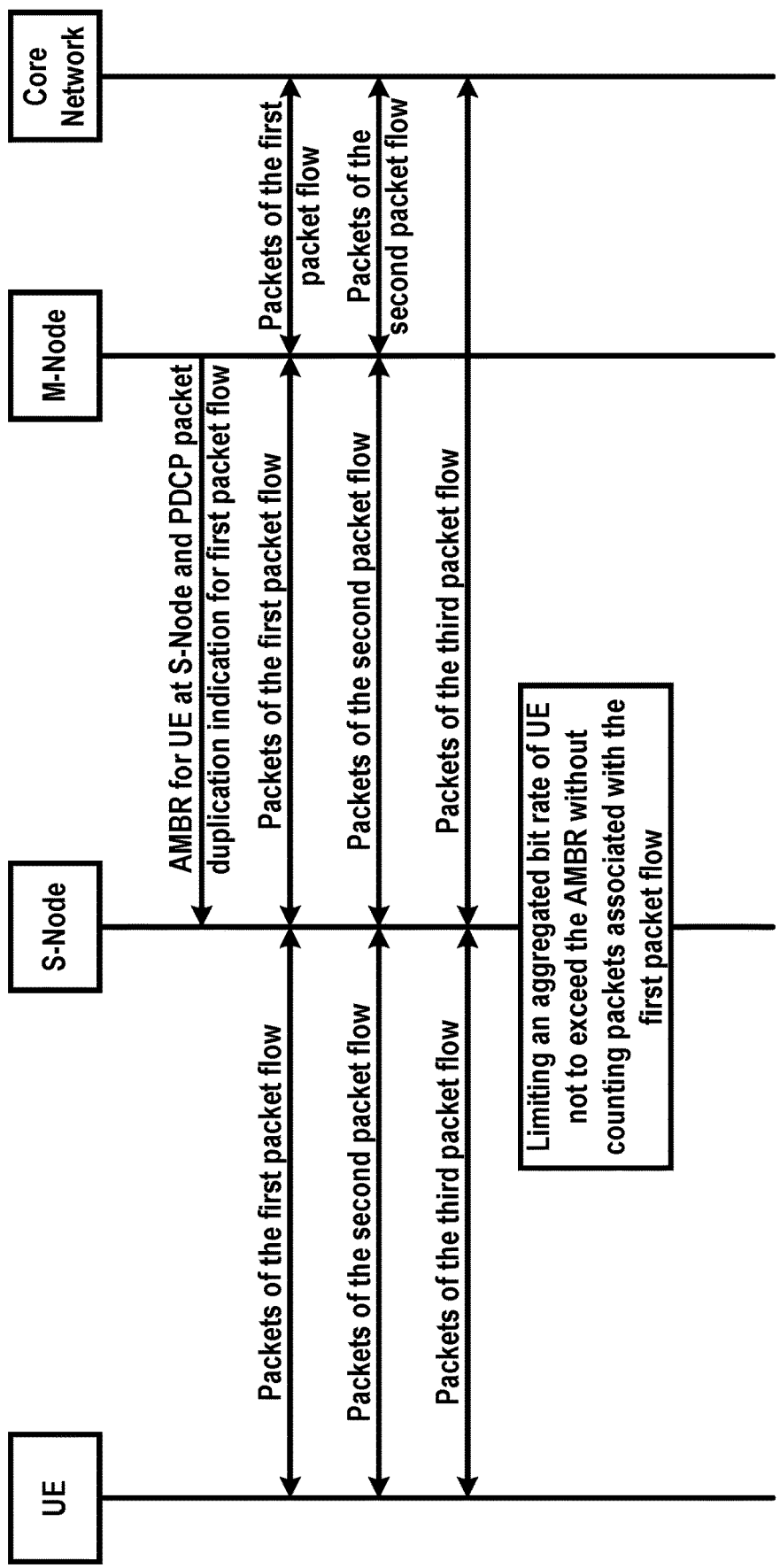
FIG. 29 is an example diagram of an aspect of an embodiment of the present disclosure.
Figure 30:
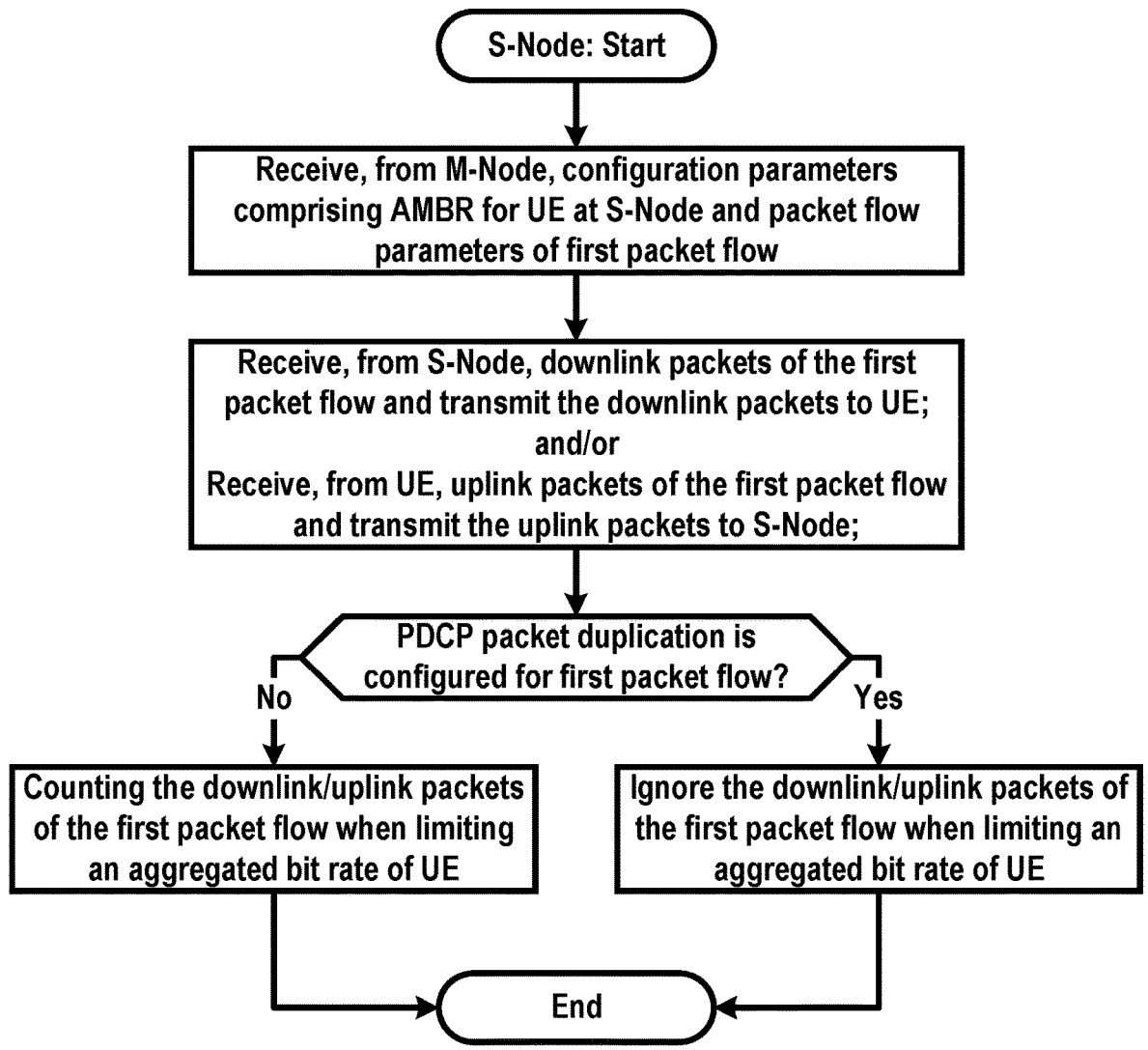
FIG. 30 is an example diagram of an aspect of an embodiment of the present disclosure.

In an example, as shown in FIG. 29 and FIG. 30, to enable a PDCP packet duplication for the first bearer, the second base station (e.g. master base station) may employ a first base station (e.g. secondary base station, non-standalone base station, SgNB, S-Node, and/or the like) by establishing a packet flow (e.g. RLC channel, radio bearer, logical channel, and/or the like) for at least one of duplicated PDCP packets and/or original PDCP packets in the first base station, and/or by creating an RLC entity for at least one of duplicated PDCP packets and/or original PDCP packets in the first base station. In an example, original PDCP packets may be transmitted via the second base station, and duplicated PDCP packets may be transmitted via the first base station. In an example, duplicated PDCP packets may be transmitted via the second base station, and original PDCP packets may be transmitted via the first base station. In an example, original PDCP packets and duplicated PDCP packets may be transmitted via the first base station (e.g. secondary base station, non-standalone base station, SgNB, S-Node, and/or the like). In an example, duplicated PDCP packets of the first bearer may be transmitted via one or more cells different from cells that original PDCP packets of the first bearer are transmitted via.

In an example, the second base station may initiate a dual connectivity (e.g. DC, multi-connectivity, tight-interworking, and/or the like) for the wireless device with the first base station when enabling a PDCP packet duplication for the first bearer. In an example, the second base station may have a dual connectivity (e.g. DC, multi-connectivity, tight-interworking, and/or the like) for the wireless device with the first base station before enabling a PDCP packet duplication for the first bearer, and may employ the existing dual connectivity (e.g. DC, multi-connectivity, tight-interworking, and/or the like) with the first base station for a PDCP packet duplication.

In an example, the second base station (e.g. master base station, standalone base station, MgNB, M-Node, M-NG-RAN, and/or the like) may transmit, to the first base station (e.g. secondary base station, non-standalone base station, SgNB, S-Node, S-NG-RAN, and/or the like), a first message associated with the wireless device to enable a PDCP packet duplication via the first base station. The first message may be transmitted via a direct interface (e.g. Xn interface, X2 interface, Xx interface, and/or the like) between the second base station and the first base station. In an example, the first message may be an S-Node (SeNB, SgNB, S-NG-RAN, secondary base station) addition request message, which may be configured to initiate a dual connectivity (e.g. DC, multi-connectivity, tight-interworking, and/or the like) for the wireless device with the first base station. In an example, the first message may be an S-Node (SeNB, SgNB, S-NG-RAN, secondary base station) modification request message, which may be configured to modify an existing dual connectivity (e.g. DC, multi-connectivity, tight-interworking, and/or the like) for the wireless device with the first base station.

In an example, the first message may comprise at least one of a wireless device (UE) identifier of the wireless device, wireless device security capability information, secondary base station security key information, serving PLMN information, Radio Resource Control (RRC) configuration information (e.g. MgNB to SgNB container, SCG configuration information message, and/or the like), Closed Cell Group (CSG) membership status information, a secondary base station wireless device aggregated maximum bit rate (e.g. SgNB/SeNB UE AMBR, an Aggregate Maximum Bit Rate (AMBR) of the wireless device at the first base station), one or more packet flow configuration parameters, and/or the like.

In an example, the first message may comprise one or more packet flow configuration parameters for a first packet flow (e.g. RLC channel, radio bearer, logical channel, and/or the like). In an example, the one or more packet flow configuration parameters may comprise a Packet Data Convergence Protocol (PDCP) packet duplication indication for the first packet flow, a PDU session identifier, PDU session QoS parameters, an uplink GTP tunnel endpoint identifier (e.g. of a user plane core network entity, and/or UPF), and/or the like. In an example, the one or more packet flow configuration parameters may be configured for an SCG bearer (e.g. a bearer established from a core network to the first base station directly), a split bearer (e.g. a split bearer established from a core network to the first base station via the second base station indirectly, wherein packets of another split bearer (other part of bearer) are transmitted directly from a core network entity to the second base station and the wireless device), an SCG split bearer (e.g. a bearer established from a core network to the first base station directly, wherein packets for another split bearer (other part of bearer) are transmitted towards the second base station from a core network entity indirectly via the first base station), a duplicated PDCP bearer (e.g. a bearer for duplicated PDCP packets, or a bearer for original PDCP packets), an original PDCP bearer (e.g. for original PDCP packets in case of PDCP duplication), and/or the like. In an example, both a bearer for duplicated PDCP packets and a bearer for original PDCP packets may be established via the first base station (e.g. secondary base station, S-Node, S-NG-RAN, SgNB, and/or the like).

In an example, the PDCP packet duplication indication may indicate that the first packet flow is to transmit duplicated PDCP packets and/or to transmit original PDCP packets. The PDCP packet duplication indication may further indicate that the first packet flow is to transmit duplicated PDCP packets associated with the first bearer, and/or to transmit original PDCP packets associated with the first bearer. In an example, there may be no differentiation between duplicated packets and original packets. Duplicated packets may be considered as original packets, and/or original packets may be considered as duplicated packets when a PDCP packet duplication is applied. The PDCP packet duplication indication may indicate that the first packet flow is associated with a PDCP packet duplication. The PDCP packet duplication indication may indicate that the first packet flow is associated with a PDCP packet duplication for the first bearer.

In an example, the AMBR (e.g. SgNB/SeNB/S-Node/S-NG-RAN UE AMBR) of the wireless device at the first base station (e.g. at a secondary base station) may indicate a bit rate that is allowed at the first base station for the wireless device. The AMBR may be determined by the second base station (e.g. master base station, M-Node, M-NG-RAN, and/or the like).

In an example, in response to receiving the first message, the first base station may configure one or more contexts, one or more configurations for the first packet flow. In an example, in response to receiving the first message, the first base station may transmit, to the second base station, a second message configured to indicate a confirmation of one or more elements of the first message. The second message may be an S-Node (SeNB, SgNB, S-NG-RAN, secondary base station) addition request acknowledge message when the first message is an S-Node (SeNB, SgNB, S-NG-RAN, secondary base station) addition request message. The second message may be an S-Node (SeNB, SgNB, S-NG-RAN, secondary base station) modification request acknowledge message when the first message is an S-Node (SeNB, SgNB, S-NG-RAN, secondary base station) modification request message. In an example, the second message may comprise one or more allowed bearer (packet flow, QoS flow, RLC channel, logical channel, PDU session, and/or the like) list to be setup, one or more rejected bearer list of bearers not allowed, and/or the like.

In an example, the first base station may receive, from the second base station, one or more downlink packets associated with the first packet flow via the Xn interface, and/or may transmit the one or more downlink packets to the wireless device via one or more radio interfaces. The first base station may receive, from the wireless device, one or more uplink packets associated with the first packet flow via one or more radio interfaces, and/or may transmit the one or more uplink packets to the second base station via the Xn interface.

In an example, the first base station may ignore the one or more uplink packets associated with the first packet flow and the one or more downlink packets associated with the first packet flow when determining that an aggregated bit rate for the wireless device at the first base station is less than the AMBR at least based on the PDCP packet duplication indication. In an example, the first base station may not count the one or more uplink packets and the one or more downlink packets associated with the first packet flow when limiting an aggregated bit rate of the wireless device. In an example, when a sum of bit rates of other packet flows (e.g. for uplink and/or downlink) for the wireless device is same to the AMBR for the wireless device at the first base station, the first base station may transmit uplink and/or downlink packets associated with the first packet flow to the second base station and/or the wireless device.

In an example, the first base station may be a distributed RAN entity, and the second base station may be a central RAN entity. When the distributed RAN entity receives and/or transmits one or more packets associated with the first packet flow, the distributed RAN entity may ignore the one or more packets when determining that an aggregated bit rate of the wireless device at the distributed RAN entity does not exceed the AMBR for the wireless device at the distributed RAN entity.

In an example, a first base station may receive, from a second base station, a first message for a wireless device, the first message comprising: an Aggregate Maximum Bit Rate (AMBR) of the wireless device at the first base station; and/or a Packet Data Convergence Protocol (PDCP) packet duplication indication indicating that a first packet flow is to transmit duplicated PDCP packets. The first base station may transmit, to the wireless device, one or more packets associated with the first packet flow. The first base station may receive, from the wireless device, one or more packets associated with the first packet flow. In an example, the first base station may ignore the one or more packets when determining that a bit rate for the wireless device is less than the AMBR at least based on the PDCP packet duplication indication. In an example, the first base station may transmit/receive the one or more packets to/from the second base station.

In an example, the first base station may receive, from the wireless device, one or more uplink packets associated with the first packet flow, and/or transmit, to the second base station, the one or more uplink packets. The first base station may ignore the one or more uplink packets when limiting a bit rate for the wireless device based on the AMBR. In an example, the first message may be at least one of: a dual/multi connectivity initiation request message; and/or a dual/multi connectivity modification request messages. In an example, the first packet flow may be at least one of a Radio Link Control (RLC) channel, a logical channel, a radio bearer, and/or a QoS channel.

According to various embodiments, a device such as, for example, a wireless device, a base station, base station central unit, a base station distributed unit, a core network entity, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 32 is an example flow diagram as per an aspect of an embodiment of the present disclosure. At 3210, a base station distributed unit may receive information elements from a base station central unit. The information elements may comprise at least one bearer configuration information element indicating that packet data convergence protocol (PDCP) packet duplication is configured for at least one first bearer of a wireless device. The information elements may comprise at least one information element indicating activation of the PDCP packet duplication of the at least one first bearer. At 3220, the base station distributed unit may transmit, to the wireless device and in response to the at least one information element indicating the activation of the PDCP packet duplication, a medium access control control element. The medium access control control element may indicate the activation of the PDCP packet duplication of the at least one first bearer. At 3230, the base station distributed unit may receive, based on the medium access control control element, PDCP packets of the at least one first bearer. The base station distributed unit may receive, based on the medium access control control element, duplicated PDCP packets of the at least one first bearer According to an example embodiment, the wireless device may generate, in response to the medium access control control element, the duplicated PDCP packets of the at least one first bearer by duplicating the PDCP packets of the at least one first bearer. According to an example embodiment, the at least one bearer configuration information element may indicate a first tunnel for the PDCP packets and a second tunnel for the duplicated PDCP packets. According to an example embodiment, the first tunnel and the second tunnel may be established between the base station distributed unit and the base station central unit in response to the at least one bearer configuration information element. According to an example embodiment, the base station distributed unit may receive the PDCP packets via one or more first cells. According to an example embodiment, the base station distributed unit may receive the duplicated PDCP packets via one or more second cells. According to an example embodiment, the one or more first cells are different than the one or more second cells. According to an example embodiment, the at least one information element indicating the activation of the PDCP packet duplication is based on a traffic load status of the base station central unit. According to an example embodiment, the base station distributed unit may transmit to the base station central unit a request message indicating a duplication activation or deactivation request to activate or deactivate duplication of PDCP packets of the at least one first bearer. According to an example embodiment, the duplication activation or deactivation request may be for downlink PDCP packets. According to an example embodiment, the duplication activation or deactivation request may be for uplink PDCP packets. According to an example embodiment, the duplication activation or deactivation request may be based on status information of the base station distributed unit. According to an example embodiment, the status information may comprise at least one of a traffic load status, a radio channel status, or a packet transmission policy.

According to an example embodiment, the base station central unit may transmit, based on the request message, the at least one information element indicating the activation of the PDCP packet duplication. According to an example embodiment, the base station distributed unit may receive from the base station central unit at least one second parameter indicating deactivation of the PDCP packet duplication of the at least one first bearer. According to an example embodiment, the deactivation of the PDCP packet duplication of the at least one first bearer may be for at least one of downlink PDCP packets or uplink PDCP packets. According to an example embodiment, the at least one second parameter may comprise an end marker packet of user plane data packets of the at least one first bearer. According to an example embodiment, the base station central unit may transmit the at least one second parameter based on a second request message. According to an example embodiment, the second request message may comprise at least one of: a field indicating duplication deactivation request to deactivate duplication of PDCP packets of the at least one first bearer, a traffic load status, a radio channel status, or a packet transmission policy. According to an example embodiment, the deactivation request to deactivate duplication of PDCP packets of the at least one first bearer may be for at least one of downlink PDCP packets or uplink PDCP packets.

According to an example embodiment, the base station distributed unit may receive from the base station central unit at least one second parameter indicating deactivation of the PDCP packet duplication of the at least one first bearer. According to an example embodiment, the base station distributed unit may transmit, to the wireless device and in response to the at least one second parameter, a second medium access control control element. According to an example embodiment, the second medium access control control element may indicate the deactivation of the PDCP packet duplication of the at least one first bearer. According to an example embodiment, the base station distributed unit may receive, in response to the second medium access control control element, at least one PDCP packet of the at least one first bearer via at least one of the one or more first cells and the one or more second cells. According to an example embodiment, a base station may comprise the base station central unit and the base station distributed unit. According to an example embodiment, the base station central unit may comprise at least one of a radio resource control function for the wireless device or a packet data convergence protocol function for the wireless device. According to an example embodiment, the base station distributed unit may comprise at least one of a medium access control layer function for the wireless device or a physical layer function for the wireless device. According to an example embodiment, the information elements may be received via an F1 interface. According to an example embodiment, the duplicated PDCP packets of the at least one first bearer may uplink PDCP packets.

FIG. 33 is an example flow diagram as per an aspect of an embodiment of the present disclosure. At 3310, a base station distributed unit may receive, from a base station central unit, information elements. The information elements may comprise at least one bearer configuration information element indicating that packet data convergence protocol (PDCP) packet duplication is configured for at least one first bearer of a wireless device. The information elements may comprise at least one information element indicating activation of the PDCP packet duplication of the at least one first bearer. At 3320, the base station distributed unit may transmit, to the wireless device, a radio resource control message. The RRC message may comprise at least one configuration parameter indicating that the PDCP packet duplication is configured for the at least one first bearer. At 3330, the base station distributed unit may receive, based on the activation of the PDCP packet duplication, PDCP packets of the at least one first bearer and duplicated PDCP packets of the at least one first bearer.

FIG. 34 is an example flow diagram as per an aspect of an embodiment of the present disclosure. At 3410, the base station distributed unit may receive, from a base station central unit, a first message. The first message may comprise bearer configuration parameters for packet data convergence protocol (PDCP) packet duplication of a first bearer for a wireless device. At 3420, the base station distributed unit may receive, from the base station central unit, a second message. The second message may comprise at least one parameter indicating activation of the PDCP packet duplication of the first bearer. At 3430, the base station distributed unit may transmit, based on the activation of PDCP packet duplication, PDCP packets of the first bearer and duplicated PDCP packets of the first bearer.

According to an example embodiment, the base station central unit may generate the duplicated PDCP packets of the first bearer by duplicating the PDCP packets of the first bearer. According to an example embodiment, the base station distributed unit may perform the transmitting to the wireless device. According to an example embodiment, the base station distributed unit may perform the transmitting to the base station central unit. According to an example embodiment, the first message may indicate a first tunnel for the PDCP packets. According to an example embodiment, the first message may indicate a second tunnel for the duplicated PDCP packets. According to an example embodiment, the first tunnel and the second tunnel may be established, in response to the first message, between the base station distributed unit and the base station central unit. According to an example embodiment, the base station distributed unit may transmit the PDCP packets via one or more first cells. According to an example embodiment, the base station distributed unit may transmit the duplicated PDCP packets via one or more second cells. According to an example embodiment, the one or more first cells may be different than the one or more second cells. According to an example embodiment, the base station distributed unit may transmit, to the wireless device and in response to receiving the second message, a medium access control control element. The medium access control control element may indicate activation of the PDCP packet duplication of the first bearer.

According to an example embodiment, the bearer configuration parameters may comprise at least one of a duplication activation parameter indicating activation of PDCP packet duplication of the first bearer or a duplication deactivation parameter indicating deactivation of PDCP packet duplication of the first bearer. According to an example embodiment, the bearer configuration parameters may further comprise a duplication parameter. The duplication parameter may indicate activation of PDCP packet duplication of the first bearer or deactivation of PDCP packet duplication of the first bearer. According to an example embodiment, the at least one parameter of the second message may be based on a traffic load status of the base station central unit. According to an example embodiment, the base station distributed unit may transmit, to the base station central unit, a request message indicating a duplication activation or deactivation request to activate or deactivate duplication of PDCP packets of the first bearer. The duplication activation or deactivation request may be for at least one of downlink PDCP packets or uplink PDCP packets. According to an example embodiment, the duplication activation or deactivation request may be based on status information of the base station distributed unit. The status information may comprise at least one of a traffic load status, a radio channel status, or a packet transmission policy.

According an example embodiment, the base station central unit may transmit the second message based on the request message. According to an example embodiment, the base station distributed unit may receive, from the base station central unit, at least one second parameter. The at least one second parameter may indicate deactivation of the PDCP packet duplication of the first bearer for at least one of downlink PDCP packets or uplink PDCP packets. According to an example embodiment, the at least one second parameter may comprise an end marker packet of user plane data packets of the first bearer. According to an example embodiment, the base station central unit may transmit the at least one second parameter based on a second request message. The second request message may comprise at least one of a field indicating duplication deactivation request to deactivate duplication of PDCP packets of the first bearer, a traffic load status, a radio channel status, or a packet transmission policy. The at least one of a field indicating duplication deactivation request to deactivate duplication of PDCP packets of the first bearer may be for at least one of downlink PDCP packets or uplink PDCP packets. According to an example embodiment, the base station distributed unit may receive, from the base station central unit, at least one second parameter indicating deactivation of the PDCP packet duplication of the first bearer. According to an example embodiment, the base station distributed unit may transmit, in response to receiving the at least one second parameter, at least one PDCP packet of the at least one first bearer. The base station distributed unit may transmit the at least one PDCP packet of the at least one first bearer via at least one of the one or more first cells and the one or more second cells.

According to an example embodiment, a base station may comprise the base station central unit and the base station distributed unit. According to an example embodiment, the base station central unit may comprise at least one of a radio resource control function for the wireless device or a packet data convergence protocol function for the wireless device. According to an example embodiment, the base station distributed unit may comprise at least one of a medium access control layer function for the wireless device or a physical layer function for the wireless device. According to an example embodiment, the first message and the second message may be received via an F1 interface. According to an example embodiment, the duplicated PDCP packets of the first bearer may comprise at least one of uplink PDCP packets or downlink PDCP packets.

FIG. 35 is an example flow diagram as per an aspect of an embodiment of the present disclosure. At 3510, a base station distributed unit may receive, from a base station central unit, a first message. The first message ma comprise bearer configuration parameters for packet data convergence protocol (PDCP) packet duplication of a first bearer for a wireless device. At 3520, the base station distributed unit may receive, from the base station central unit, a second message. The second message may comprise at least one parameter indicating activation of the PDCP packet duplication of the first bearer. At 3530, the base station distributed unit may transmit, to the wireless device and in response to the second message, a medium access control control element. The medium access control control element may indicate the activation of the PDCP packet duplication of the first bearer. At 3540, the base station distributed unit may receive, from the wireless device, duplicated PDCP packets of the first bearer.

FIG. 36 is an example flow diagram as per an aspect of an embodiment of the present disclosure. At 3610, a base station distributed unit may receive, from a base station central unit, a first message. The first message may comprise bearer configuration parameters for packet data convergence protocol (PDCP) packet duplication of a bearer for a wireless device. At 3620, the base station distributed unit may receive, from the base station central unit, a second message. The second message may comprise at least one parameter indicating deactivation of the PDCP packet duplication of a first bearer. At 3630, the base station distributed unit may stop transmitting, to the wireless device and based on the deactivation of the PDCP packet duplication, at least one duplicated PDCP packet of the first bearer.

Figure 37:
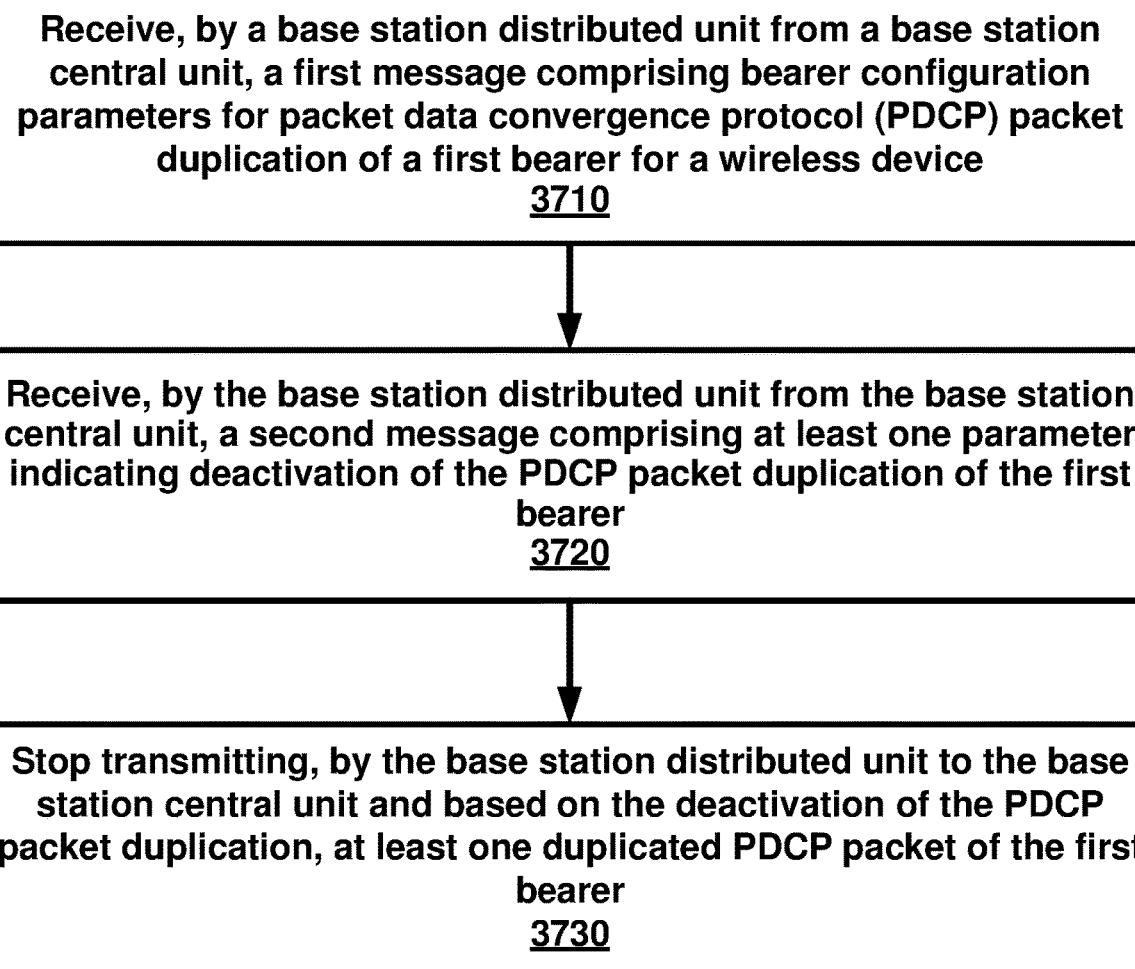
FIG. 37 is a flow diagram of an aspect of an embodiment of the present disclosure.

FIG. 37 is an example flow diagram as per an aspect of an embodiment of the present disclosure. At 3710, a base station distributed unit may receive, from a base station central unit, a first message. The first message may comprise bearer configuration parameters for packet data convergence protocol (PDCP) packet duplication of a first bearer for a wireless device. At 3720, the base station distributed unit may receive, from the base station central unit, a second message. The second message may comprise at least one parameter indicating deactivation of the PDCP packet duplication of the first bearer. At 3730, the base station distributed unit may stop transmitting, to the base station central unit and based on the deactivation of the PDCP packet duplication, at least one duplicated PDCP packet of the first bearer.

FIG. 38 is an example flow diagram as per an aspect of an embodiment of the present disclosure. At 3810, a base station central unit transmits, to a base station distributed unit, a first message. The first message may comprise bearer configuration parameters for packet data convergence protocol (PDCP) packet duplication of a first bearer for a wireless device. At 3820, the base station central unit may transmit, to the base station distributed unit, a second message. The second message may comprise at least one parameter indicating activation of the PDCP packet duplication of the first bearer. At 3830, the base station central unit may transmit, to the base station distributed unit and based on the activation of the PDCP packet duplication, duplicated PDCP packets of the first bearer.

FIG. 39 is an example flow diagram as per an aspect of an embodiment of the present disclosure. At 3910, a base station distributed unit may receive, from a base station central unit, a first message. The first message may comprise bearer configuration parameters for packet data convergence protocol (PDCP) packet duplication of a first bearer for a wireless device. At 3920, the base station distributed unit may receive, from the base station central unit, a second message. The second message may comprise at least one parameter. The at least one parameter may indicate activation of the PDCP packet duplication of the first bearer. At 3930, the base station distributed unit may transmit, based on the activation of PDCP packet duplication, duplicated PDCP packets of the first bearer.

FIG. 40 is an example flow diagram as per an aspect of an embodiment of the present disclosure. At 4010, a base station distributed unit may receive, from a base station central unit, a first message. The first message may comprise at least one bearer configuration parameter indicating that packet data convergence protocol (PDCP) packet duplication is configured for at least one first bearer of a wireless device. At 4020, the base station distributed unit may receive, from the base station central unit, a second message. The second message may comprise at least one parameter indicating activation of the PDCP packet duplication of the at least one first bearer. At 4030, the base station distributed unit may transmit, based on the at least one parameter indicating the activation of the PDCP packet duplication, PDCP packets of the at least one first bearer. The base station distributed may transmit, based on the at least one parameter indicating the activation of the PDCP packet duplication, duplicated PDCP packets of the at least one first bearer.

FIG. 41 is an example flow diagram as per an aspect of an embodiment of the present disclosure. At 4110, a base station distributed unit may receive, from a base station central unit, information elements. The information elements may comprise at least one bearer configuration information element. The bearer configuration information element may indicate that packet data convergence protocol (PDCP) packet duplication is configured for at least one first bearer of a wireless device. The information elements may comprise at least one information element indicating activation of the PDCP packet duplication of the at least one first bearer. At 4120, the base station distributed unit may transmit, based on the information elements, PDCP packets of the at least one first bearer. The base station distributed unit may transmit, based on the information elements, duplicated PDCP packets of the at least one first bearer.

According to an example embodiment, the base station central unit may generate the duplicated PDCP packets of the at least one first bearer by duplicating the PDCP packets of the at least one first bearer. According to an example embodiment, the base station distributed unit may perform the transmitting to the wireless device. According to an example embodiment, the base station distributed unit may perform the transmitting to the base station central unit. According to an example embodiment, the at least one bearer configuration information element may indicate a first tunnel for the PDCP packets and a second tunnel for the duplicated PDCP packets. According to an example embodiment, the first tunnel and the second tunnel may be established, between the base station distributed unit and the base station central unit, in response to the at least one bearer configuration information element. According to an example embodiment, the base station distributed unit may transmit the PDCP packets via one or more first cells and the duplicated PDCP packets via one or more second cells. According to an example embodiment, the one or more first cells may be different than the one or more second cells. According to an example embodiment, the base station distributed unit may transmit, to the wireless device and in response to receiving the at least one information element indicating the activation of the PDCP packet duplication, a medium access control control element. The medium access control control element may indicate the activation of the PDCP packet duplication of the at least one first bearer.

According to an example embodiment, the at least one information element may indicate the activation of the PDCP packet duplication is based on a traffic load status of the base station central unit. According to an example embodiment, the base station distributed unit may transmit, to the base station central unit, a request message. The request message may indicate a duplication activation or deactivation request to activate or deactivate duplication of PDCP packets of the at least one first bearer. According to an example embodiment, the duplication activation or deactivation request may be for at least one of downlink PDCP packets or uplink PDCP packets. According to an example embodiment, the duplication activation or deactivation request may be based on status information of the base station distributed unit. The status information may comprise at least one of a traffic load status, a radio channel status, or a packet transmission policy. According to an example embodiment, the base station central unit may transmit, based on the request message, the at least one information element. The at least one information element may indicate the activation of the PDCP packet duplication. According to an example embodiment, the base station distributed unit may receive, from the base station central unit, at least one second parameter indicating deactivation of the PDCP packet duplication of the at least one first bearer for at least one of downlink PDCP packets or uplink PDCP packets. According to an example embodiment, the at least one second parameter may comprise an end marker packet of user plane data packets of the at least one first bearer. According to an example embodiment, the base station central unit may transmit the at least one second parameter based on a second request message. The second request message may comprise at least one of a field indicating duplication deactivation request to deactivate duplication of PDCP packets of the at least one first bearer, a traffic load status, a radio channel status, or a packet transmission policy. The field indicating duplication deactivation request to deactivate duplication of PDCP packets of the at least one first bearer may be for at least one of downlink PDCP packets or uplink PDCP packets.

According to an example embodiment, the base station distributed unit may receive, from the base station central unit, at least one second parameter indicating deactivation of the PDCP packet duplication of the at least one first bearer. According to an example embodiment, the base station distributed unit may transmit, in response to receiving the at least one second parameter, at least one PDCP packet of the at least one first bearer via at least one of the one or more first cells and the one or more second cells. According to an example embodiment, a base station may comprise the base station central unit and the base station distributed unit. According to an example embodiment, the base station central unit may comprise at least one of a radio resource control function for the wireless device or a packet data convergence protocol function for the wireless device. According to an example embodiment, the base station distributed unit may comprise at least one of a medium access control layer function for the wireless device or a physical layer function for the wireless device. According to an example embodiment, the information elements may be received via an F1 interface. According to an example embodiment, the duplicated PDCP packets of the at least one first bearer may comprise at least one of uplink PDCP packets or downlink PDCP packets.

FIG. 42 is an example flow diagram as per an aspect of an embodiment of the present disclosure. At 4210, a base station distributed unit may receive, from a base station central unit, information elements. The information elements may comprise at least one bearer configuration information element indicating that packet data convergence protocol (PDCP) packet duplication is configured for at least one first bearer of a wireless device. The information elements may comprise at least one information element indicating activation of the PDCP packet duplication of the at least one first bearer. At 4220, the base station distributed unit may transmit, based on the at least one information element indicating the activation of the PDCP packet duplication, PDCP packets of the at least one first bearer. The base station distributed unit may transmit, based on the at least one information element indicating the activation of the PDCP packet duplication, duplicated PDCP packets of the at least one first bearer.

Figure 43:
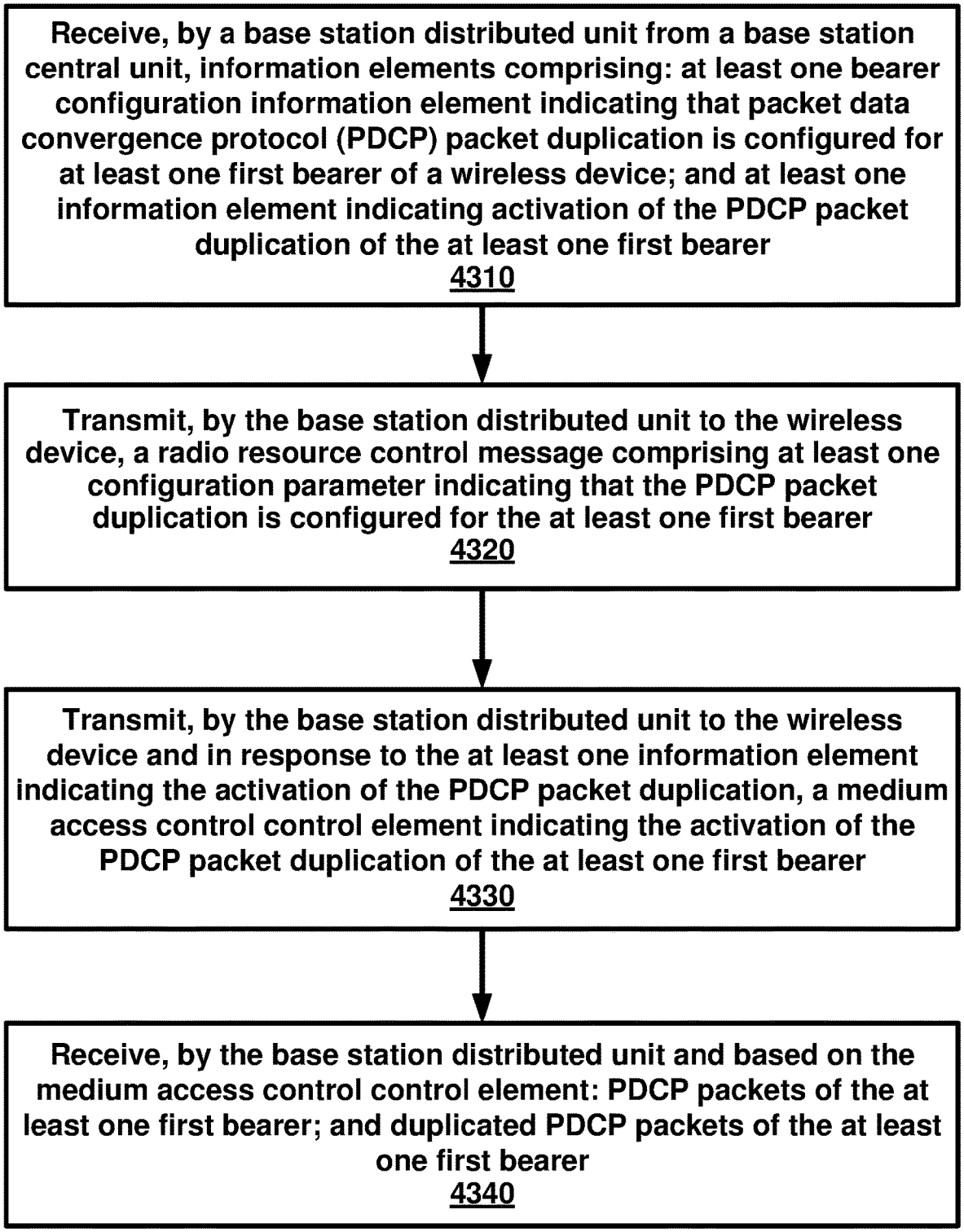
FIG. 43 is a flow diagram of an aspect of an embodiment of the present disclosure.

FIG. 43 is an example flow diagram as per an aspect of an embodiment of the present disclosure. At 4310, a base station distributed unit may receive, from a base station central unit, information elements. The information elements may comprise at least one bearer configuration information element. The bearer configuration information element may indicate that packet data convergence protocol (PDCP) packet duplication is configured for at least one first bearer of a wireless device. The information elements may comprise at least one information element. The at least one information element may indicate activation of the PDCP packet duplication of the at least one first bearer. At 4320, the base station distributed unit may transmit, to the wireless device, a radio resource control message. The radio resource control message may comprise at least one configuration parameter. The at least one configuration parameter may indicate that the PDCP packet duplication is configured for the at least one first bearer. At 4330, the base station distributed unit may transmit, to the wireless device and in response to the at least one information element indicating the activation of the PDCP packet duplication, a medium access control control element. The medium access control control element may indicate the activation of the PDCP packet duplication of the at least one first bearer. At 4340, the base station distributed unit may receive, based on the medium access control control element, PDCP packets of the at least one first bearer. the base station distributed unit may receive, based on the medium access control control element, duplicated PDCP packets of the at least one first bearer.

According to an example embodiment, the wireless device may generate, in response to the medium access control control element, the duplicated PDCP packets of the at least one first bearer by duplicating the PDCP packets of the at least one first bearer. According to an example embodiment, the at least one bearer configuration information element may indicate a first tunnel for the PDCP packets and a second tunnel for the duplicated PDCP packets. According to an example embodiment, the first tunnel and the second tunnel may be established, in response to the at least one bearer configuration information element, between the base station distributed unit and the base station central unit. According to an example embodiment, the base station distributed unit may receive the PDCP packets via one or more first cells. The base station distributed unit may receive the duplicated PDCP packets via one or more second cells. According to an example embodiment, the one or more first cells may be different than the one or more second cells. According to an example embodiment, the at least one information element may indicate the activation of the PDCP packet duplication is based on a traffic load status of the base station central unit. According to an example embodiment, the base station distributed unit may transmit, to the base station central unit, a request message indicating a duplication activation or deactivation request to activate or deactivate duplication of PDCP packets of the at least one first bearer. According to an example embodiment, the duplication activation or deactivation request may be for at least one of downlink PDCP packets or uplink PDCP packets. According to an example embodiment, the duplication activation or deactivation request may be based on status information of the base station distributed unit. The status information may comprise at least one of a traffic load status, a radio channel status, or a packet transmission policy.

According to an example embodiment, the base station central unit may transmit, based on the request message, the at least one information element. The at least one information element may indicate the activation of the PDCP packet duplication. According to an example embodiment, the base station distributed unit may receive, from the base station central unit, at least one second parameter. The at least one second parameter may indicate deactivation of the PDCP packet duplication of the at least one first bearer for at least one of downlink PDCP packets or uplink PDCP packets. According to an example embodiment, the at least one second parameter may comprise an end marker packet of user plane data packets of the at least one first bearer. According to an example embodiment, the base station central unit may transmit the at least one second parameter based on a second request message. The second request message may comprise at least one of a field indicating duplication deactivation request to deactivate duplication of PDCP packets of the at least one first bearer, a traffic load status, a radio channel status, or a packet transmission policy. According to an example embodiment, the base station distributed unit may receive, from the base station central unit, at least one second parameter. The second parameter may indicate deactivation of the PDCP packet duplication of the at least one first bearer. According to an example embodiment, the base station distributed unit may transmit, to the wireless device and in response to the at least one second parameter, a second medium access control control element. The second medium access control control element may indicate the deactivation of the PDCP packet duplication of the at least one first bearer.

According to an example embodiment, the base station distributed unit may receive, in response to the second medium access control control element, at least one PDCP packet of the at least one first bearer. According to an example embodiment, a base station may comprise the base station central unit and the base station distributed unit. According to an example embodiment, the base station central unit may comprise at least one of a radio resource control function for the wireless device or a packet data convergence protocol function for the wireless device. According to an example embodiment, the base station distributed unit may comprise at least one of a medium access control layer function for the wireless device or a physical layer function for the wireless device. According to an example embodiment, the information elements may be received via an F1 interface. According to an example embodiment, the duplicated PDCP packets of the at least one first bearer may comprise uplink PDCP packets.

Figure 44:
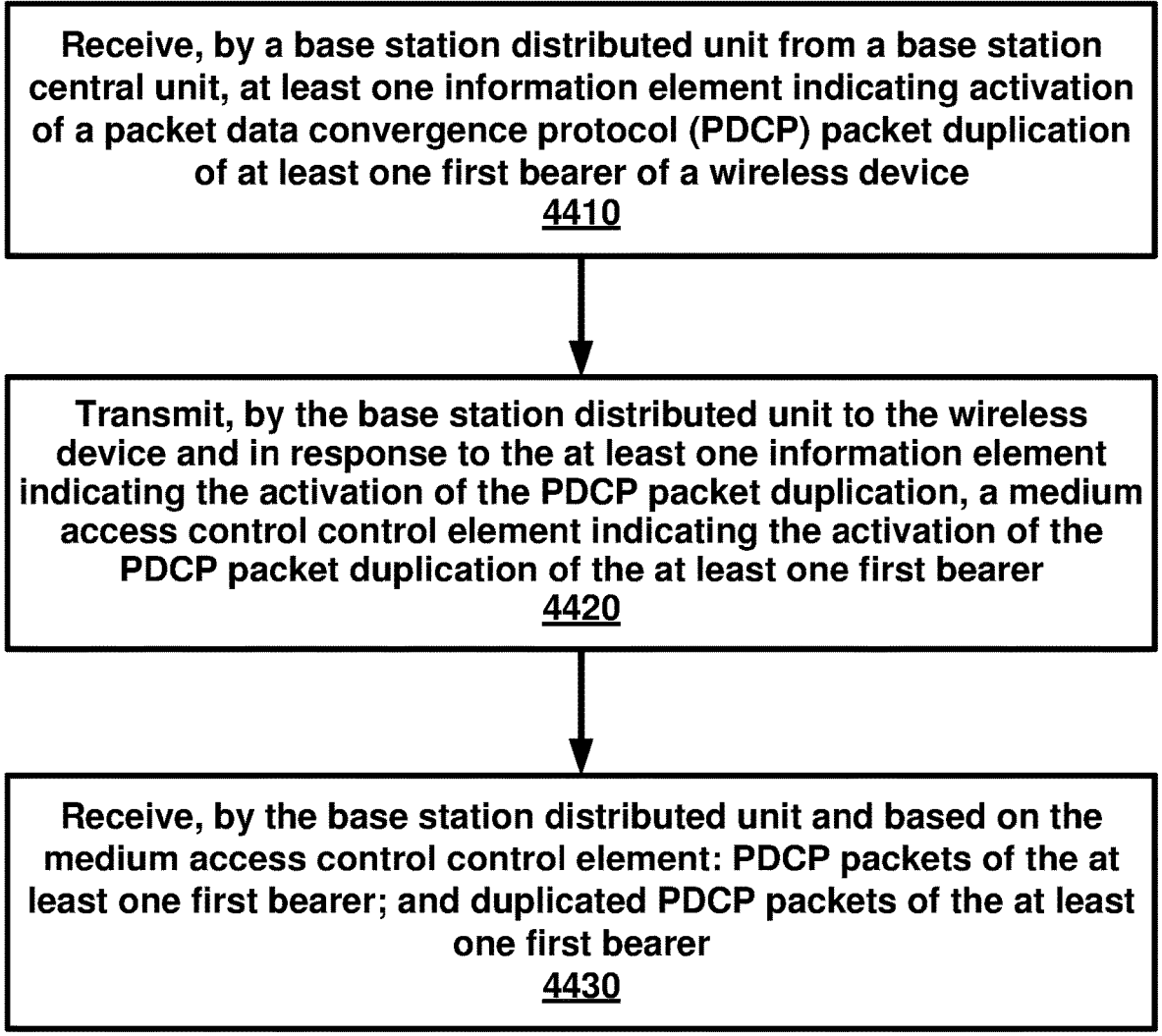
FIG. 44 is a flow diagram of an aspect of an embodiment of the present disclosure.

FIG. 44 is an example flow diagram as per an aspect of an embodiment of the present disclosure. At 4410, a base station distributed unit may receive, from a base station central unit, at least one information element. The at least one information element may indicate activation of a packet data convergence protocol (PDCP) packet duplication of at least one first bearer of a wireless device. At 4420, the base station distributed unit may transmit, to the wireless device and in response to the at least one information element indicating the activation of the PDCP packet duplication, a medium access control control element. The medium access control control element may indicate the activation of the PDCP packet duplication of the at least one first bearer. At 4430, the base station distributed unit may receive, based on the medium access control control element, PDCP packets of the at least one first bearer. The base station distributed unit may receive, based on the medium access control control element, duplicated PDCP packets of the at least one first bearer FIG. 45 is an example flow diagram as per an aspect of an embodiment of the present disclosure. At 4510, a base station distributed unit may receive, from a base station central unit, at least one information element. The at least one information element may indicate activation of a packet data convergence protocol (PDCP) packet duplication of at least one first bearer of a wireless device. At 4520, the base station distributed unit may transmit, based on the activation, PDCP packets of the at least one first bearer. The base station distributed unit may transmit, based on the activation, duplicated PDCP packets of the at least one first bearer FIG. 46 is an example flow diagram as per an aspect of an embodiment of the present disclosure. At 4610, a base station distributed unit may receive, from a base station central unit, a first message. The first message may comprise at least one bearer configuration parameter indicating that packet data convergence protocol (PDCP) packet duplication is configured for at least one first bearer of a wireless device. At 4620, the base station distributed unit may receive, from the base station central unit, a second message. The second message may comprise at least one parameter. The at least one parameter may indicate deactivation of the PDCP packet duplication of the at least one first bearer. At 4630, the base station distributed unit may stop transmitting, based on the at least one parameter indicating the deactivation of the PDCP packet duplication, duplicated PDCP packets of the at least one first bearer.

FIG. 47 is an example flow diagram as per an aspect of an embodiment of the present disclosure. At 4710, a base station distributed unit may receive, from a base station central unit, information elements. The information elements may comprise at least one bearer configuration information element indicating that packet data convergence protocol (PDCP) packet duplication is configured for at least one first bearer of a wireless device. The information elements may comprise at least one information element indicating deactivation of the PDCP packet duplication of the at least one first bearer. At 4720, the base station distributed unit may stop transmitting, based on the at least one information element indicating the deactivation of the PDCP packet duplication, duplicated PDCP packets of the at least one first bearer.

FIG. 48 is an example flow diagram as per an aspect of an embodiment of the present disclosure. At 4810, a base station distributed unit may receive, from a base station central unit, information elements. The information elements may comprise at least one bearer configuration information element indicating that packet data convergence protocol (PDCP) packet duplication is configured for at least one first bearer of a wireless device. The information elements may comprise at least one information element indicating deactivation of the PDCP packet duplication of the at least one first bearer. At 4820, the base station distributed unit may transmit, to the wireless device, a radio resource control message. The radio resource message may comprise at least one configuration parameter. The at least one configuration parameter may indicate that the PDCP packet duplication is configured for the at least one first bearer. At 4830, the base station distributed unit may transmit, to the wireless device and in response to the at least one information element indicating the deactivation of the PDCP packet duplication, a medium access control control element. The medium access control control element may indicate the deactivation of the PDCP packet duplication of the at least one first bearer. At 4840, the base station distributed unit may stop transmitting, based on the deactivation of the PDCP packet duplication, duplicated PDCP packets of the at least one first bearer.

Figure 49:
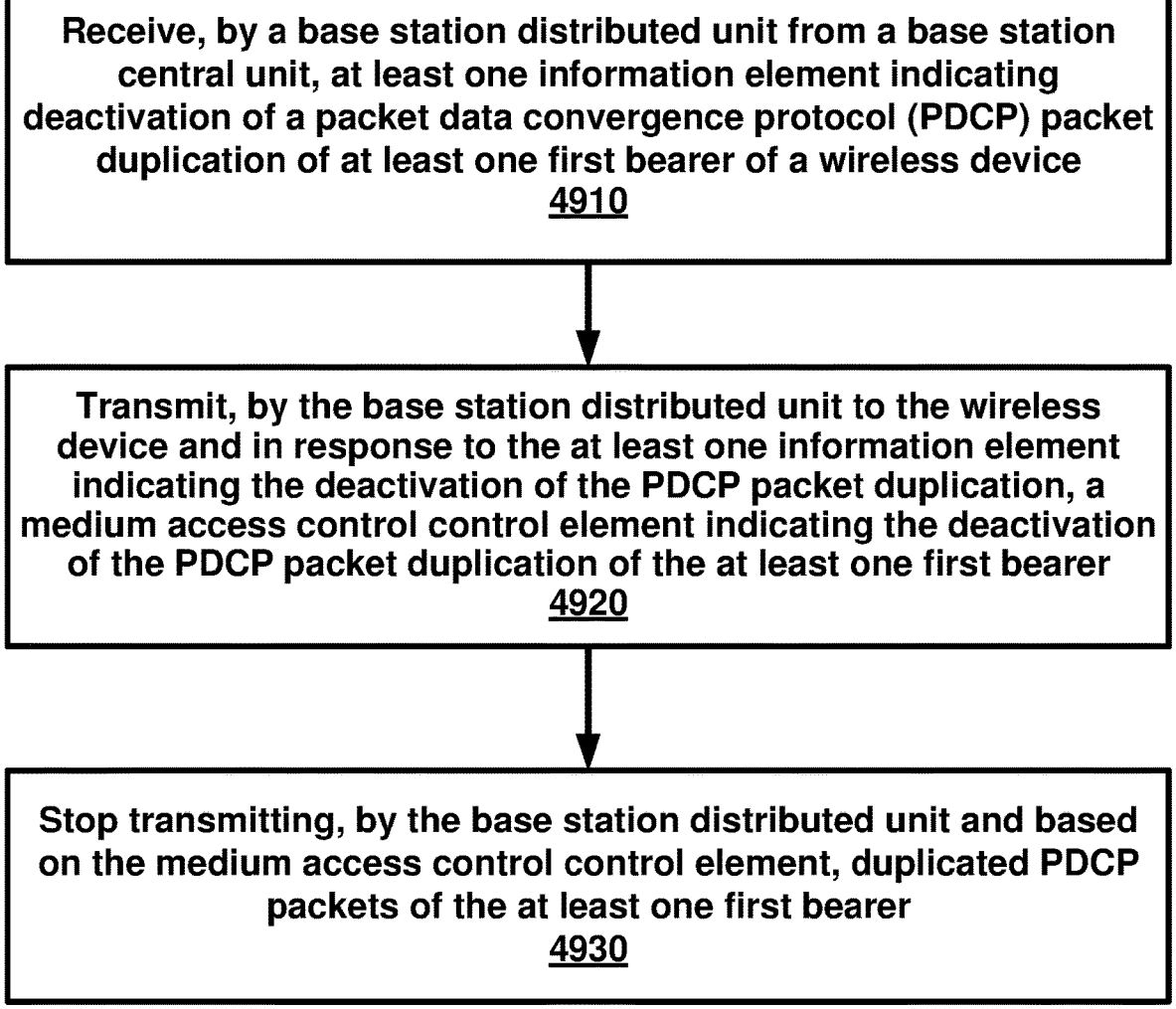
FIG. 49 is a flow diagram of an aspect of an embodiment of the present disclosure.

FIG. 49 is an example flow diagram as per an aspect of an embodiment of the present disclosure. At 4910, a base station distributed unit may receive, from a base station central unit, at least one information element. The at least one information element may indicate deactivation of a packet data convergence protocol (PDCP) packet duplication of at least one first bearer of a wireless device. At 4920, the base station distributed unit may transmit, to the wireless device and in response to the at least one information element indicating the deactivation of the PDCP packet duplication, a medium access control control element. The medium access control control element may indicate the deactivation of the PDCP packet duplication of the at least one first bearer. At 4930, the base station distributed unit may stop transmitting, based on the medium access control control element, duplicated PDCP packets of the at least one first bearer.

Figure 50:
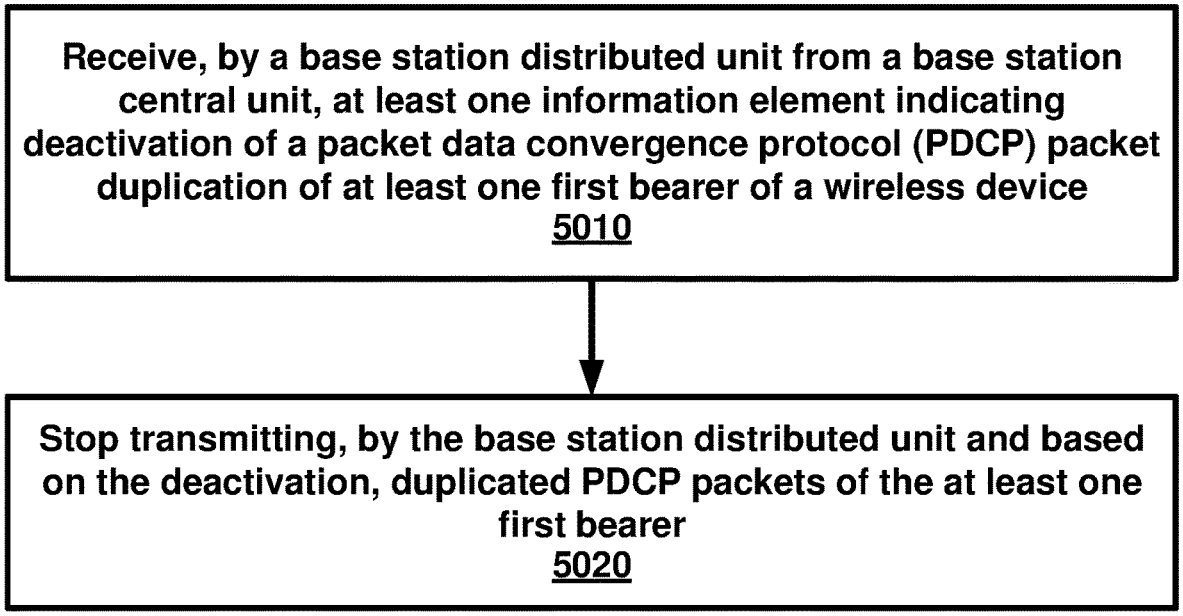
FIG. 50 is a flow diagram of an aspect of an embodiment of the present disclosure.

FIG. 50 is an example flow diagram as per an aspect of an embodiment of the present disclosure. At 5010, a base station distributed unit may receive, from a base station central unit, at least one information element. The at least one information element may indicate deactivation of a packet data convergence protocol (PDCP) packet duplication of at least one first bearer of a wireless device. At 5020, the base station distributed unit may stop transmitting, based on the deactivation, duplicated PDCP packets of the at least one first bearer.

FIG. 51 is an example flow diagram as per an aspect of an embodiment of the present disclosure. At 5110, a base station central unit may receive at least one first message from a second base station. The at least one first message may be for a wireless device. The at least one first message may comprise a first aggregate maximum bit rate of the wireless device at the first base station. The at least one first message may be for a wireless device. The at least one first message may comprise a packet data convergence protocol (PDCP) packet duplication parameter indicating that a first packet flow may comprise duplicated PDCP packets. At 5120, the first base station receive the duplicated PDCP packets of the first packet flow from the second base station. At 5130, the first base station may transmit the duplicated PDCP packets to the wireless device. At 5140, the first base station may determine that a bit rate between the wireless device and the first base station exceeds the first aggregate maximum bit rate. The determining may ignore, based on the PDCP packet duplication parameter, the duplicated PDCP packets. At 5150, the first base station may limit the bit rate between the wireless device and the first base station based on the determining.

According to an example embodiment, the first base station may comprise a secondary base station for the wireless device. According to an example embodiment, the second base station may comprise a master base station for the wireless device. According to an example embodiment, the limiting may prevent the bit rate from exceeding the first aggregate maximum bit rate. According to an example embodiment, the first base station may receive packets of the first packet flow from the wireless device. According to an example embodiment, the first base station may receive uplink packets of the first packet flow from the wireless device. The first base station may transmit the uplink packets to the second base station. According to an example embodiment, the first base station may ignore the uplink packets when limiting the bit rate between the wireless device and the first base station to the first aggregate maximum bit rate.

According to an example embodiment, the first base station may receive downlink packets of the first packet flow from the second base station. The first base station may transmit the downlink packets to the wireless device. The first base station may ignore the downlink packets when limiting the bit rate between the wireless device and the first base station to the first aggregate maximum bit rate. According to an example embodiment, the at least one first message may comprise a secondary base station addition request message. The at least one first message may comprise a secondary base station modification request message.

According to an example embodiment, the first packet flow may comprise a radio link control channel. According to an example embodiment, the first packet flow may comprise a logical channel. According to an example embodiment, the first packet flow may comprise a radio bearer. According to an example embodiment, the first packet flow may comprise a quality-of-service flow. According to an example embodiment, the first packet flow may comprise a packet data unit session.

According to an example embodiment, the first aggregate maximum bit rate may comprise a secondary base station user equipment aggregate maximum bit rate. According to an example embodiment, the at least one first message may comprise one or more packet flow configuration parameters configured for a secondary cell group bearer. According to an example embodiment, the at least one first message may comprise one or more packet flow configuration parameters configured for a split bearer. According to an example embodiment, the at least one first message may comprise one or more packet flow configuration parameters configured for a secondary cell group split bearer. According to an example embodiment, the at least one first message may comprise one or more packet flow configuration parameters configured for a duplicated PDCP bearer. According to an example embodiment, the at least one first message may comprise one or more packet flow configuration parameters configured for an original PDCP bearer for a PDCP duplication.

According to an example embodiment, the at least one first message may comprise an identifier of the wireless device. According to an example embodiment, the at least one first message may comprise wireless device security capability information. According to an example embodiment, the at least one first message may comprise secondary base station security key information. According to an example embodiment, the at least one first message may comprise serving public land mobile network information of the wireless device. According to an example embodiment, the at least one first message may comprise radio resource control configuration information of the wireless device. According to an example embodiment, the at least one first message may comprise secondary cell group configuration information of the wireless device. According to an example embodiment, the at least one first message may comprise closed cell group membership status information of the wireless device.

According to an example embodiment, the at least one first message may comprise a packet data unit session identifier of a packet data unit session. According to an example embodiment, the at least one first message may comprise quality of service parameters of the packet data unit session. According to an example embodiment, the at least one first message may comprise an uplink general packet radio service tunneling protocol tunnel endpoint identifier for the packet data unit session. An example general packet radio service tunneling protocol is GTP. According to an example embodiment, further comprising the first base station may receive a second message from the second base station. The second message may indicate activation of a PDCP packet duplication of the first packet flow.

According to an example embodiment, the first base station may transmit downlink packets of the first packet flow to the wireless device in response to the second message. According to an example embodiment, the first base station may ignore the downlink packets when limiting the bit rate between the wireless device and the first base station to the first aggregate maximum bit rate. According to an example embodiment, the first base station may receive by from the second base station, a second message indicating deactivation of a PDCP packet duplication for the first packet flow. According to an example embodiment, the first base station may stop transmission of downlink packets of the first packet flow to the wireless device in response to the second message. According to an example embodiment, the second base station may transmit original PDCP packets of the first packet flow to the wireless device. According to an example embodiment, the second base station may receive original PDCP packets of the first packet flow from the wireless device.

FIG. 52 is an example flow diagram as per an aspect of an embodiment of the present disclosure. At 5210, a base station central unit may receive at least one first message from a second base station. The at least one first message may be for a wireless device. The at least one first message may comprise a first aggregate maximum bit rate of the wireless device at the first base station. The at least one first message may be for a wireless device. The at least one first message may comprise a packet data convergence protocol (PDCP) packet duplication parameter indicating that a first packet flow may comprise duplicated PDCP packets. At 5220, the first base station receive packets of the first packet flow from the second base station. At 5230, the first base station may transmit the packets to the wireless device. At 5240, the first base station may determine that a bit rate of the wireless device exceeds the first aggregate maximum bit rate. The determining may ignore, based on the PDCP packet duplication parameter, the packets of the first packet flow. At 5250, the first base station may limit a bit rate of data transfer to a wireless device based on the determining.

According to an example embodiment, the first base station may comprise a secondary base station for the wireless device. According to an example embodiment, the second base station may comprise a master base station for the wireless device. According to an example embodiment, the limiting may prevent the bit rate from exceeding the first aggregate maximum bit rate.

According to an example embodiment, the first base station may receive packets of the first packet flow from the wireless device. According to an example embodiment, the first base station may receive uplink packets of the first packet flow from the wireless device. According to an example embodiment, the first base station may transmit the uplink packets to the second base station. According to an example embodiment, the first base station may ignore the uplink packets when limiting the bit rate between the wireless device and the first base station to the first aggregate maximum bit rate.

According to an example embodiment, the first base station may receive downlink packets of the first packet flow from the second base station. According to an example embodiment, the first base station may transmit the downlink packets to the wireless device. According to an example embodiment, the downlink packets may be ignored when limiting the bit rate between the wireless device and the first base station to the first aggregate maximum bit rate.

According to an example embodiment, the at least one first message may comprise a secondary base station addition request message. According to an example embodiment, the at least one first message may comprise a secondary base station modification request message.

According to an example embodiment, the first packet flow may comprise a radio link control channel. According to an example embodiment, the first packet flow may comprise a logical channel. According to an example embodiment, the first packet flow may comprise a radio bearer. According to an example embodiment, the first packet flow may comprise a quality-of-service flow. According to an example embodiment, the first packet flow may comprise a packet data unit session. According to an example embodiment, the first aggregate maximum bit rate may comprise a secondary base station user equipment aggregate maximum bit rate.

According to an example embodiment, the at least one first message may comprise one or more packet flow configuration parameters. The one or more packet flow configuration parameters may be configured for a secondary cell group bearer.

The one or more packet flow configuration parameters may be configured for a split bearer. The one or more packet flow configuration parameters may be configured for a secondary cell group split bearer. The one or more packet flow configuration parameters may be configured for a duplicated PDCP bearer. The one or more packet flow configuration parameters may be configured for an original PDCP bearer for a PDCP duplication.

According to an example embodiment, the at least one first message may comprise an identifier of the wireless device. According to an example embodiment, the at least one first message may comprise wireless device security capability information. According to an example embodiment, the at least one first message may comprise secondary base station security key information. According to an example embodiment, the at least one first message may comprise serving public land mobile network information of the wireless device. According to an example embodiment, the at least one first message may comprise radio resource control configuration information of the wireless device. According to an example embodiment, the at least one first message may comprise secondary cell group configuration information of the wireless device. According to an example embodiment, the at least one first message may comprise closed cell group membership status information of the wireless device. According to an example embodiment, the at least one first message may comprise a packet data unit session identifier of a packet data unit session. According to an example embodiment, the at least one first message may comprise quality of service parameters of the packet data unit session. According to an example embodiment, the at least one first message may comprise an uplink general packet radio service tunneling protocol tunnel endpoint identifier for the packet data unit session. An example general packet radio service tunneling protocol is GTP.

According to an example embodiment, the first base station may receive from the second base station, a second message indicating activation of a PDCP packet duplication of the first packet flow. According to an example embodiment, in response to the second message, the first base station may transmit and, downlink packets of the first packet flow to the wireless device. According to an example embodiment, the downlink packets may be ignored when limiting the bit rate between the wireless device and the first base station to the first aggregate maximum bit rate. According to an example embodiment, first base station may receive from the second base station, a second message indicating deactivation of a PDCP packet duplication for the first packet flow. According to an example embodiment, in response to the second message, the first base station may stop transmission of downlink packets of the first packet flow to the wireless device. According to an example embodiment, the second base station may transmit to the wireless device, original PDCP packets of the first packet flow. According to an example embodiment, the second base station may receive original PDCP packets of the first packet flow from the wireless device.

FIG. 53 is an example flow diagram as per an aspect of an embodiment of the present disclosure. At 5310, a first base station may receive at least one first message from a second base station. The at least one first message may be for a wireless device. The at least one first message may comprise a first aggregate maximum bit rate of the wireless device at the first base station. The at least one first message may be for a wireless device. The at least one first message may comprise a packet data convergence protocol (PDCP) packet duplication parameter indicating that a first packet flow may comprise duplicated PDCP packets. At 5320, the first base station may receive the duplicated PDCP packets of the first packet flow from the second base station. At 5330, may the first base station transmit the duplicated PDCP packets to the wireless device. At 5340, the first base station may determine that a bit rate of the wireless device exceeds the first aggregate maximum bit rate. The determining may ignore, based on the PDCP packet duplication parameter, the duplicated PDCP packets. At 5350, the first base station may limit the bit rate of the wireless device based on the determining.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or nonoperational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more (or at least one) message(s) comprise a plurality of parameters, it implies that a parameter in the plurality of parameters is in at least one of the one or more messages, but does not have to be in each of the one or more messages. In an example embodiment, when one or more (or at least one) message(s) indicate a value, event and/or condition, it implies that the value, event and/or condition is indicated by at least one of the one or more messages, but does not have to be indicated by each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a base station distributed unit from a base station central unit:
      at least one bearer configuration information element indicating that packet data convergence protocol (PDCP) packet duplication is configured for at least one bearer of a wireless device; and
      a start marker packet on a user plane, the start marker packet indicating activation of the PDCP packet duplication of the at least one bearer of the wireless device; and
   transmitting, by the base station distributed unit to the base station central unit and based on the activation:
      PDCP packets of the at least one bearer; and
      duplicated PDCP packets of the at least one bearer.

2. The method of claim 1, wherein the at least one bearer comprises at least one of:
   a signaling radio bearer; or
   a data radio bearer.

3. The method of claim 1, further comprising:
   receiving, by the base station distributed unit from the base station central unit, at least one second information element indicating deactivation of the PDCP packet duplication of the at least one bearer of the wireless device; and
   stopping transmitting, by the base station distributed unit and based on the deactivation, duplicated PDCP packets of the at least one bearer.

4. The method of claim 1, further comprising transmitting, by the base station distributed unit to the wireless device and based on the start marker packet, a medium access control control element indicating the activation of the PDCP packet duplication of the at least one bearer.

5. The method of claim 4, further comprising receiving, by the base station distributed unit and based on the medium access control control element:
   PDCP packets of the at least one bearer; and
   duplicated PDCP packets of the at least one bearer.

6. The method of claim 5, wherein the at least one bearer comprises at least one of:
   a signaling radio bearer; or
   a data radio bearer.

7. The method of claim 6, further comprising:
   receiving, by the base station distributed unit from the base station central unit, at least one second information element indicating deactivation of the PDCP packet duplication of the at least one bearer of the wireless device; and
   stopping transmitting, by the base station distributed unit and based on the deactivation, duplicated PDCP packets of the at least one bearer.

8. The method of claim 1, further comprising transmitting, by the base station distributed unit to the base station central unit, a request message indicating a duplication activation or deactivation request to activate or deactivate duplication of PDCP packets of the at least one bearer of the wireless device,
   wherein the duplication activation or deactivation request is based on status information of the base station distributed unit, the status information comprising at least one of:
      a traffic load status;
      a radio channel status; or
      a packet transmission policy.

9. A base station distributed unit, comprising:
   one or more processors; and
   a memory storing instructions that, when executed by the one or more processors, cause the base station distributed unit to:
      receive, from a base station central unit:
         at least one bearer configuration information element indicating that packet data convergence protocol (PDCP) packet duplication is configured for at least one bearer of a wireless device; and
         a start marker packet on a user plane, the start marker packet indicating activation of the PDCP packet duplication of the at least one bearer of the wireless device; and
      transmit, to the base station central unit and based on the activation:
         PDCP packets of the at least one bearer; and
         duplicated PDCP packets of the at least one bearer.

10. The base station distributed unit of claim 9, wherein the at least one bearer comprises at least one of:
    a signaling radio bearer; or
    a data radio bearer.

11. The base station distributed unit of claim 9, wherein the instructions, when executed by the one or more processors, further cause the base station distributed unit to:
    receive, unit from the base station central unit, at least one second information element indicating deactivation of the PDCP packet duplication of the at least one bearer of the wireless device; and
    stop transmitting, based on the deactivation, duplicated PDCP packets of the at least one bearer.

12. The base station distributed unit of claim 9, wherein the instructions, when executed by the one or more processors, further cause the base station distributed unit to transmit, to the wireless device and based on the start marker packet, a medium access control control element indicating the activation of the PDCP packet duplication of the at least one bearer.

13. The base station distributed unit of claim 12, wherein the instructions, when executed by the one or more processors, further cause the base station distributed unit to:
    receive, by the base station distributed unit and based on the medium access control control element:
       PDCP packets of the at least one bearer; and
       duplicated PDCP packets of the at least one bearer.

14. The base station distributed unit of claim 13, wherein the at least one bearer comprises at least one of:
- a signaling radio bearer; or
- a data radio bearer.

15. The base station distributed unit of claim 14, wherein the instructions, when executed by the one or more processors, further cause the base station distributed unit to:
- receive, by the base station distributed unit from the base station central unit, at least one second information element indicating deactivation of the PDCP packet duplication of the at least one bearer of the wireless device; and
- stop the transmission, by the base station distributed unit and based on the deactivation, of duplicated PDCP packets of the at least one bearer.

16. A method comprising:
- transmitting, by a base station central unit to a base station distributed unit:
  - at least one bearer configuration information element indicating that packet data convergence protocol (PDCP) packet duplication is configured for at least one bearer of a wireless device; and
  - a start marker packet on a user plane, the start marker packet indicating activation of the PDCP packet duplication of the at least one bearer of the wireless device; and
- receiving, by the base station central unit from the base station distributed unit and based on the activation:
  - PDCP packets of the at least one bearer; and
  - duplicated PDCP packets of the at least one bearer.

17. The method of claim 16, further comprising transmitting, by the base station central unit to the base station distributed unit, at least one second information element indicating deactivation of the PDCP packet duplication of the at least one bearer of the wireless device.

18. The method of claim 16, wherein the at least one bearer comprises at least one of:
- a signaling radio bearer; or
- a data radio bearer.

19. The method of claim 18, further comprising transmitting, by the base station central unit to the base station distributed unit, at least one second information element indicating deactivation of the PDCP packet duplication of the at least one bearer of the wireless device.

* * * * *